(12) United States Patent
Sato et al.

(10) Patent No.: US 6,246,804 B1
(45) Date of Patent: *Jun. 12, 2001

(54) IMAGE RETRIEVAL METHOD AND APPARATUS USING A COMPOUND IMAGE FORMED FROM A PLURALITY OF DETECTED REGIONS

(75) Inventors: Hiroaki Sato, Kawasaki; Yuichi Bannai, Koganei; Hiroshi Okazaki; Akihiro Yoshitani, both of Yokohama; Kazuko Tsujimura, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 08/555,714

(22) Filed: Nov. 14, 1995

(30) Foreign Application Priority Data

| Nov. 15, 1994 | (JP) | 6-280495 |
| Jan. 9, 1995 | (JP) | 7-001224 |
| Jan. 17, 1995 | (JP) | 7-004926 |
| Jan. 26, 1995 | (JP) | 7-010693 |
| Jan. 31, 1995 | (JP) | 7-013781 |

(51) Int. Cl.[7] ............................................. G06K 9/00
(52) U.S. Cl. .................................. 382/284; 382/305
(58) Field of Search ................................. 382/190, 203, 382/162, 165, 284, 305, 306; 358/524, 403; 345/520, 521; 707/6, 104

(56) References Cited

U.S. PATENT DOCUMENTS

| 5,129,011 | * | 7/1992 | Nishikawa et al. | 382/9 |
| 5,576,950 | | 11/1996 | Tomomura et al. | 364/514 A |
| 5,586,197 | * | 12/1996 | Tsujimura et al. | 382/162 |
| 5,644,765 | | 7/1997 | Shimura et al. | 395/615 |
| 5,652,881 | * | 7/1997 | Takahashi et al. | 395/615 |
| 5,734,893 | | 3/1998 | Li et al. | 395/615 |
| 5,802,361 | | 9/1998 | Wang et al. | 395/600 |

OTHER PUBLICATIONS

NEC Research and Development, Oct. 1994, Japan, vol. 35, No. 4, ISSN 0547–051X, pp. 410–420, Hirata K. et al. 'The Concept of Media–Based Navigation And Its Implementation On Hypermedia System "Miyabi"'.

NEC Research and Development, vol. 34, No. 2, Apr. 1, 1993, pp. 263–273, XP 000322020, Kyoji Hirata et al. 'Rough Sketch–Based Image Information Retrieval'.

(List continued on next page.)

Primary Examiner—Andrew W. Johns
(74) Attorney, Agent, or Firm—Fitzpatrick, Cella Harper & Scinto

(57) ABSTRACT

An image retrieval method and apparatus for searching a plurality of images stored in an image file for a desired image are disclosed. When a designated image for designating an image to be retrieved for is input, and its color is designated, the sizes and colors are compared between description information which stores the feature of each of regions obtained by dividing each of images to be searched stored in the image file, and feature data of the designated image. In this manner, the regions, which are determined to be included in the designated image, of image data are obtained, and the similarities between the obtained regions of image data and the designated image are calculated. Image data having higher similarities are read out from the image file, and are displayed while being sorted in the descending order from the highest similarity.

18 Claims, 44 Drawing Sheets

OTHER PUBLICATIONS

Proceedings of the International Conference on Multimedia Computing And Systems (CAT. NO. 94TH0631–2), Proceedings of IEEE International Conference on Multimedia Computing and Systems, Boston, MA, USA, May 15–19, 1994, ISBN 0–8186–5530–5, 1994, Los Alamitos, CA, USA, IEEE Comput. Soc. Press, USA, pp. 121–130, Yihong Gong et al. 'An Image Database System With Content Capturing and Fast Image Indexing Abilities'.

Proceedings ICIP–94 (CAT. NO. 94CH35708), Proceedings of 1st International Conference On Image Processing, Austin, TX, USA, Nov. 13–16, 1994, ISBN 0–8186–6952–7, 1994, Los Alamitos, CA, USA, IEEE Comput. Soc. Press, USA, pp. 76–80 vol. 2, Lee D et al. Query By Image Content Using Multiple Objects and Multiple Features: User Interface Issues.

Information Systems, Oct. 1993, UK, vol. 18, No. 7, ISSN 0306–4379, pp. 525–537, Gary J E et al., 'Similar Shape Retrieval Using a Structural Feature Index'.

Computer Graphics and Image Processing 19, 248–264 (1982), "Polygonal Approximation by the Minimax Method", Yoshisuke Kurozumi and Wayne A. Davis.

* cited by examiner

FIG. 37A
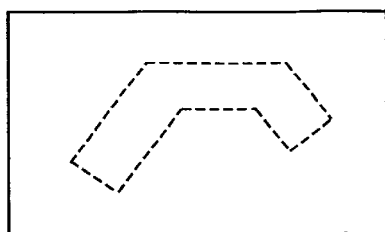
(DESIGNATED EDGE SURROUNDING REGION)
FIG. 37B
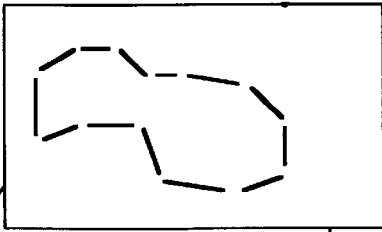
(STORED EDGE IMAGE)
SUPERPOSE
FIG. 37C
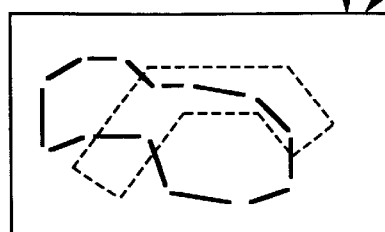
EXTRACT COMMON REGION
FIG. 37F
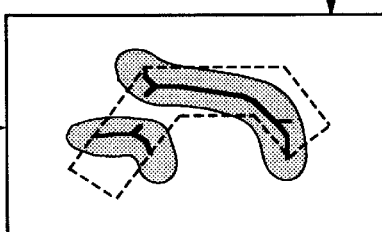
EXTRACT LONGEST CHAIN
FIG. 37D
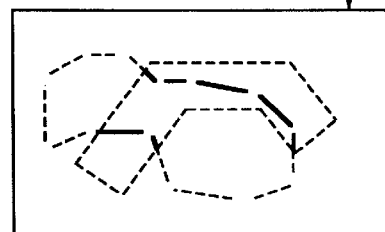
INFLATE
FIG. 37G
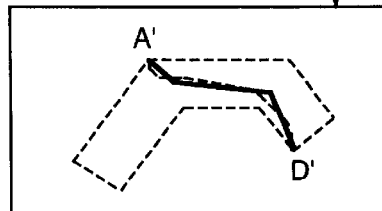
POLYGONAL APPROXIMATION
FIG. 37E
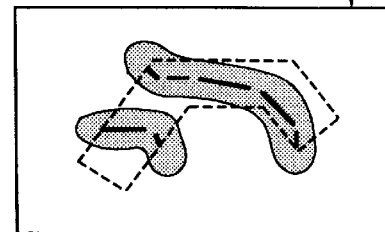
THIN-LINE CONVERSION
FIG. 37H
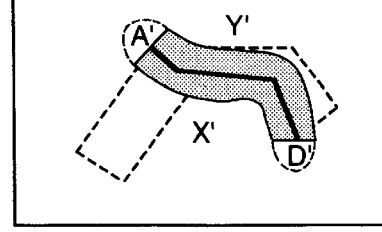
GENERATE CANDIDATE EDGE SURROUNDING REGION
FIG. 37I

INPUT CURVE

RESULT OF POLYGONAL APPROXIMATION

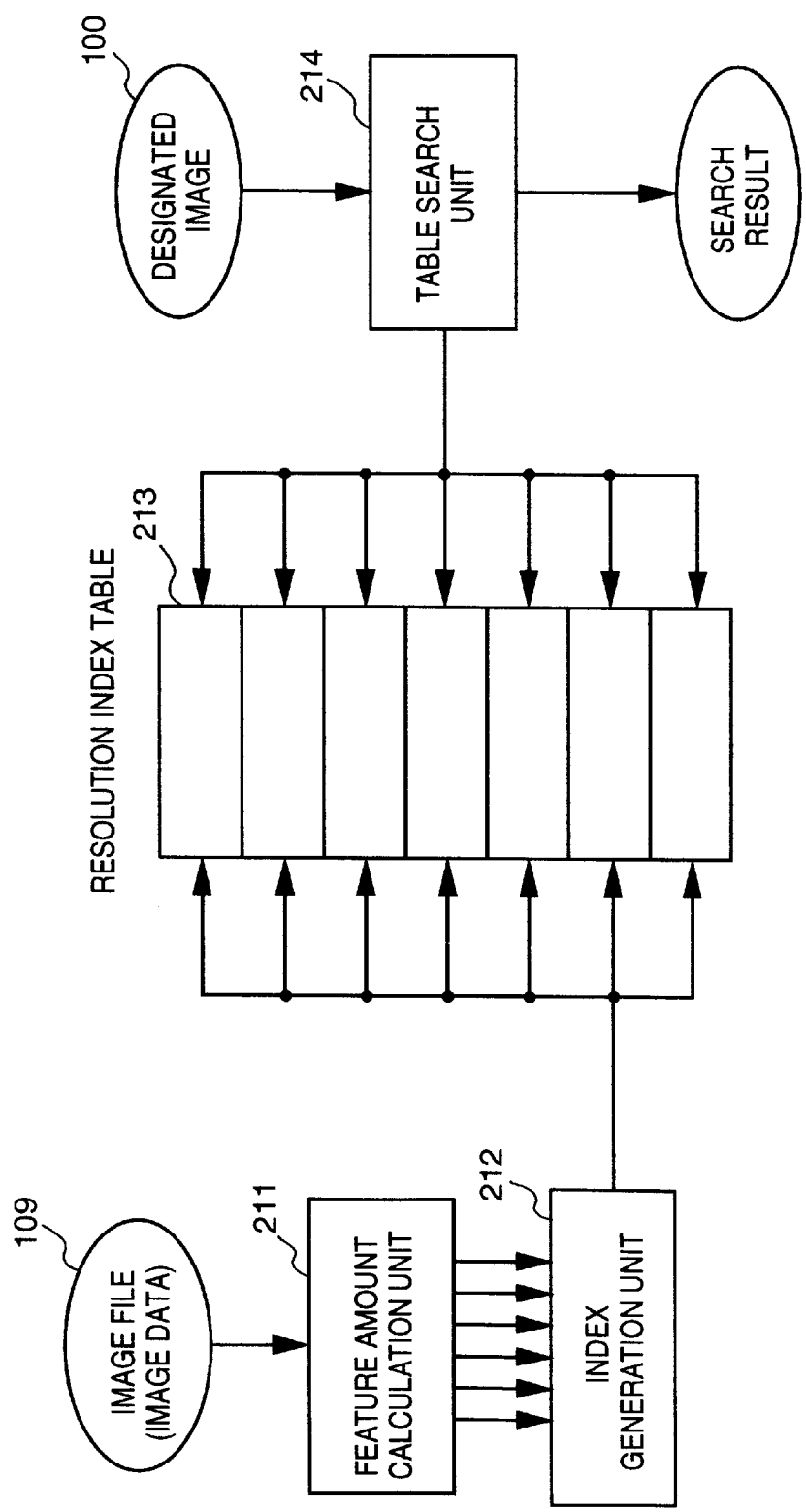

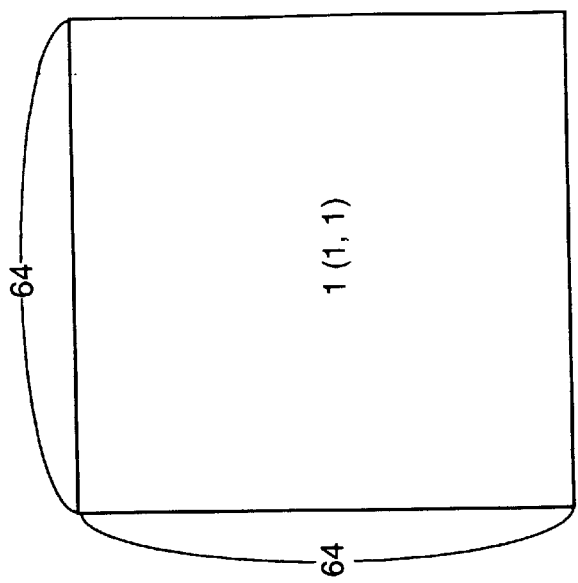
F I G. 42C
BLOCK SIZE = 64
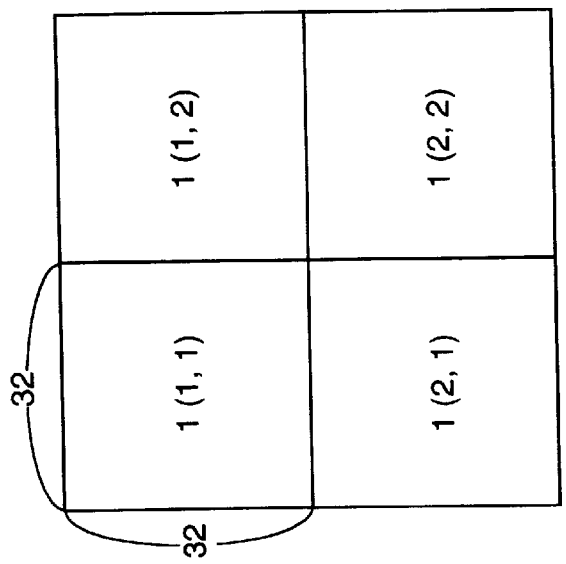
F I G. 42B
BLOCK SIZE = 32
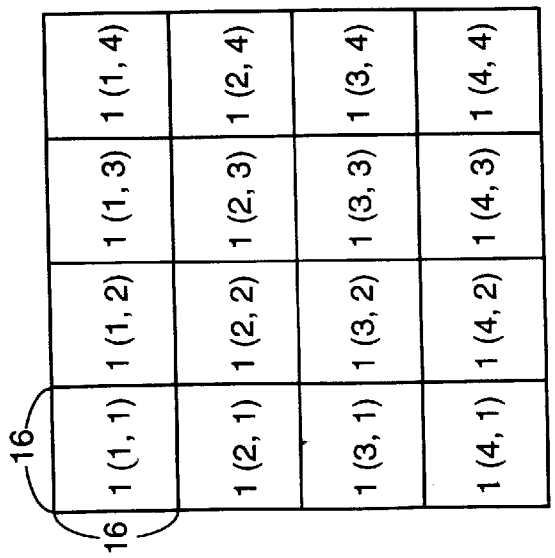
F I G. 42A
BLOCK SIZE = 16

FIG. 45

| | BLOCK SIZE: 16 | BLOCK SIZE: 32 | ...... | BLOCK SIZE: 64 | BLOCK SIZE: 128 |
|---|---|---|---|---|---|
| COLOR: C1 | (IMAGE 1, REGION 1), (IMAGE 2, REGION 3) | | | | |
| COLOR: C2 | | | | | |
| COLOR: C3 | | | | | |
| COLOR: C4 | | | | | |
| COLOR: C5 | | | | | |
| COLOR: C6 | | | | | |
| COLOR: C7 | | | | | |
| COLOR: C8 | | | | | |
| COLOR: C9 | | | | | |
| COLOR: C10 | | | | | |
| COLOR: C11 | | | | | |
| COLOR: C12 | | | | | |

FIG. 48B  BLOCK SIZE = 2A

FIG. 48A  BLOCK SIZE = A

ORIGINAL IMAGE

DIVIDED INTO REGIONS

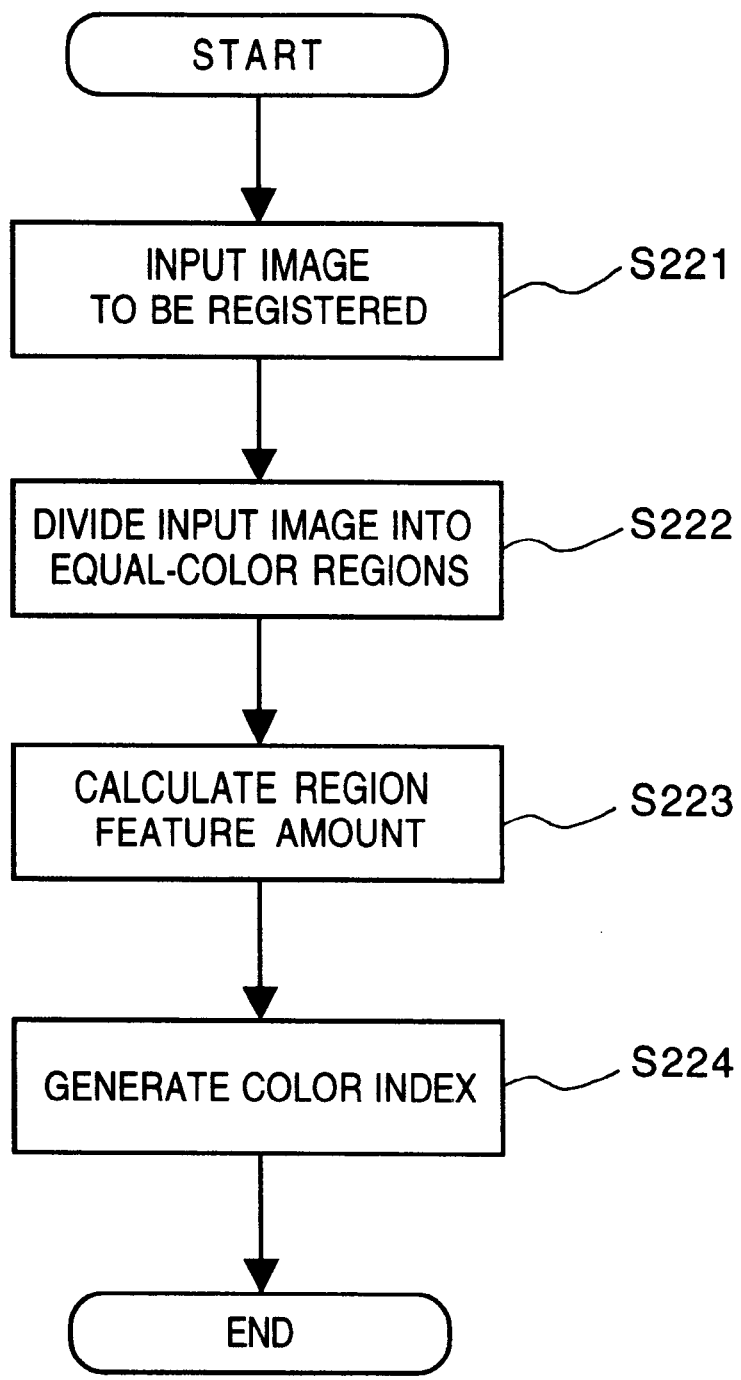

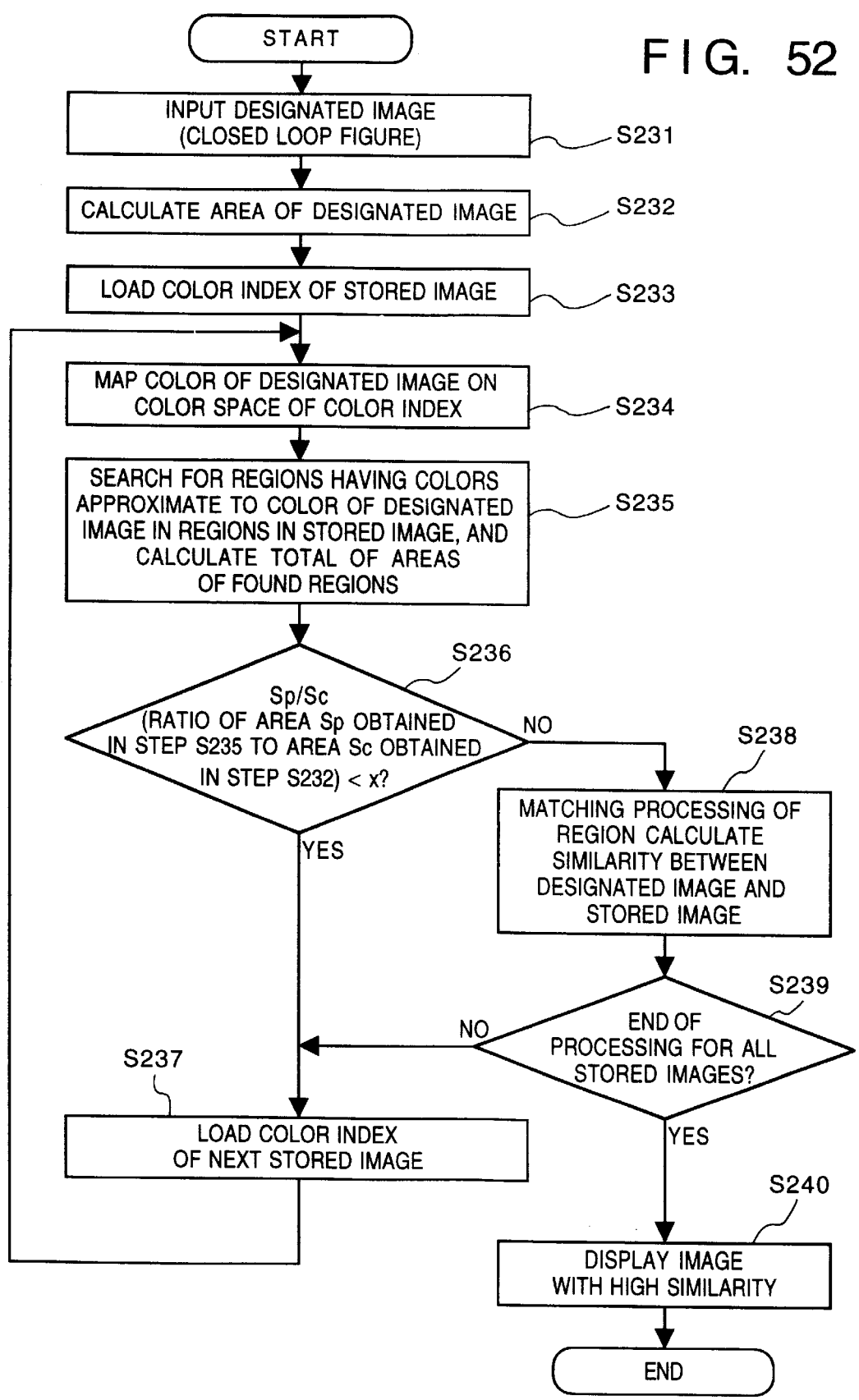

Pi : COORDINATE ON COLOR SPACE OF REPRESENTATIVE COLOR OF REGION i IN STORED IMAGE

Si : AREA OF Pi

C : COORDINATE OF COLOR OF DESIGNATED IMAGE ON COLOR SPACE

IMAGE RETRIEVAL METHOD AND APPARATUS USING A COMPOUND IMAGE FORMED FROM A PLURALITY OF DETECTED REGIONS

BACKGROUND OF THE INVENTION

The present invention relates to a content-based image retrieval method and apparatus for designating an image or figure and retrieving image data similar to the designated image or figure in, e.g., an image database or an image file system.

As an image retrieval method for searching a plurality of images stored in an image file format to find a desired image, the following methods are conventionally used.

(1) In a so-called template matching method, when a designated image as a search template or search key is input, the designated image is sequentially superposed on image data stored in an image file to be searched, a sum total of differences between the pixels of the designated image and those of each image data in the image file is calculated, and the minimum value of the sum totals is determined as a difference between the designated image and the image data in the image file, thereby selecting image data having a difference equal to or smaller than a predetermined value as similar images.

(2) In another method, image data stored in an image file are segmented into some regions having similar pixel values, the correspondences between data that describe the image regions and a designated image or figure are calculated using characteristics such as an area, secondary moment, or the like, and image data having the largest similarly is selected as a similar image.

However, in the conventional method (1), the designated image must be moved with respect to image data to be searched, and a difference in the number of corresponding pixels must be calculated in each movement. For this reason, the search processing requires much time. Upon search, since an accurate search result cannot be obtained unless the designated image is compared while being moved in units of sufficiently small distances in a two-dimensional region of image data, a very long calculation time is required.

In the conventional method (2), a normal search operation is disturbed when one region of image data in the image file to be searched does not have a one-to-one correspondence with one region of an image designated as a search key, i.e., when an image in the image file is over-segmented into smaller regions than the corresponding regions in a designated image.

In a so-called segmentation technique for automatically segmenting image data into a plurality of regions, since a target area which is perceived by a person as one region is often divisionally extracted as a plurality of portions, such a limitation poses a serious problem in an application.

When an image retrieval operation is performed, calculations for checking matching between a designated image or figure to be retrieved (to be referred to as a designated image hereinafter) and each region of all images stored in the image file system are required. When there are a large number of stored images, the calculation amount becomes huge, and the time required for image retrieval also becomes very long. In order to solve this problem, a method for decreasing the number of images to be subjected to matching calculations by limiting the stored images using the color information of the stored images and the designated image to attain high-speed search processing has already been proposed.

However, in the above-mentioned search method, for example, when a stored image includes a large number of fine regions having various colors, a color similar to the color of a closed figure designated by the designated image is included in the stored image with high possibility independently of an image designated as the designated image. As a result, even when an image including such a region is not actually data to be searched, it is undesirably selected as data for which distance calculations are to be performed, and he effect of the limitation processing cannot be expected.

SUMMARY OF THE INVENTION

The present invention has been made in consideration of the above-mentioned prior arts, and has as its object to provide an image retrieval method and apparatus, which can efficiently retrieve image data even when a search region in image data is divisionally extracted as a plurality of regions.

It is still another object of the present invention to provide an image retrieval method and apparatus, which can efficiently retrieve an image by shortening the time required for similarity calculations of images.

It is still another object of the present invention to provide an image retrieval method and apparatus, which can efficiently retrieve an image by obtaining movable regions in which each region of an image to be searched and a designated image have a specific phase relationship therebetween, and discriminating the presence/absence of a crossing region of the movable regions.

It is still another object of the present invention to provide an image retrieve method and apparatus, which can quickly and accurately search for a desired image in such a manner that edge information of a region of an image or figure pattern or color information of a surrounding region is input as image description information, the number of image data to be accessed is decreased using various kinds of description information of image data on the basis of the input image description information, and a limited number of images are accessed to retrieve the image.

It is still another object of the present invention to provide an image retrieval method and apparatus, which can search for a desired image by inputting only the edge position and its surrounding color of an image.

It is still another object of the present invention to provide a high-speed image retrieval method and apparatus, which allow a reliable operation even when a designated image is a portion of a target image or an image to be retrieved, and can sufficiently limit the number of images to be tested.

It is still another object of the present invention to provide an image retrieval method and apparatus, which can realize high-speed image search processing by utilizing information associated with the area of a closed region of a designated image to be retrieved for.

It is still another object of the present invention to provide an image retrieval method and apparatus, which can realize high-speed image search processing by limiting the number of images to be tested and, thereafter, discriminating the similarities of only the limited images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 37A to 37I are views for explaining the flow of the image processing for obtaining the distance values from the edge line on the basis of the edge line and its surrounding region;

FIG. 41 is a schematic view showing the image retrieval method according to the sixth embodiment;

FIGS. 42A to 42C are views showing the formats of blocks in the sixth embodiment;

FIG. 45 is a view showing an example of an index table in units of resolutions;

50A is a view showing a stored image as a search target wanted by a searcher, FIG. 50B is a view showing an example of near-equal-color regions obtained by segmenting the stored image, and FIG. 50C is a view showing an example of a designated image generated by the searcher;

FIG. 51 is a flow chart showing the processing upon registration of an image in an image database system in the image retrieval apparatus of the seventh embodiment;

FIG. 52 is a flow chart showing the image search processing in the image retrieval apparatus of the seventh embodiment;

FIGS. 54A and 54B are views for explaining the eighth embodiment of the present invention, in which FIG. 54A is a view showing the state wherein an HSV space is divided into blocks, and FIG. 54B is a view for explaining the processing for searching for a color similar to that of a designated image in units of blocks.

DESCRIPTION OF THE PREFERRED EMBODIMENTS

The preferred embodiments of the present invention will be described in detail below with reference to the accompanying drawings.

[First Embodiment]

Figure 1:
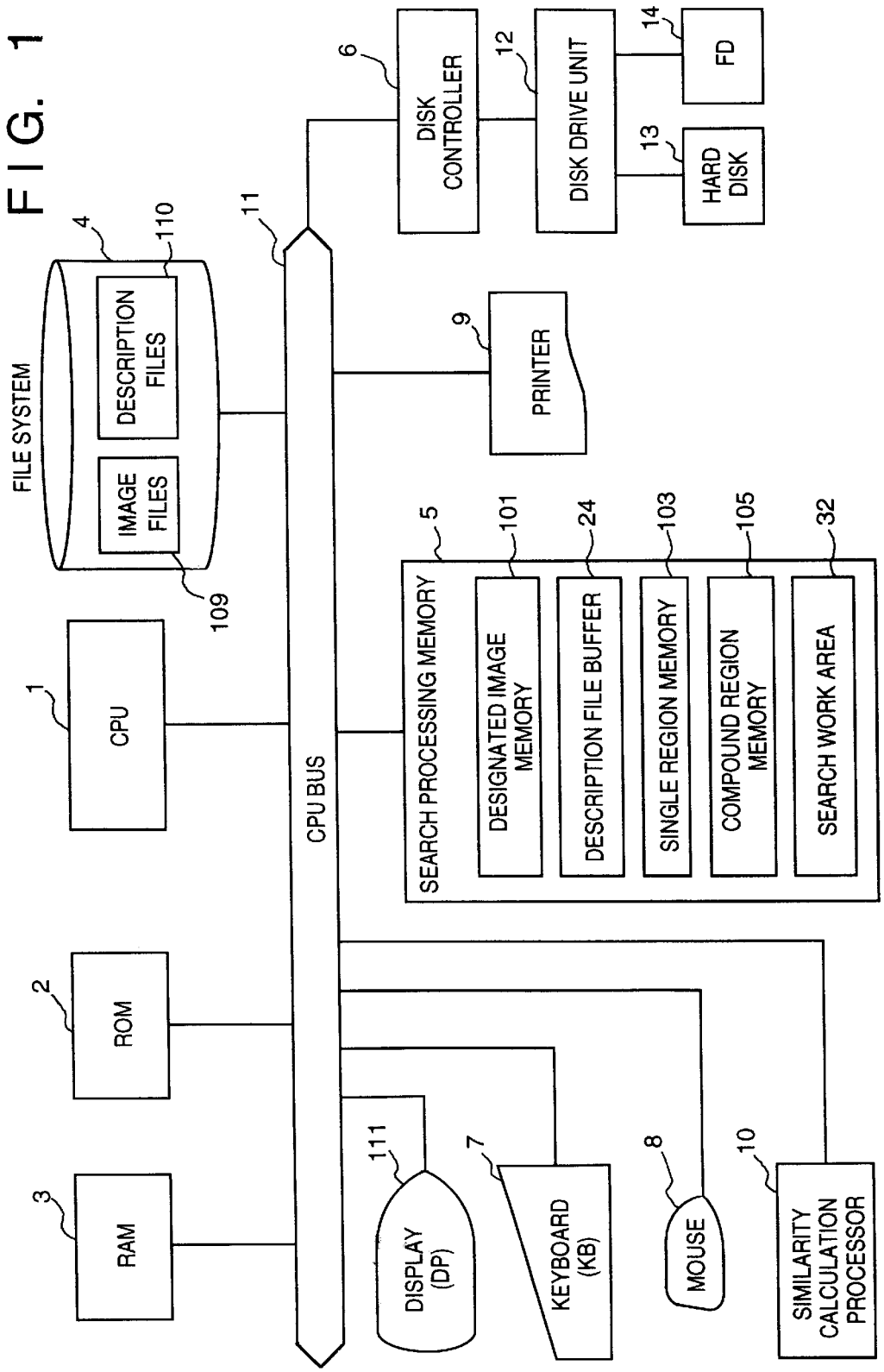
FIG. 1 is a block diagram showing the hardware arrangement of an image retrieval apparatus according to an embodiment of the present invention.

FIG. 1 is a block diagram showing the arrangement of an interactive image processing apparatus comprising an image retrieval function as a typical embodiment of the present invention.

The image processing apparatus comprises a CPU 1 for executing image retrieval processing, a ROM 2 for storing a control program and a processing program to be executed by the CPU 1, a RAM 3 used as work areas of the control program and the processing program, a file system 4 comprising a magnetic disk, a magneto-optical disk, or the like, which stores image files 109 for storing image data to be searched, and description files 110 for describing the features of image data in the image files 109 to be tested, a retrieval processing memory 5 as a RAM used for retrieval processing (to be described later), a display (DP) 111 for displaying retrieved images or displaying messages required for the search processing, a keyboard (KB) 7 used for inputting various commands to perform a retrieval operation, a mouse 8 used as an auxiliary input device for the retrieval operation, a printer 9 for outputting retrieved results, a similarity calculation processor 10 for calculating the similarity between an input image pattern and image data, a disk controller 6 for controlling a disk drive unit 12, and a CPU bus 11 for interconnecting the respective constituting elements. Note that the control program to be executed by the CPU 1 may be stored in, e.g., a hard disk 13 or a floppy disk (FD) 14, and may be loaded into the RAM 3 when it is executed.

On the retrieval processing memory 5, a designated image memory 101 for temporarily storing a designated image serving as a search key required in the retrieval processing to be described below, a description file buffer 24 for temporarily storing the contents of the description files 110, a single region memory 103, a compound region memory 105, and a search work area 32 (which will be described in detail later) are assured. Note that the retrieval processing memory 5 may be substituted for the RAM 3, the file system 4 may be placed on the hard disk 13 or the floppy disk 14, and the similarity calculation processor 10 may be substituted for the CPU1.

Figure 2:
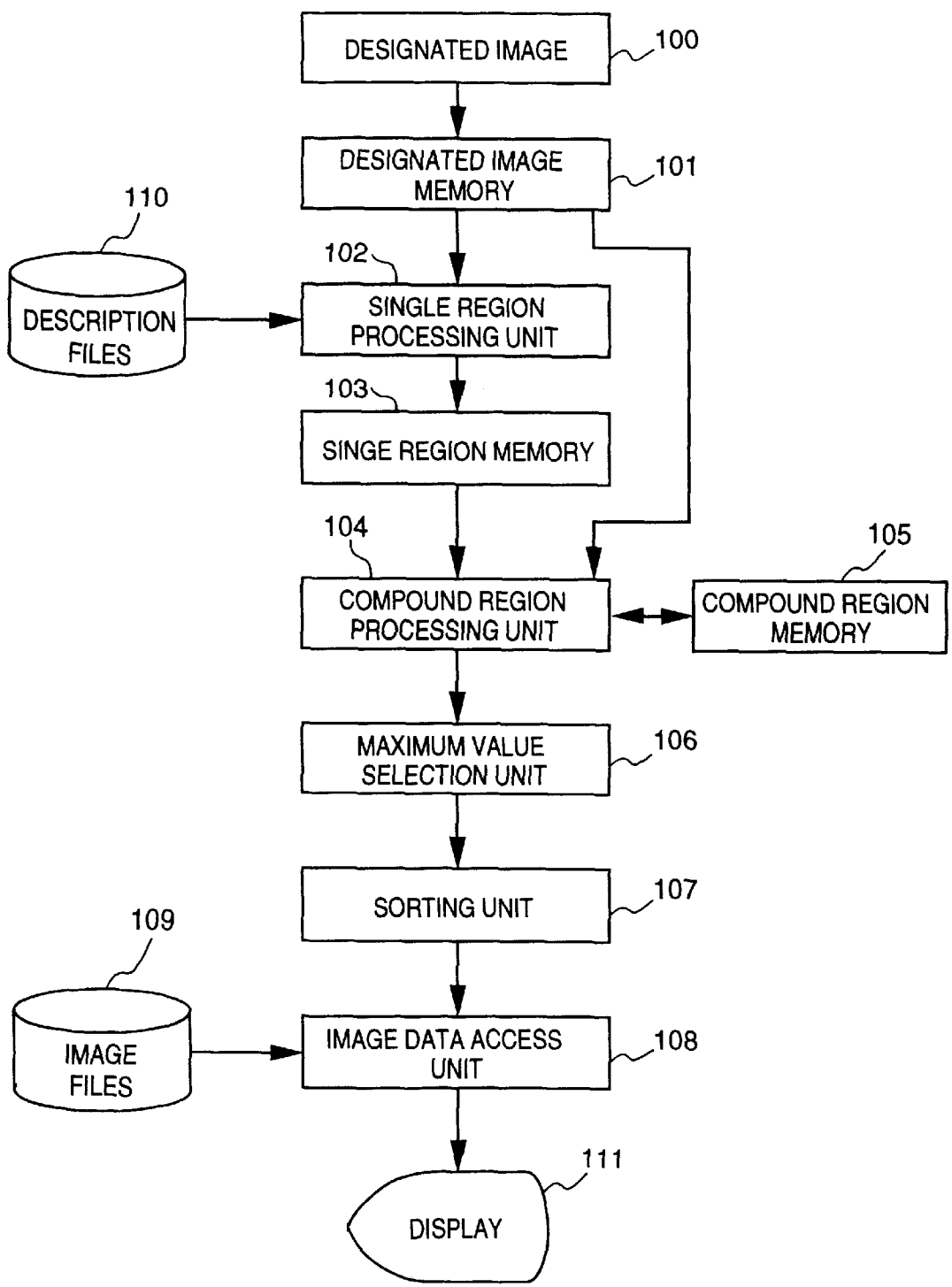
FIG. 2 is a functional block diagram showing the functional arrangement of the image retrieval apparatus according to the embodiment of the present invention.

FIG. 2 is a block diagram functionally showing the flow of the processing in the image retrieval apparatus according to the embodiment of the present invention.

Referring to FIG. 2, reference numeral 100 denotes an image (to be referred to as a designated image hereinafter) for designating an image as a search target from the image files 109. The designated image 100 is stored in the designated image memory 101. A single region processing unit 102 refers to the description files 110 which describes the contents of each image data in the image files 109 using the feature of the image data to discriminate if each region included in the image data is included in the designated image 100. If the region is included in the image 100, the unit 102 adds the description information of the region of the image data and information of a movable region of the designated image 100 to the single region memory 103. Reference numeral 104 denotes a compound region processing unit for discriminating if a condition that the designated image 100 simultaneously contains all regions of image data constituting a compound region is satisfied. If the image 100 simultaneously contains all the regions, the unit 104 adds the description information of the regions and information of a movable region of the designated image 100 to the compound region memory 105.

Reference numeral 106 denotes a maximum value selection unit for calculating the similarities between the compound regions stored in the compound region memory 105 by the compound region processing unit 104, and the designated image 100, and selecting a maximum value of the calculated similarity values as a similarity for each image datum. Reference numeral 107 denotes a sorting unit for receiving the similarities of the designated image 100 with respect to the respective image data, and selecting K image data in the descending order from the largest similarity value (highest similarity). Reference numeral 108 denotes an image data access unit for accessing the image files 109 to read out the K image data selected by the sorting unit 107, and displaying the readout image data on the display 111.

The single region processing unit 102 refers to the designated image memory 101 which stores the designated image 100 (or a figure) input by a searcher as a user, and the image description files 110 which describe the areas, boundary point coordinate strings of the individual regions of image data stored in the image files 109, and calculates a movable region as a region in which the designated image 100 is movable under the condition that each region described in the image description file 110 is included in the designated image 100, thus discriminating if a condition that the region is included in the designated image 100 is satisfied. If the region is included in the designated image 100, the unit 102 adds information indicating the movable region of the designated image 100 to the single region memory 103.

The compound region processing unit 104 receives the contents (designated image) of the designated image memory 101, the region information in the single region memory 103, and the compound region information in the compound region memory 105, and generates a compound region as a combination of each single region, and a compound region as a combination of a compound region and a single region. The unit 104 then discriminates if a condition that each of these compound regions is included in the designated image 100 is satisfied. If the region is included in the designated image 100, the unit 104 adds the description information of the compound region, and information indicating a movable region of the designated image 100 in the compound region to the compound region memory 105.

The maximum value selection unit 106 calculates the similarities between the designated image 100 and the compound regions in the compound region memory 105, which regions are selected by the compound region processing unit 104 since they satisfy the condition that the compound region is included in the designated image 100. Then, the unit 106 selects a maximum value of the similarities of all the regions included in one image data, and outputs the selected maximum value as the similarity of the image data.

The sorting unit 107 receives the similarity values of image data obtained by the maximum value selection unit 106, and sorts and selects K image data in the descending order from the largest similarity value. The image data access unit 108 reads out a plurality of corresponding image data from the image files 109 in the descending order from the largest similarity value using sorted similarity information of image data stored in an internal memory of the sorting unit 107, and displays the readout image data on the display 111.

Figure 3:
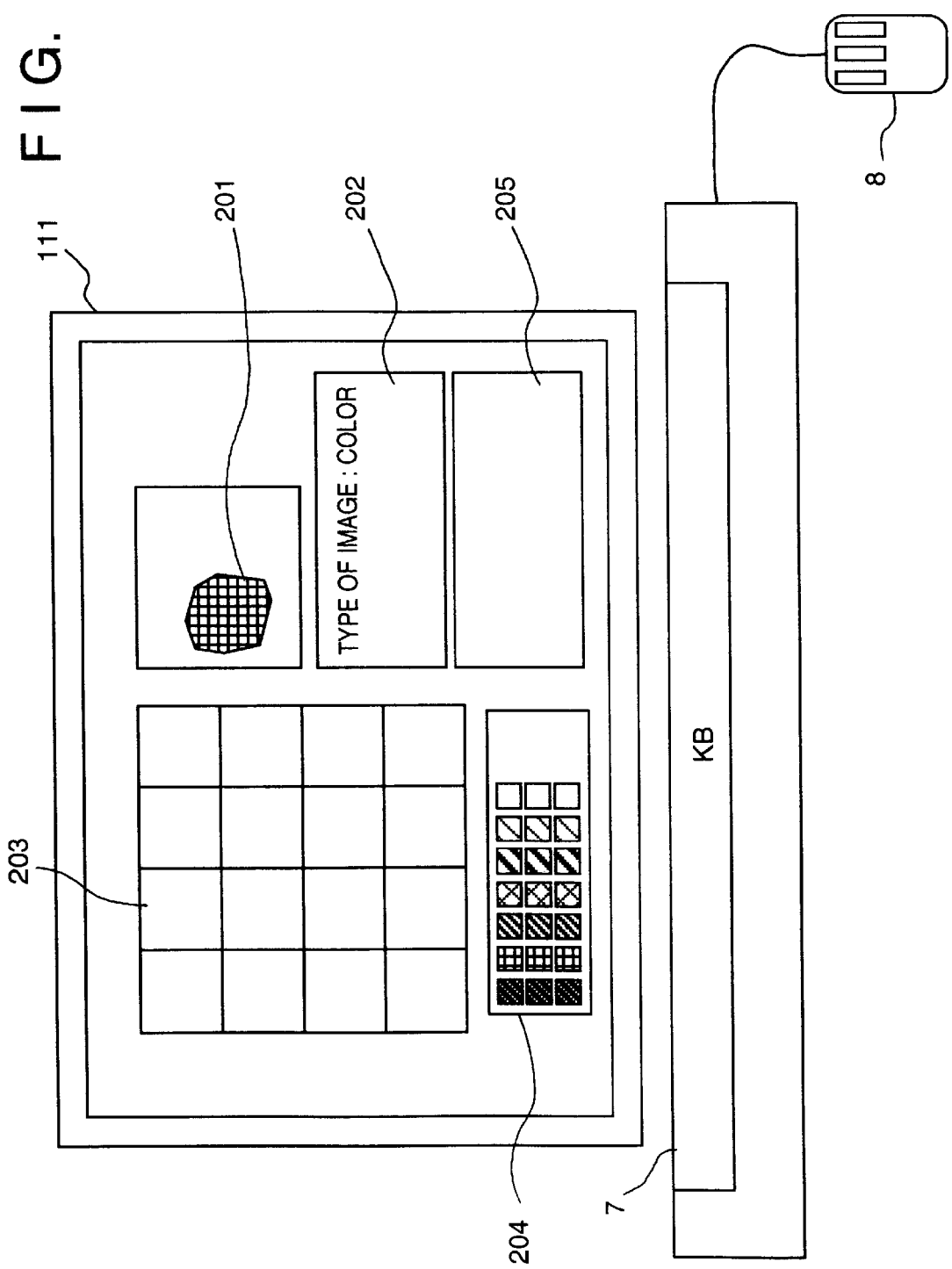
FIG. 3 is a view showing an example of the image retrieval apparatus of the embodiment shown in FIG. 1.

FIG. 3 is a view showing a display example on the screen of the image retrieval apparatus of this embodiment.

Referring to FIG. 3, reference numeral 201 denotes a figure input window on which a user writes an image (designated image 100) to be retrieved. Reference numeral 202 denotes a condition input window on which the user designates, e.g., the type of the target image. Reference numeral 203 denotes a retrieval result display window for displaying images as retrieval results in the order of, e.g., similarity values. Reference numeral 204 denotes a color palette, which is used by the user to select color information to be assigned to the designated image. Reference numeral 205 denotes an additional information display window for displaying additional information added to images as the retrieval results.

In the above-mentioned arrangement, the user designates and inputs, e.g., the type of image data to be retrieved in the condition input window 202, inputs a figure which roughly depicts a partial image present in the image data to be retrieved in the figure input window 201, and designates the color of the figure using the color palette 204.

As a result of retrieving image data on the basis of the designated image search conditions, image data corresponding to the retrieval results are displayed on the retrieval result display window 203 in the order of higher similarities, and information added to each image as the retrieval result is displayed on the additional information display window 205.

Figure 4:
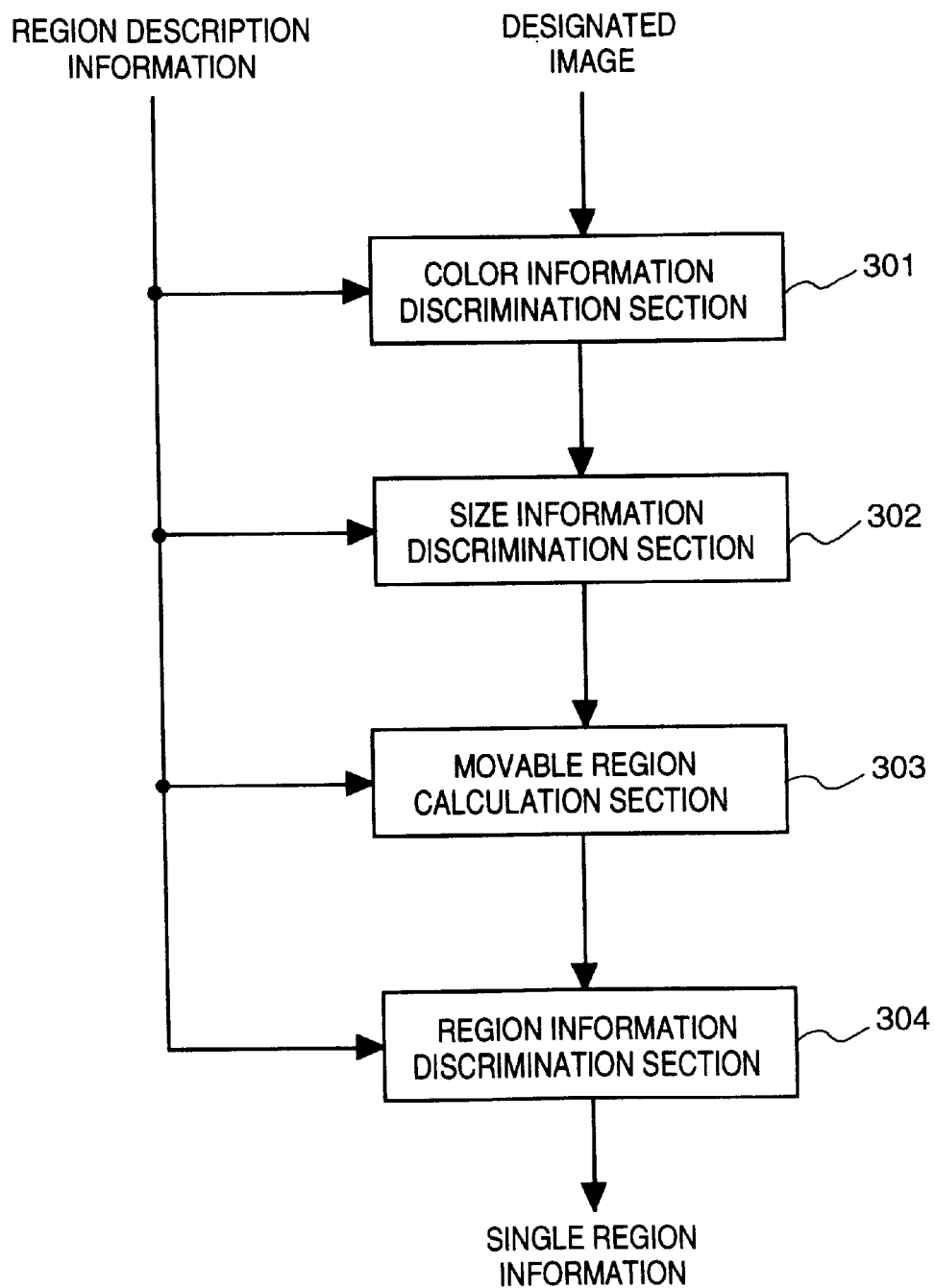
FIG. 4 is a functional block diagram showing the arrangement of a single region processing unit in the first embodiment of the present invention.

FIG. 4 is a view for explaining the image retrieval processing according to the first embodiment of the present invention, i.e., a functional block diagram showing the processing for realizing the single region processing unit 102 shown in FIG. 2.

Figure 5:
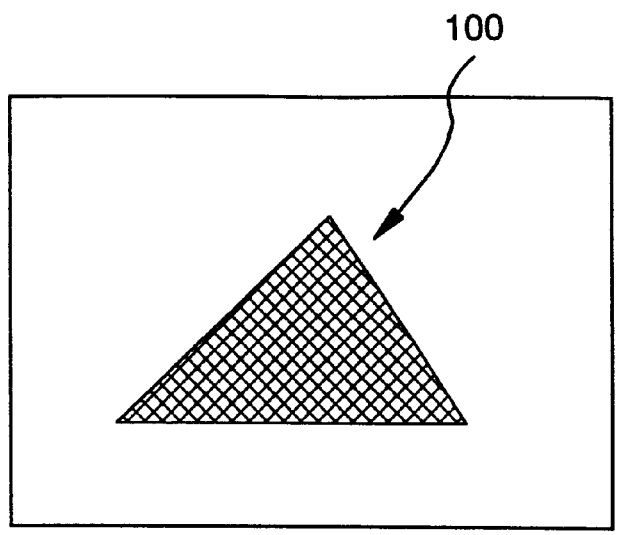
FIG. 5 is a view illustrating an example of a designated image in the first embodiment.

FIG. 5 is a view showing an example of the designated image 100. The designated image 100 in FIG. 5 is a polygonal figure, and the designated image information is constituted by, e.g., the vertex positions, vertical and horizontal dimensions, area, color information, and the like of the designated figure. A unit region of the region description information is obtained by applying the image segmentation technique which is known to those who are skilled in the art to image data stored in the image files 109.

Figure 6:
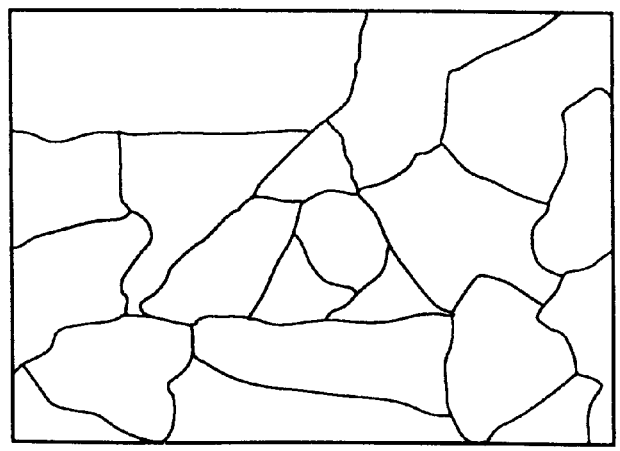
FIG. 6 is a view illustrating an example of the segmentation result of image data to be tested.

FIG. 6 is a view illustrating an example of the image segmentation results of image data to be tested. Note that the region description information includes the edge point positions, start point, vertical and horizontal dimensions, area, average color information, and the like of each region.

In FIG. 4, reference numeral 301 denotes a color information discrimination section; 302, a size information discrimination section; 303, a movable region calculation section; and 304, a region information discrimination section.

The color information discrimination section 301 calculates the color information difference on the basis of the input designated image 100 and the region description information of image data to be searched. If the difference is larger than a predetermined threshold value, the section 301 determines a non-coincidence therebetween (i.e., the region does not become a portion of the designated image), and excludes the region from those to be matched. The color information difference can be calculated by the following equation:

$$D=|R-r|+|G-g|+|B-b|$$

where (R, G, B) is the color of the designated image 100, and (r, g, b) is the color of a region of image data.

The size information discrimination section 302 compares the vertical and horizontal dimensions of the designated image 100 and those of the regions of image data. For example, if the vertical or horizontal dimension of one of the divided regions shown in FIG. 6 is larger than the vertical or horizontal dimension of the designated image 100, the section 302 determines a non-coincidence therebetween (i.e., the region does not become a portion of the designated image), and excludes the corresponding region from those to be matched.

When the color information discrimination section 301 and the size information discrimination section 302 do not determine a non-coincidence, the movable region calculation section 303 calculates a movable region representing a moving range which is included in the designated image 100 when the designated image 100 is translated for each region of the region description information of images to be matched. The region information discrimination section 304 discriminates if the calculated movable region is an empty region. If the movable region is empty, the section 304 determines a non-coincidence, and excludes the corresponding region from those to be searched. In this manner, only regions which can be included in the designated image 100 are selected as candidate regions to be matched.

Figure 7:
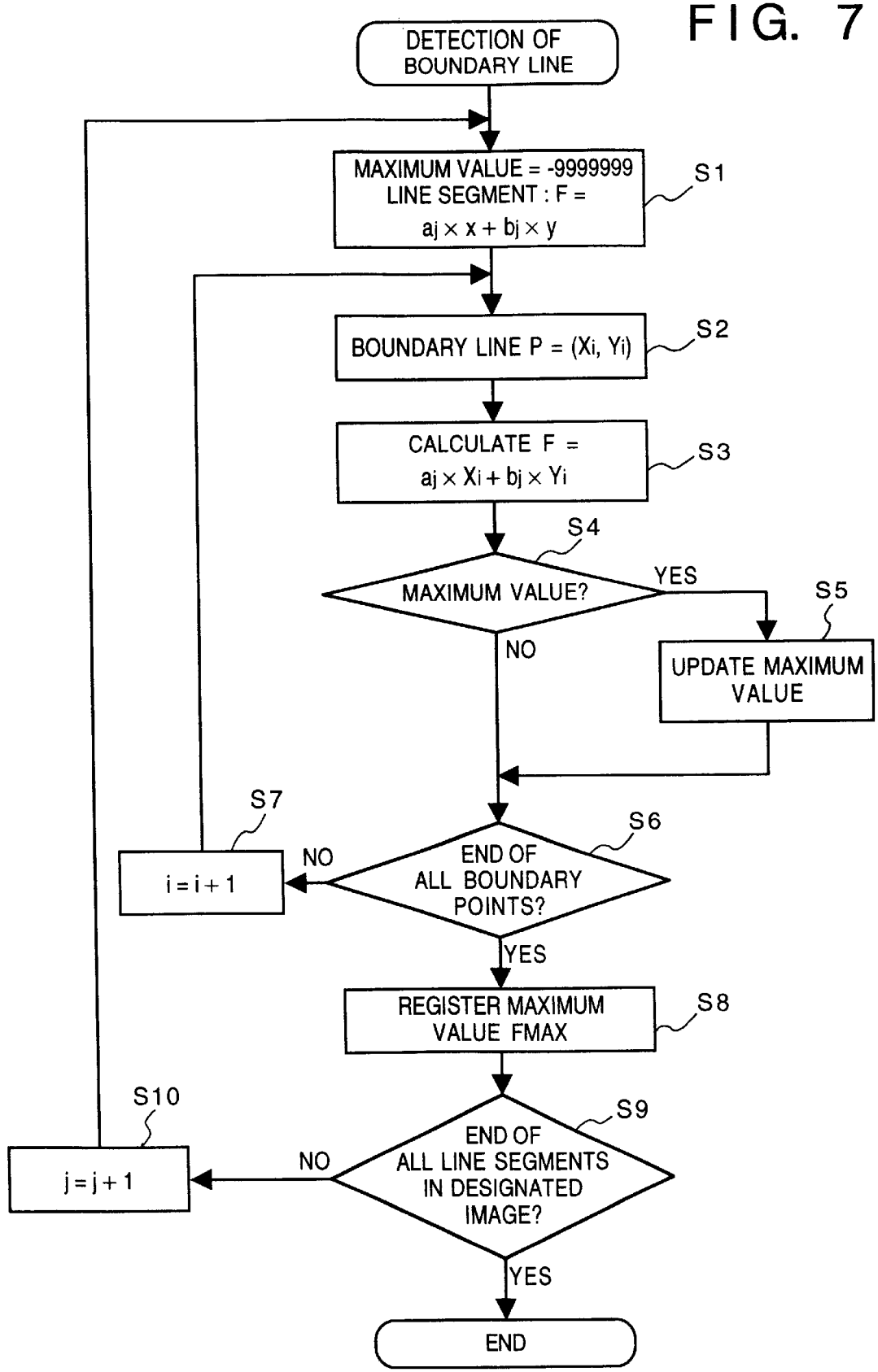
FIG. 7 is a flow chart showing the boundary line determination processing in a movable region calculation section in the first embodiment.

FIG. 7 is a flow chart showing the determination processing of a boundary line as a boundary of a movable region in the movable region calculation section 303 shown in FIG. 4.

In step S1, the maximum value is set to be "−9999999", and the equation of a line segment F is set to be $F=a_j \cdot x + b_j \cdot y$. The flow then advances to step S2, and from a vertex position Qj (j is an index corresponding to each vertex) of the designated image 100, a formula $a_j \cdot x + b_j \cdot y + c_j = 0$ of an edge line Ej connecting adjacent vertex point coordinate positions Qj and Qj+1 is obtained. Then, $F = a_j \cdot X_i + b_j \cdot Y_i$ is calculated using the coefficients (aj, bj) of the formula of the edge line Ej and the coordinates (Xi, Yi) of a boundary point Pi for a boundary point string Pi (i is an index corresponding to each point) of each region of image data shown in FIG. 6 (step S3). The flow advances to step S4 to calculate a maximum value FMAX(j) of F for the boundary point string of one region (since the vertex string of the designated image 100 must be arranged in the clockwise order, if the vertex string is arranged in the counterclockwise order, the vertex string is re-arranged in the reverse order in advance). If this maximum value is larger than the value calculated so far, the maximum value is updated in step S5. In step S6, it is checked if processing for all the boundary points P: is completed. If NO in step S6, the flow advances to step S7 to increment the index i by 1, and the flow then returns to step S2.

In this manner, when FMAX(j) which defines the boundary line $a_j \cdot x + b_j \cdot y − FMAX(j) = 0$ including all the points of the region boundary point string Pi is obtained, the FMAX is registered in step S8, and it is checked in step S9 if the above-mentioned processing is executed for all the edge lines Ej constituted by the vertex string of the designated image 100. If NO in step S9, the index j is incremented by 1 in step S10, and the flow returns to step S1, thereby obtaining all the boundary lines.

Figure 8:
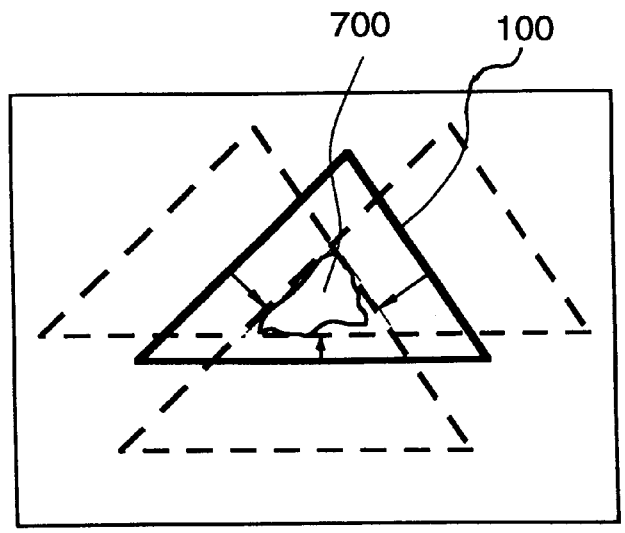
FIG. 8 is a view for explaining the boundary line detected in the boundary line determination processing shown in FIG. 7.

FIG. 8 is a view for explaining the processing result in the flow chart shown in FIG. 7. In FIG. 8, a limit range in which a central region 700 in FIG. 8 is included in the designated image 100 (FIG. 5) upon translation of the designated image 100 is indicated by arrows. The formula of each of lines indicated by these arrows is aj·x+bj·y−FMAX(j)=0.

The boundary point string Pi=(Xi, Yi) of the region 700 satisfies aj·Xi+bj·Yi≦FMAX(j) for the region 700 in the image shown in FIG. 8. Assuming a geometric parameter space having translation amounts (dx, dy) in the X- and Y-directions as axes, from aj·(x−dx)+bj·(y−dy)+cj=0, the formula corresponding to each edge line is aj·Xi+bj·Yi−FMAX(j)≦aj·(Xi−dx)+bj·(Yi−dy)+cj, and the translation amounts (dx, dy) must satisfy the following condition:

$$aj \cdot dx + bj \cdot dy - (cj + F\text{MAX}(j)) \leq 0$$

Figure 9:
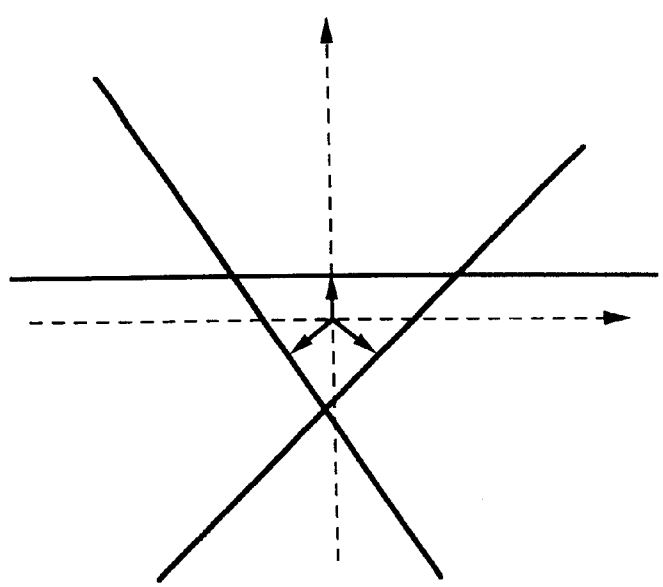
FIG. 9 is a view for explaining an example of a movable region as a single region in a geometric parameter space.

From this condition, by drawing boundary lines aj·dx+bj·dy−(cj+FMAX(j))=0 in the (dx, dy) space, the presence range of (dx, dy) satisfying the conditions for all the edge lines of the designated image 100 is obtained, as shown in, e.g., FIG. 9. If points (dx, dy) that satisfy the conditions for all the edge lines of the designated image 100 are not included in a given region of image data, i.e., the region is empty, it is determined that the region of image data to be searched does not fall within the designated image 100.

Figure 10:
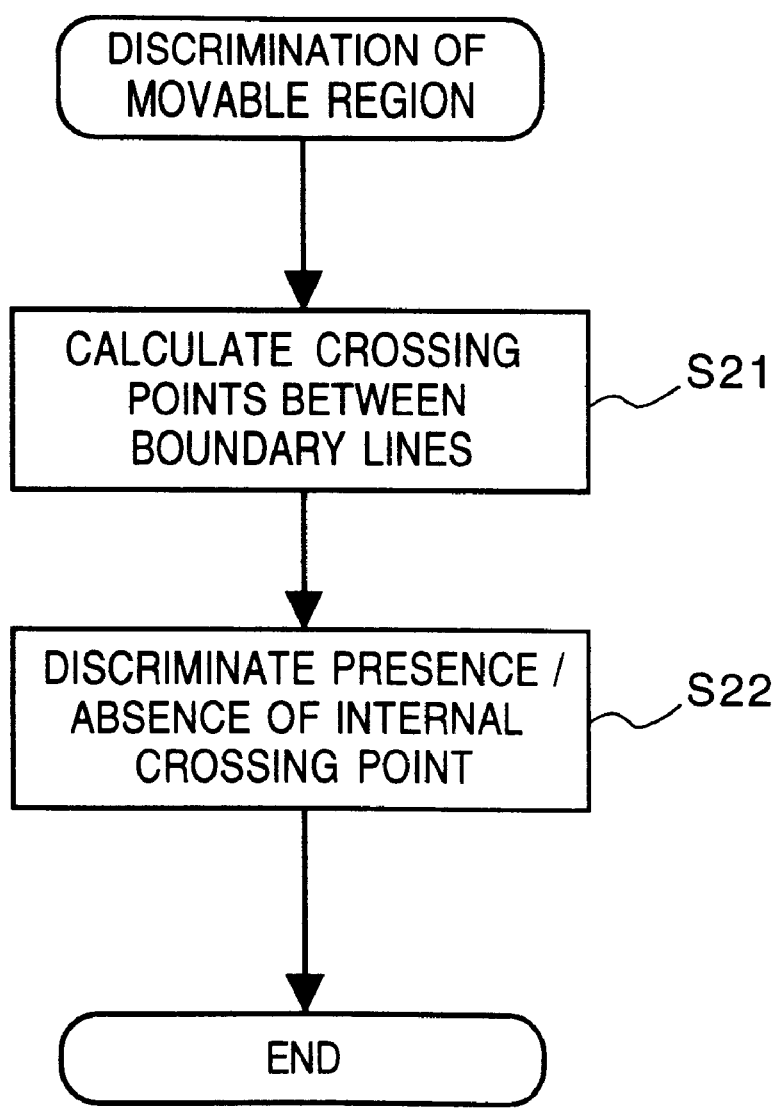
FIG. 10 is a flow chart showing the movable region discrimination processing in a region information discrimination section in the first embodiment.

FIG. 10 is a flow chart showing the processing for discriminating if a movable region is an empty region in the region information discrimination section 304 in FIG. 4.

In step S21, the positions of crossing points between the boundary lines in the (dx, dy) space are calculated. It is checked in step S22 if these crossing points include an internal crossing point that satisfies the conditions for all the edge lines of the designated image 100. If one of the crossing points between the boundary lines satisfies the conditions for all the edge lines of the designated image 100, it is determined that the movable region is not empty. Note that the position of each crossing point between the boundary lines is calculated by applying the solution of simultaneous equations to the formulas of two boundary lines.

Figure 11:
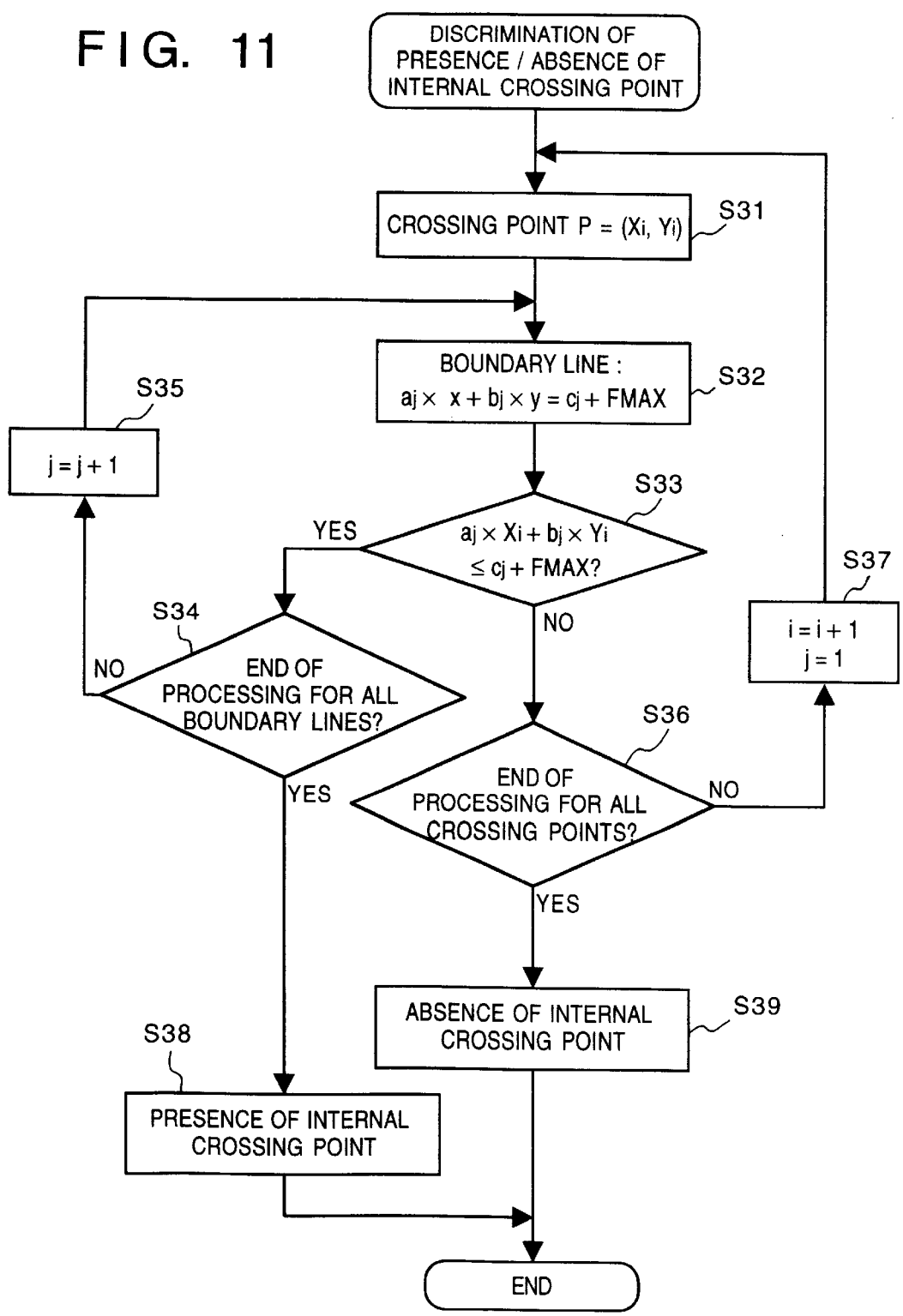
FIG. 11 is a flow chart showing the processing for discriminating the presence/absence of an internal crossing point in the movable region discrimination processing shown in FIG. 10.

FIG. 11 is a flow chart showing the flow of the processing for discriminating the presence/absence of an internal crossing point in step S22 in FIG. 10.

In step S31, a crossing point Pi=(Xi, Yi) between boundary lines is set. It is checked in turn for all the boundary lines if the set crossing point Pi satisfies a condition aj·Xi+bj·Yi≦cj+FMAX(j) for a boundary line Bj: aj·dx+bj·dy−(cj+FMAX(j))=0 (step S33). It is then checked in step S34 if the processing for all the boundary lines is completed. If the crossing point satisfies the conditions for all the boundary lines, it is determined in step S38 that an internal crossing point is present, thus ending the processing. If there is a condition which is not satisfied, the above-mentioned discrimination is repeated for the next crossing point.

It is checked in step S36 if the discrimination processing for all the crossing points is completed. If the presence of an internal crossing point is not determined after the discrimination processing for all the crossing points is completed, the flow advances to step S39 to determine that an internal crossing point is absent, thus ending the processing.

Figure 12:
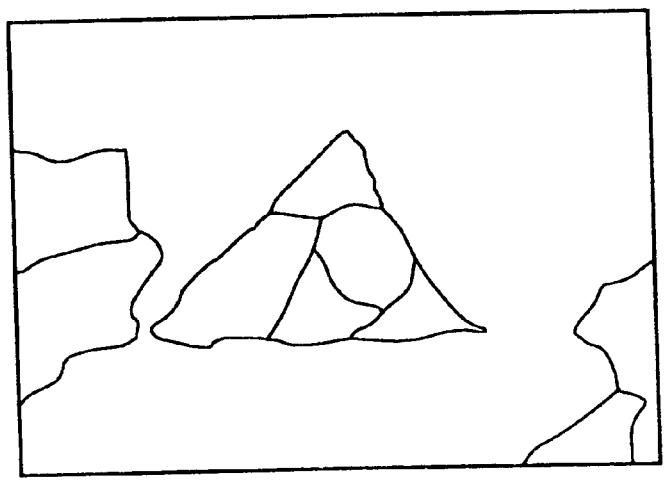
FIG. 12 is a view illustrating a compound region inserted in a single region memory.

As a result of the above discrimination, some regions are inserted in the single region memory 103, as shown in, e.g., FIG. 12.

Figure 13:
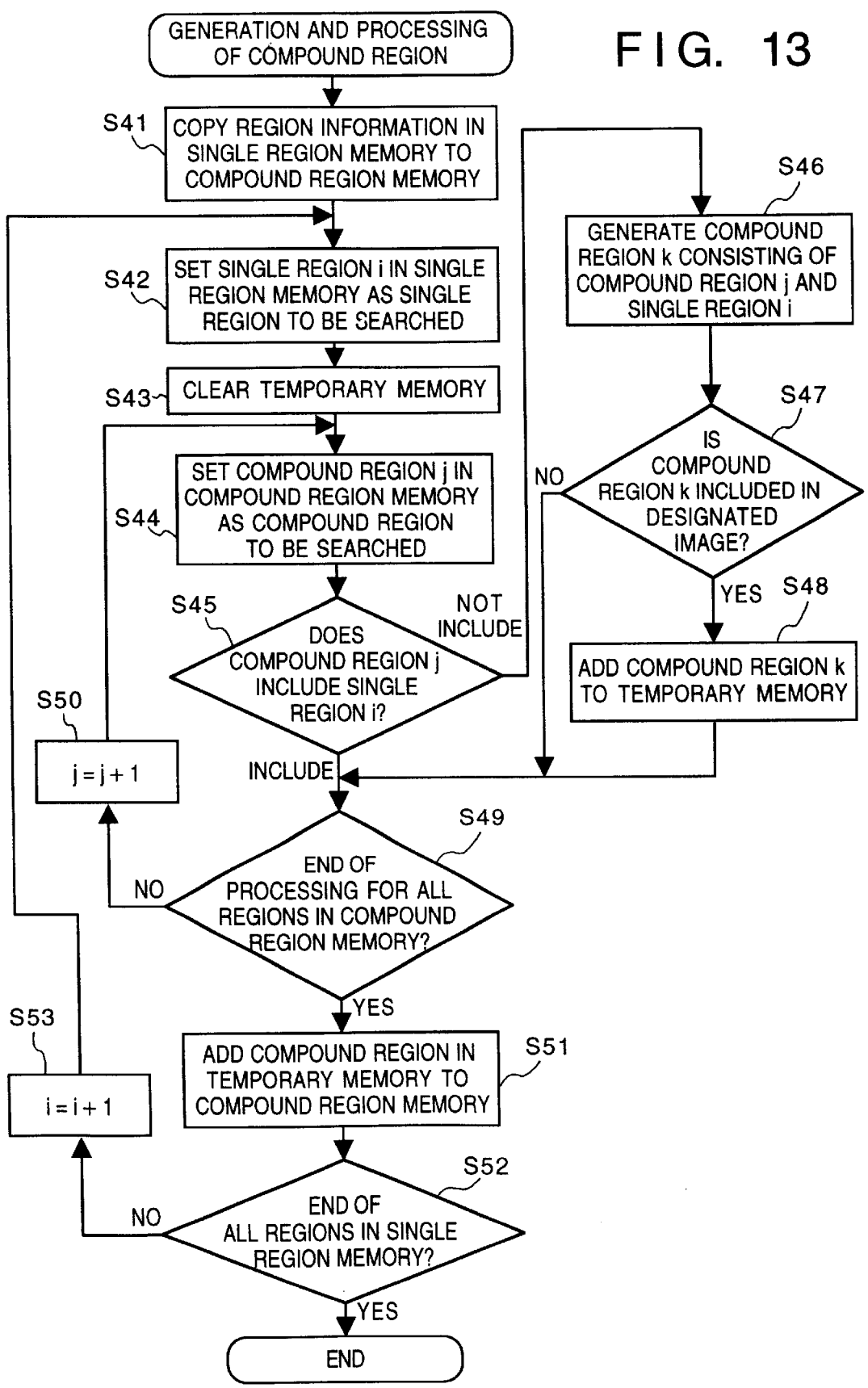
FIG. 13 is a flow chart showing the flow of generation and processing of a compound region in a compound region processing unit.

FIG. 13 is a flow chart showing the flow of the generation and processing of a compound region in the compound region processing unit 104 shown in FIG. 2. In this processing, a compound region as a combination of some pieces of region information in the single region memory 103 is generated, and is inserted in the compound region memory 105.

The system sets all the regions in the single region memory 103 as a compound region in the compound region memory 105 in step S41. The flow advances to step S42, and a single region i in the single region memory 103 is selected in turn. In step S43, a temporary memory in the search work area 32, which memory temporarily stores a compound region generated as a combination of the selected single region i and the compound region (including a copied single region) in the compound region memory 105, is cleared.

The flow advances to step S44, and a compound region j (including a copied single region) in the compound region memory 105 is selected in turn. In step S45, it is checked if the single regions constituting the selected compound region include the selected single region i. If NO in step S45, the flow advances to step S46 to generate a compound region k as a combination of these single regions. The flow then advances to step S47 to check if the compound region k is included in the designated image 100. If YES in step S47, the flow advances to step S48, and the compound region k is added to the temporary memory. The above-mentioned processing is repeated while incrementing the index j until it is determined in step S49 that the above processing is completed for all the compound regions in the compound region memory 105.

If it is determined in step S49 that the processing for all the compound regions is completed, the flow advances to step S51, and the compound region in the temporary memory is added to the compound region memory 105. Thereafter, the above-mentioned processing is repeated while repeating the index i in step S53 until it is determined in step S52 that the processing for all the regions in the single region memory 103 is completed.

Figure 14:
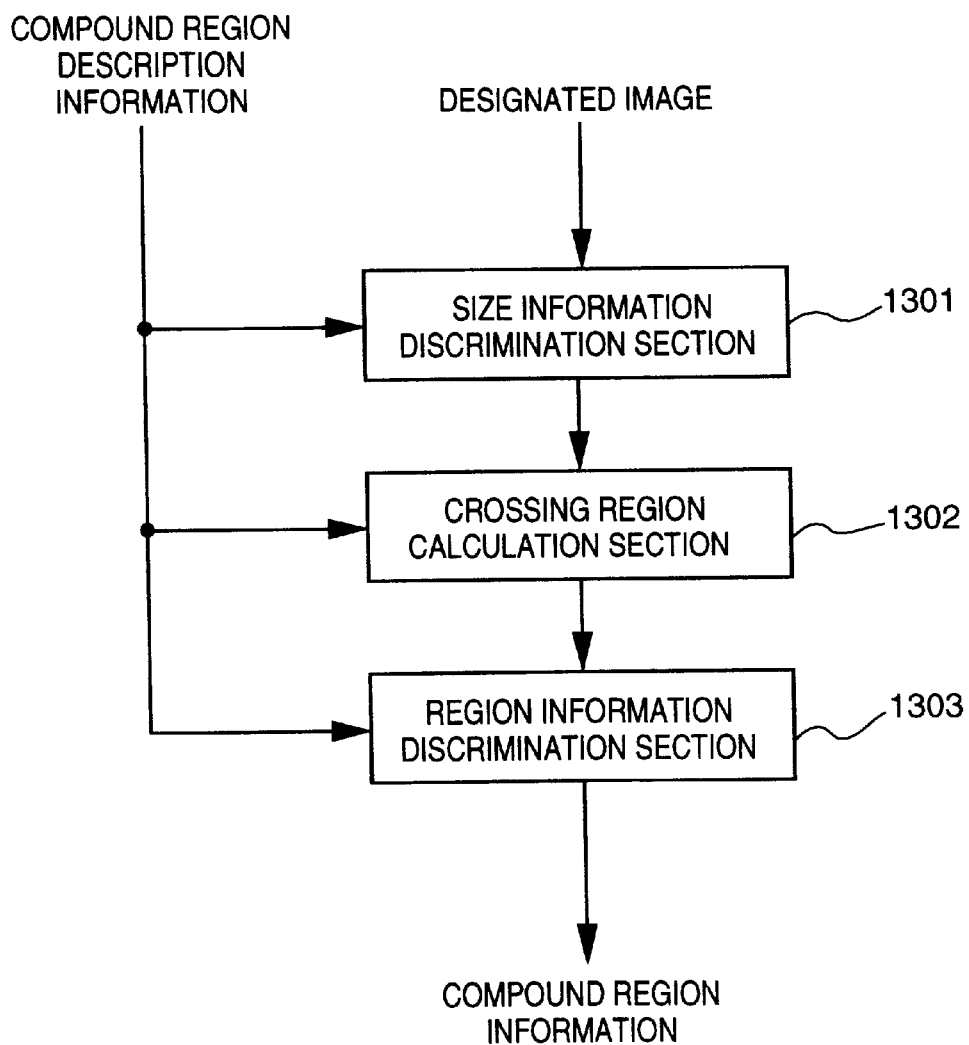
FIG. 14 is a functional block diagram showing the arrangement of the region information discrimination section for individual compound regions in the compound region processing unit of the first embodiment.

FIG. 14 is a functional block diagram showing the functional arrangement of the compound region processing unit 104 for discriminating if each compound region k is included in the designated image 100.

First, a size information discrimination section 1301 discriminates the size information of the compound region. The area of the compound region k corresponds to the sum of the areas of the single region i and the compound region j, and the start point and vertical and horizontal dimensions of the compound region k are determined in such a manner that the minimum value of the start points of the respective regions and the end points calculated based on the start points and the vertical and horizontal dimensions is determined as the start point, and the vertical and horizontal dimensions are calculated as the differences from the maximum value.

If the calculated area of the compound region k is larger than that of the designated image 100 or the vertical or horizontal dimension of the compound region k is larger than that of the designated image 100, it is determined that the compound region k is not included in the designated image 100, and the compound region k is excluded.

Then, in order to discriminate if the single region i and the compound region j constituting the compound region k are simultaneously present in the designated image 100, a crossing region calculation section 1302 calculates a crossing region of movable regions in the geometric parameter space having the translation amounts (dx, dy) of the single region i and the compound region j as axes, and a region information discrimination section 1303 discriminates if the calculated crossing region is empty.

As described above, the movable region in the (dx, dy) space is obtained from the following condition:

$$aj \cdot dx + bj \cdot dy - (cj + F\text{MAX}(j)) \leq 0$$

Therefore, the crossing region is defined by selecting a smaller one of the values FMAX(j) for the boundary lines of the respective regions corresponding to an identical edge line.

Whether or not a crossing region is empty is discriminated in the same manner as in a movable region for a single region, i.e., in the movable region discrimination operation and the internal crossing point presence/absence discrimination operation shown in FIGS. 10 and 11.

Figure 15:
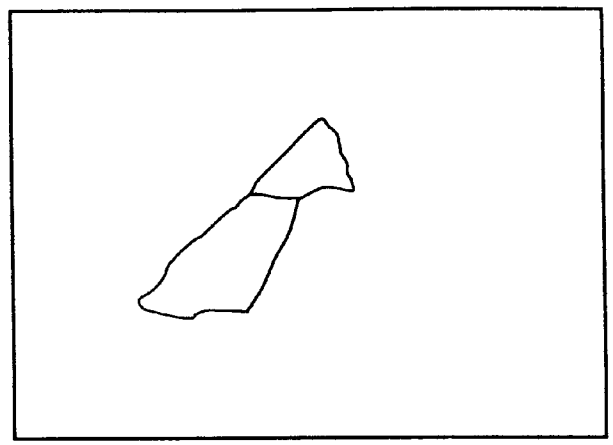
FIG. 15 is a view illustrating an example of a compound region in the first embodiment.
Figure 16:
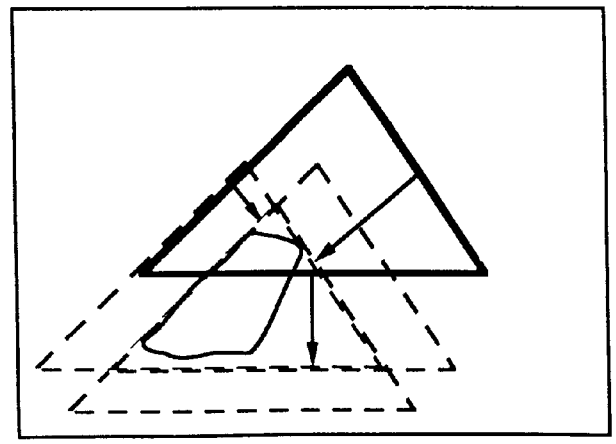
FIG. 16 is a view showing the boundary line of a region detected in the boundary line detection processing.
Figure 17:
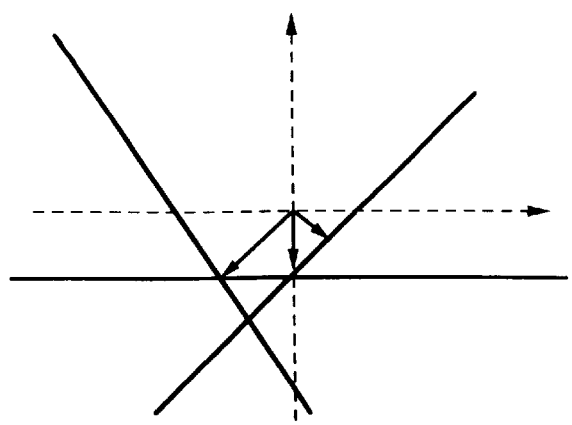
FIG. 17 is a view showing an example of a movable region as a single region in the geometric parameter space.

FIG. 15 shows an example of the compound region. FIG. 16 shows the boundary lines of another region paired with FIG. 8, and FIG. 17 shows the movable region in the (dx, dy) space paired with FIG. 9.

Figure 18:
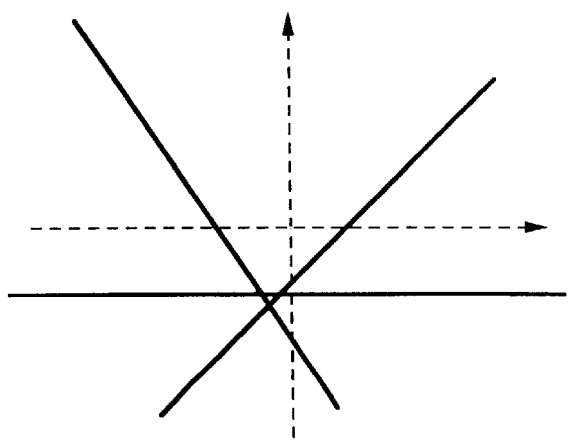
FIG. 18 is a view showing an example of a movable region as a compound region in the geometric parameter space.
Figure 19:
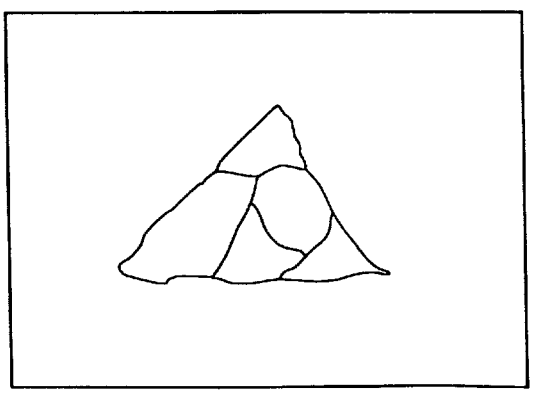
FIG. 19 is a view illustrating an example of a compound region obtained by the first embodiment.

With the above-mentioned flow of the compound region generation processing shown in FIGS. 13 and 14, FIG. 18 is obtained as a region in which the compound region shown in FIG. 15 is entirely present in the designated image 100 shown in FIG. 15. As a result of further discrimination of compound regions, a compound region shown in FIG. 19 can also be obtained.

The maximum value selection unit 106 shown in FIG. 2 calculates the similarity values of all the compound regions detected by the above-mentioned compound region processing unit 104 from one image, and obtains the maximum value of the calculated similarity values.

The similarity is calculated as follows.

Similarity=1−|area of compound region−area of designated image|/ area of designated image The maximum value selection unit 106 supplies the obtained maximum value as the similarity of the corresponding image to the sorting unit 107. The sorting unit 107 receives the similarity values for the respective images obtained by the maximum value selection unit 106, and sorts and selects K data in the descending order from the largest similarity value.

The image data access unit 108 reads out a plurality of image data in the descending order from the largest similarity value from the image files 109 using the sorted image similarity information stored in the internal memory of the sorting unit 107, and displays the readout image data on the display 111.

[Second Embodiment]

The second embodiment can cope with a case wherein the size of a designated image can be varied. The principle of the second embodiment will be explained below.

In the second embodiment, when a designated image is enlarged to have its origin as the center at an enlargement factor "scale" (reduction when scale<1), all the points P(x, y) on the boundary lines of the designated image move to points Q(scale·x, scale·y). If the formula of a straight line passing two points P0 and P on a boundary line before the enlargement is:

$$aj \cdot x + bj \cdot y + cj = 0$$

for $$aj = y0 - y$$

$$bj = x - x0$$

$$cj = x0 \cdot y - x \cdot y0$$

then the formula of a straight line passing two points Q0 and Q on a boundary line of the designated image after the enlargement is:

$$ak \cdot x + bk \cdot y + ck = 0$$

for $$ak = \text{scale} \cdot aj$$

$$bk = \text{scale} \cdot bj$$

$$ck = \text{scale} \cdot \text{scale} \cdot cj$$

This straight line is parallel to one before the enlargement. Therefore, a point which gives the maximum value FMAX for a boundary point string of an identical region remains the same. That is, $$FMAX(k) = ak \cdot X + bk \cdot Y = \text{scale} \cdot (aj \cdot X + bj \cdot Y)$$

$$= \text{scale} \cdot FMAX(j)$$

Division of the formula:

$$ak \cdot dx + bk \cdot dy - (ck + F\text{MAX}(k)) \leq 0$$

for giving an inclusion condition with "scale" yields:

$$aj \cdot dx + bj \cdot dy - (\text{scale} \cdot cj + F\text{MAX}) \leq 0$$

This constitutes one side of a plane upon assumption of a (dx, dy, scale) space.

Similarly, other edge lines before the enlargement are parallel to those after the enlargement, and a parameter region that can exist becomes a polyhedron contained in these planes (in practice, one side is infinity).

Therefore, by obtaining the crossing regions of the polyhedron, whether or not a plurality of regions can be simultaneously present in the designated image at an identical enlargement factor can be discriminated.

Figure 20:
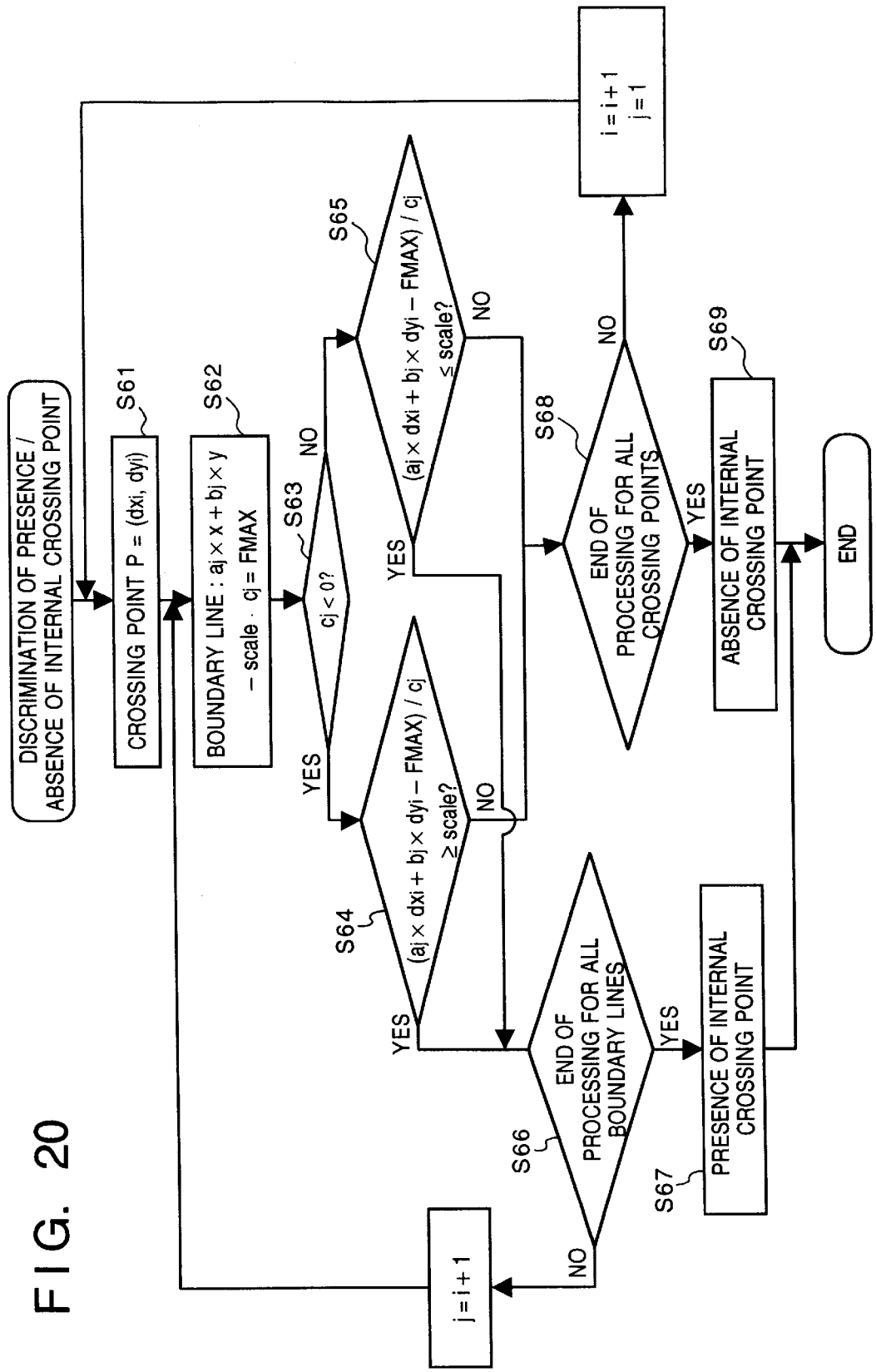
FIG. 20 is a flow chart showing the processing for discriminating the presence/absence of an internal crossing point in the second embodiment.

FIG. 20 is a flow chart showing an embodiment of the compound region processing unit 104 which can realize the above-mentioned principle.

First, a crossing point P(dxi, dyi) is set (S61), and aj, bj, and cj are calculated as described above for all edge lines j of the designated image in the (dx, dy) space satisfying:

$$aj \cdot dx + bj \cdot dy - (\text{scale} \cdot cj + F\text{MAX}) \leq 0$$

Then, FMAX is obtained by the operation shown in FIG. 7. In this manner, the formula of the boundary line is obtained (S62):

$$aj \cdot x + bj \cdot y - \text{scale} \cdot cj = F\text{MAX}$$

Next, all the crossing points P=(dxi, dyi) are calculated as crossing points of three non-parallel boundary planes, and it is checked if each of the calculated points satisfies the respective conditional formulas. The crossing point of the three boundary planes is calculated by solving the following simultaneous equations by a known solution of simultaneous equations:

$$ai \cdot dx + bi \cdot dy - (\text{scale} \cdot ci + F\text{MAX}(i)) = 0$$

$$aj \cdot dx + bj \cdot dy - (\text{scale} \cdot cj + F\text{MAX}(j)) = 0$$

$$ak \cdot dx + bk \cdot dy - (\text{scale} \cdot ck + F\text{MAX}(k)) = 0$$

where (i, j, k) are three different integers smaller than the number of edge lines of the designated image.

Whether or not the conditional formulas are satisfied can be discriminated using the following formulas:

$$(aj \cdot dx + bj \cdot dy - F\text{MAX})/cj \leq \text{scale if } cj > 0$$

$$(aj \cdot dx + bj \cdot dy - F\text{MAX})/cj \geq \text{scale if } cj < 0$$

If "scale" can be increased infinitely, a region having an arbitrary shape can be included. Thus, in practice, the variable range of "scale" is set to be equal to or smaller than a certain value, e.g. "1.2", and it is checked if an internal crossing point is present within this range. That is, $$(aj \cdot dx + bj \cdot dy - F\text{MAX})/cj \leq 1.2 \text{ if } cj > 0$$

$$(aj \cdot dx + bj \cdot dy - F\text{MAX})/cj \geq 1.2 \text{ if } cj < 0$$

With this processing, an appropriate correspondence can be obtained even when the size of the designated image varies.

In this manner, as in FIG. 11, when the conditions are satisfied for all the boundary lines, the flow advances from step S66 to step S67 to determine the presence of an internal crossing point. Otherwise, the flow advances from step S68 to step S69 to determine the absence of an internal crossing point.

[Third Embodiment]

The third embodiment of the present invention can cope with a case wherein a designated image is constituted by a plurality of regions with different colors.

Each of regions constituting a designated image has the following information: the vertex string of the designated image, and the vertical and horizontal dimensions, area, and color information of the region. In this case, the operation of the single region processing unit 102 shown in FIG. 4 is modified, as will be described below.

Figure 21:
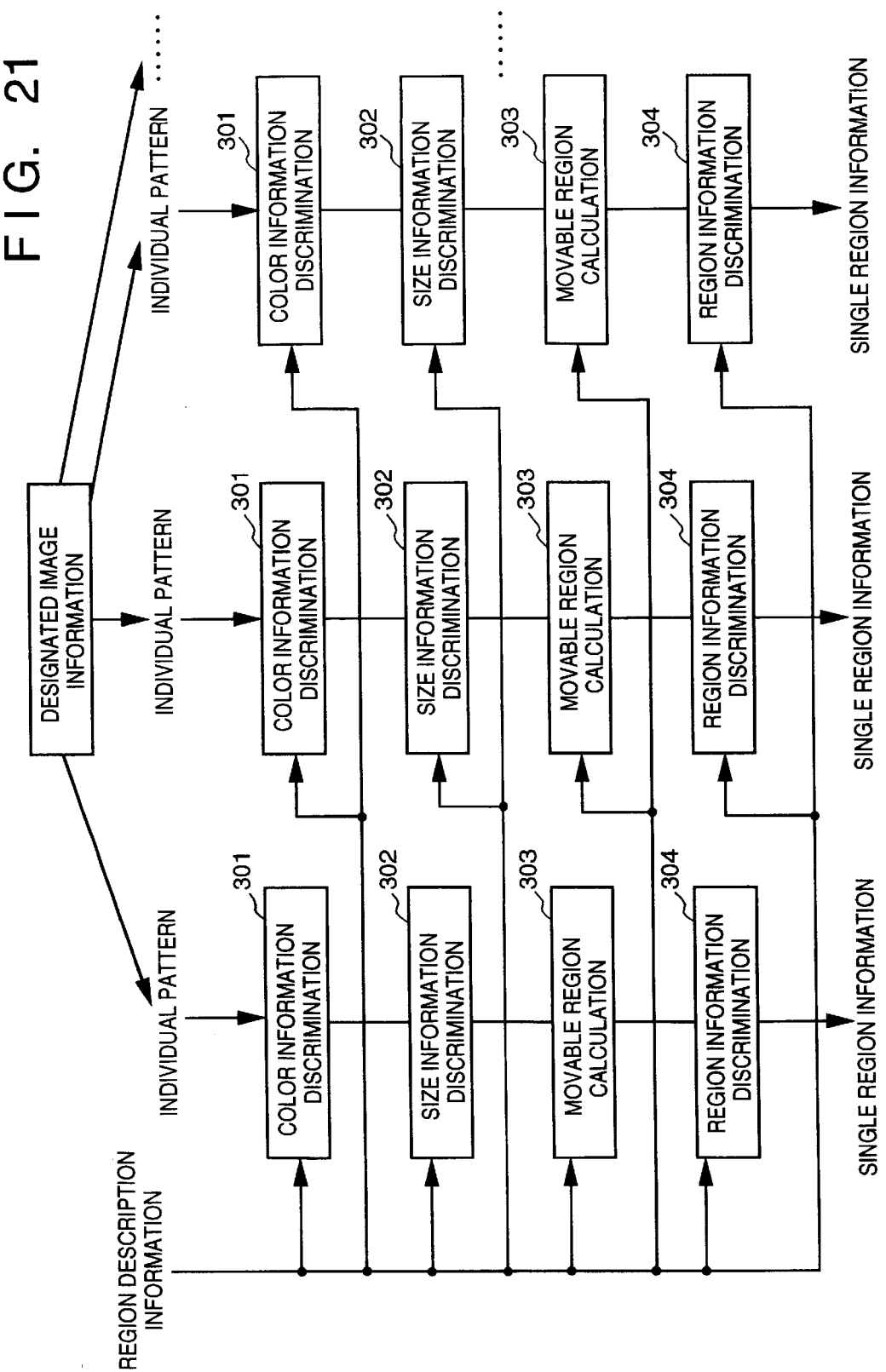
FIG. 21 is a functional block diagram showing the functional arrangement of a single region processing unit in the third embodiment.

FIG. 21 is a block diagram showing the arrangement of the single region processing unit 102 in the third embodiment.

The processing sequence corresponding to FIG. 4 is applied to a combination of region information of each of regions in the input designated image and that of each of regions in the image to be matched, and when all the conditions are satisfied, the description information of the region and the information of the movable region of the designated image are added to the single region memory 103. Thereafter, the above-mentioned compound region processing unit and the subsequent units are constituted, thereby realizing the search processing based on the designated image using a plurality of regions.

In FIG. 21, the color information discrimination 301, the size information discrimination 302, the movable region calculation 303, and the region information discrimination 304 are executed in units of patterns of the designated image, as shown in FIG. 4, thus obtaining single region information.

When a portion of an image is input as a designated image, the designated image is divided into a plurality of regions, a plurality of regions with different colors (a single color in each region) are generated by polygonal approximation of the boundary lines of the regions, thus generating a plurality of images (figures). As a result, even when a portion of an image is input as a designated image, image data including the designated image can be retrieved using these image portions.

As described above, according to this embodiment, since processing for a compound region as a combination of a plurality of regions is performed together with processing for a single region, an image to be searched which is divisionally extracted as a plurality of regions can be correctly matched.

In addition, a movable region in which each region has a specific phase relationship with the designated image is calculated, and the presence/absence of a crossing region of the movable regions is discriminated, thus allowing efficient discrimination.

[Fourth Embodiment]

Figure 22:
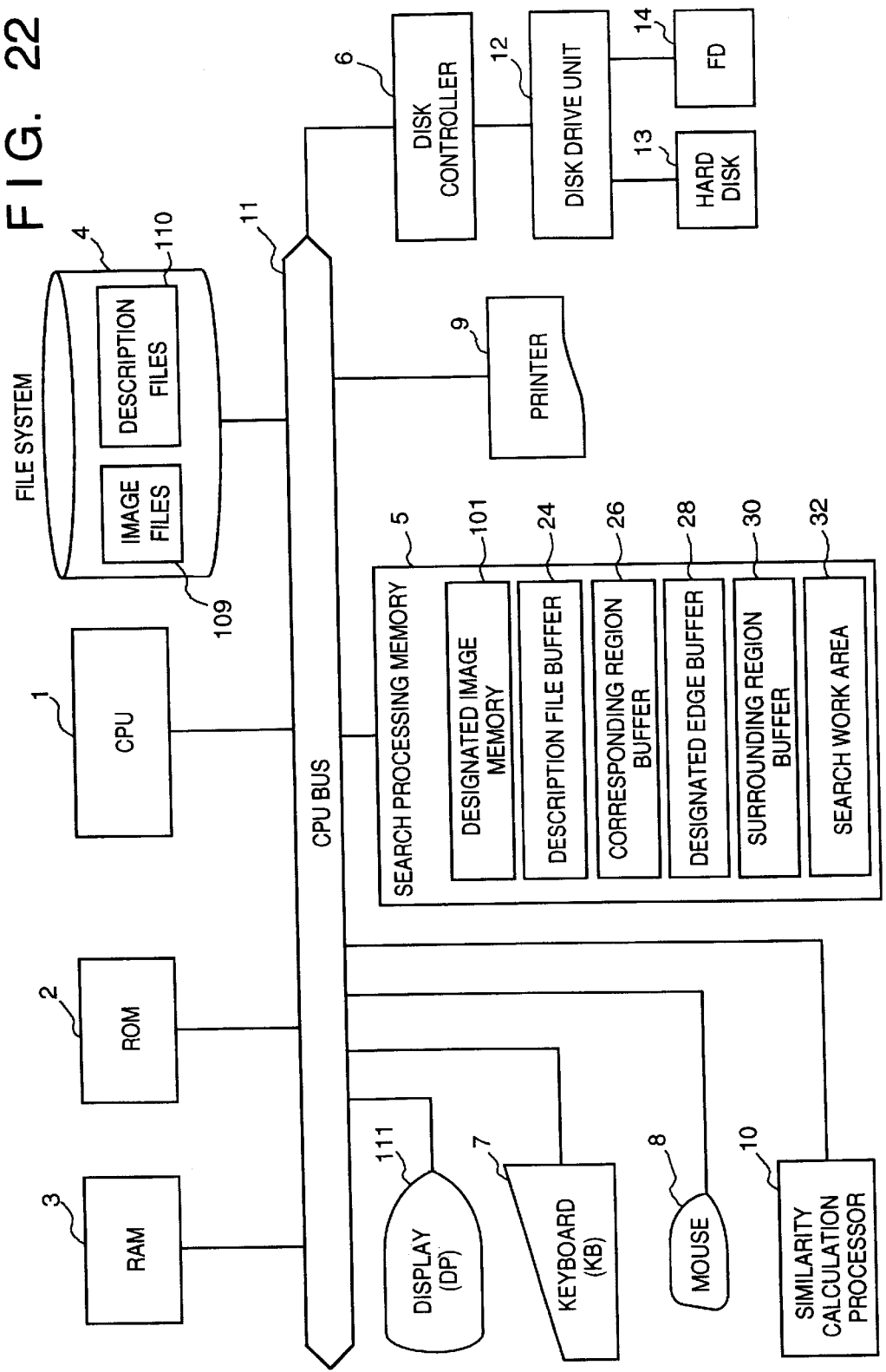
FIG. 22 is a block diagram showing the arrangement of an interactive image processing apparatus comprising an image retrieval function according to the fourth embodiment.

FIG. 22 is a block diagram showing the arrangement of an interactive image processing apparatus comprising an image retrieval function according to the fourth embodiment of the present invention. The same reference numerals in FIG. 22 denote the same parts as in FIG. 1, and a detailed description thereof will be omitted.

In the retrieval processing memory (SRM) 5, the designated image memory 101 for temporarily storing an image serving as a retrieval key required in retrieval processing to be described below, the description file buffer 24 for temporarily storing the contents of the description file 110, a corresponding region buffer 26 to be described in detail later, a designated edge buffer 28 to be described in detail later, a surrounding region buffer 30 to be described in detail later, and the search work area 32 are assured.

Figure 23:
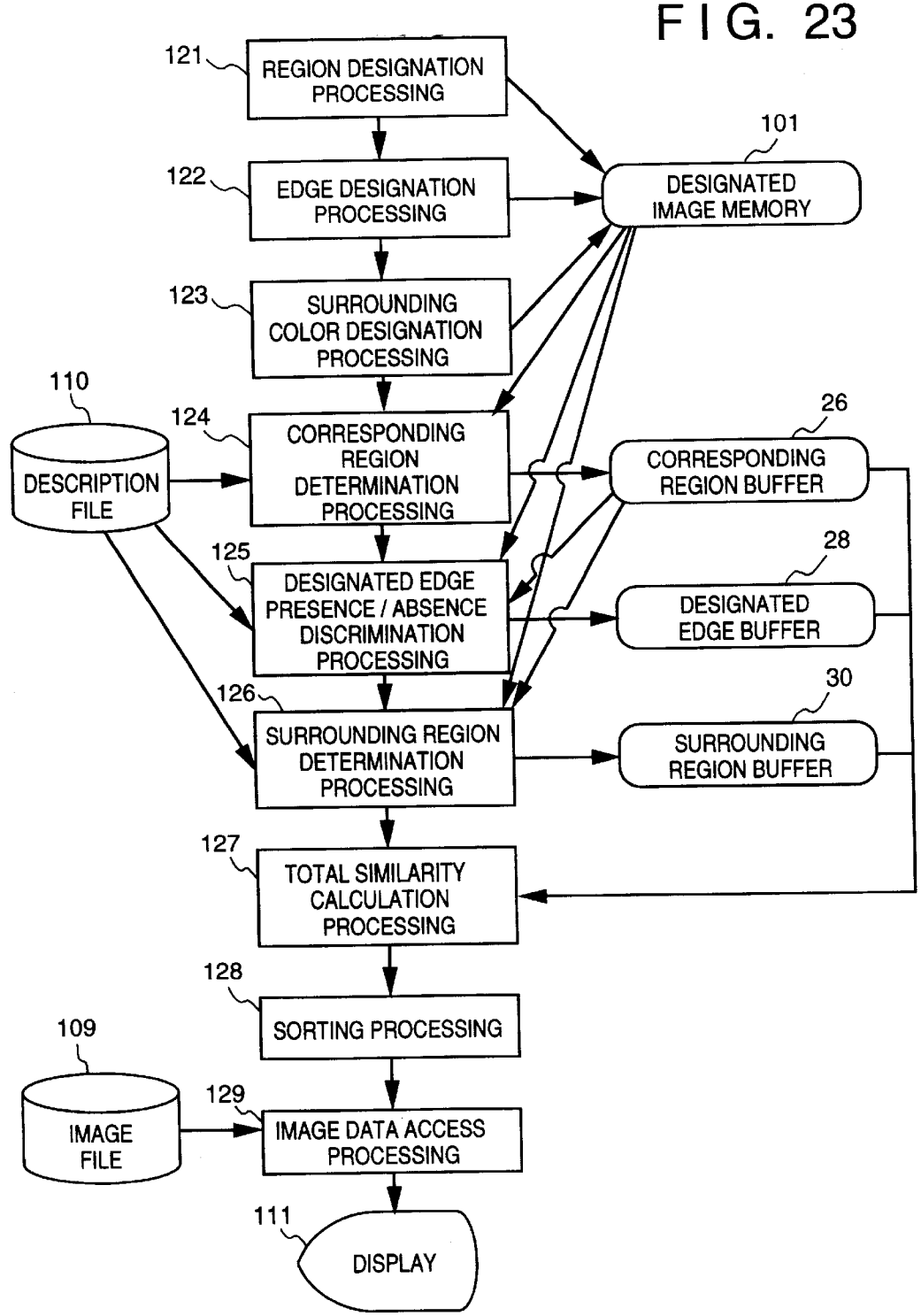
FIG. 23 is a schematic functional block diagram showing the functional arrangement of image retrieval processing of the fourth embodiment.

FIG. 23 is a schematic block diagram showing the image retrieval processing of the fourth embodiment.

Referring to FIG. 23, reference numeral 121 denotes region designation processing for designating a region representing one portion of a given image; 122, edge designation processing for designating a portion of an edge of the designated region as an edge which is also present in image data (to be referred to as images to be searched hereinafter) in the image files 109 to be matched; and 123, surrounding color designation processing for designating surrounding color information of the designated region. The region designation processing 121, the edge designation processing 122, and the surrounding color designation processing 123 are executed by a searcher in a man-machine interactive manner by operating the keyboard (KB) 7 and the mouse 8 with reference to an image displayed on the display (DP) 111. The designated image generated by these processing operations is stored in the designated image memory 101.

The above-mentioned processing will be described in detail below with reference to FIGS. 3 and 24.

Using the above-mentioned screen shown in FIG. 3, the searcher draws a figure pattern of an image to be searched for on the figure input window 201 by operating the mouse 8. More specifically, the searcher designates a region serving as a partial image of the image to be searched for by a polygon, and designates its color from the color palette 204. These operations correspond to the region designation processing 121. Then, the searcher selects and designates some of the sides of the designated polygon as edges, which may also be present in images to be searched, by clicking the mouse 8. If there is no corresponding edge, the searcher need not perform designation. This operation corresponds to the edge designation processing 122. Then, the searcher selects the background of the figure using the mouse 8, and designates a color as the background color of the region from the color palette 204. This operation corresponds to the surrounding color designation processing 123.

Figure 24:
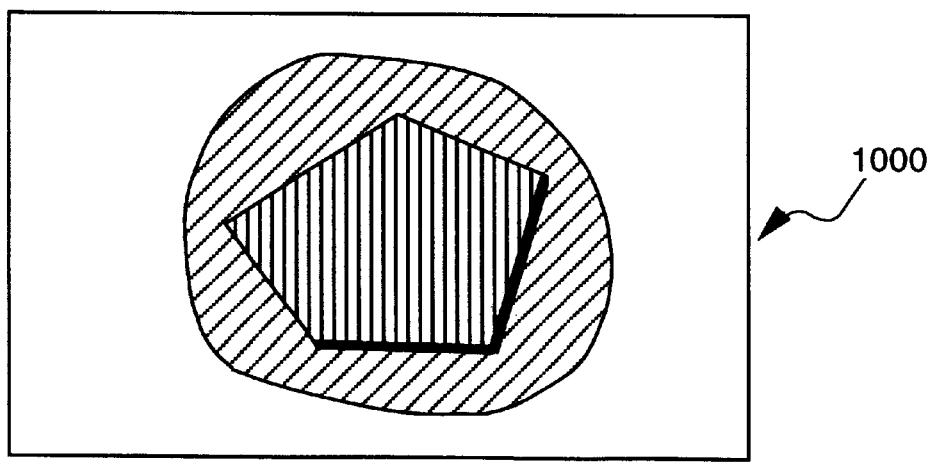
FIG. 24 is a view showing an example of a generated figure pattern (designated image)

FIG. 24 shows an example of a figure pattern (designated image) 1000 generated as described above.

Referring to FIG. 23, reference numeral 124 denotes corresponding region determination processing for calculating the similarity between the designated image 1000 and a candidate region in an image to be searched corresponding to a region of the designated image 1000 with reference to the features of image data stored in the description files 110, and storing information of the candidate region having a high similarity in the corresponding region buffer 26; 125, a designated edge presence/absence discrimination processing for discriminating the presence/absence of an edge in an image to be searched corresponding to the edge of the designated image 1000 with reference to the features of image data stored in the description files 110, and storing the discrimination result as designated edge information in the designated edge buffer 28; and 126, surrounding region determination processing for determining a region in an image to be searched corresponding to the surrounding region of the designated image 1000 with reference to the features of image data stored in the description files 110, and storing information of the surrounding region as surrounding region information in the surrounding region buffer 30.

Furthermore, reference numeral 127 denotes total similarity calculation processing for calculating the total similarities between the designated image 1000 and the respective images on the basis of the information stored in the corresponding region buffer 26, the designated edge buffer 28, and the surrounding region buffer 30; 128, sorting processing for receiving the total similarities between the designated image 1000 and the respective images, and selecting a predetermined number of (K) image data in the descending order from the largest similarity value; and 129, image data access processing for accessing the image files 109 using the similarity information of the images sorted by the sorting processing 128 to read out K image data in the descending order from the largest similarity value, and displaying the readout image data on the display 111.

The corresponding region determination processing 124, the designated edge presence/absence discrimination processing 125, the surrounding region determination processing 126, and the total similarity calculation processing 127 will be respectively described in detail below with reference to the flow charts shown in FIGS. 25 to 29.

Figure 25:
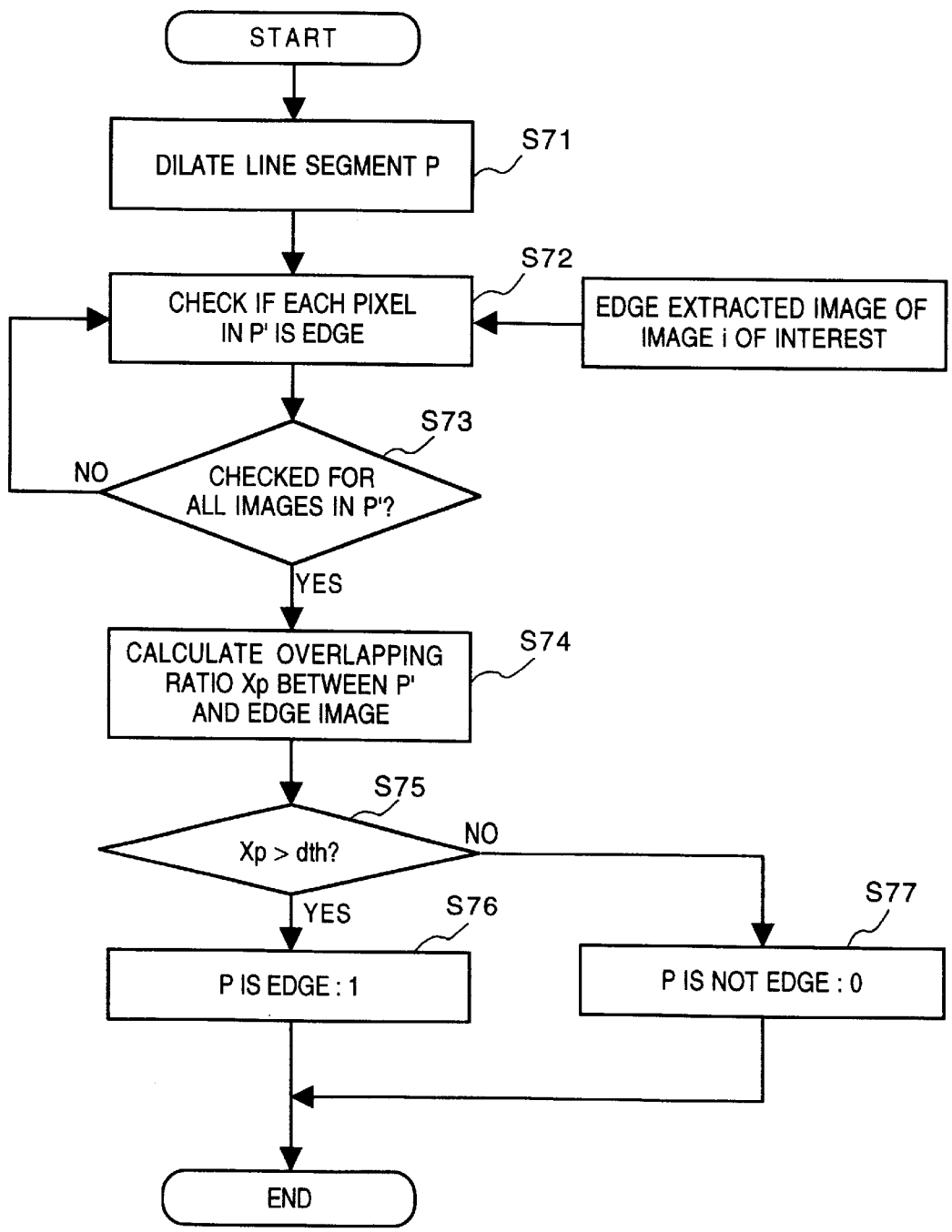
FIG. 25 is a flow chart showing the details of the edge information acquisition processing.
Figure 26:
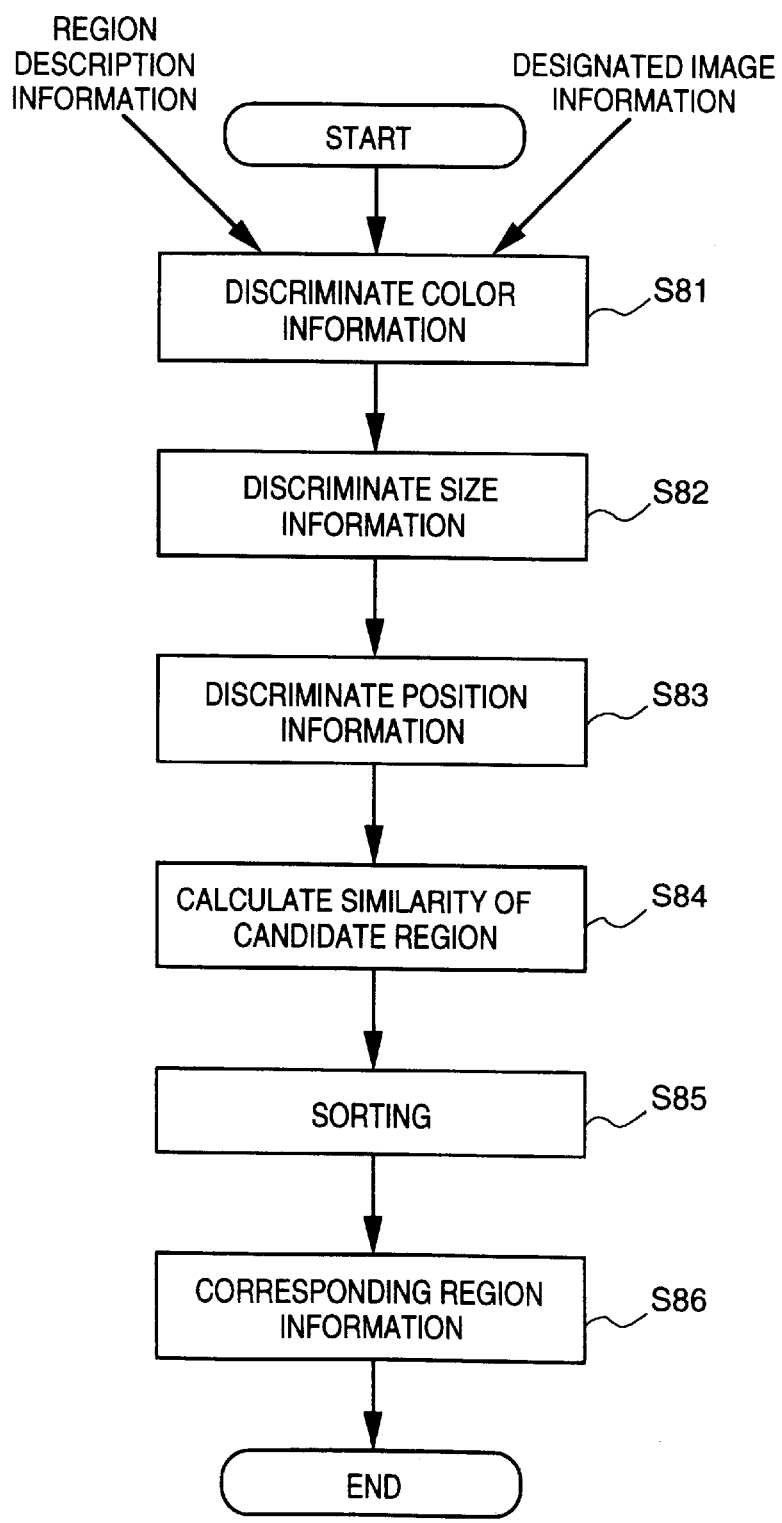
FIG. 26 is a flow chart showing the details of the corresponding region determination processing.

Corresponding Region Determination Processing (FIGS. 25 and 26)

In this processing, some regions corresponding to those of the designated image 1000 are selected as candidate regions with reference to the designated image 1000 or figure which is input by the searcher and stored in the designated image memory 101, the areas, boundary point coordinate strings, and color average values of respective regions of image data in the image files 109, and the coordinate strings and the like of respective edges stored in the description files 110, and the description information (stored in the description files 110) of each candidate region and the similarity between the candidate region and the designated image 1000 are output to the corresponding region buffer 26.

The region description information of image data obtained from the description files 110 includes the vertical and horizontal dimensions, area, average color information, and baricentric coordinate position of each region, the coordinate positions of vertices at the two ends of a portion obtained by polygonal approximation of the edges of the region, and edge information ("1" if the line segment is an edge; "0" if the line segment is not an edge) indicating whether or not each line segment is an edge. Note that a unit region of the region description information is obtained by applying known region division processing to an image. Linear approximation of the edge lines of divided regions is attained by known linear approximation processing (for example, Y. Kurozumi, "Polygonal approximation by the minimax method", Computer Graphics and Image Processing, Vol. 19, pp. 248–264 (1982)).

In order to obtain the edge information indicating whether or not each line segment is an edge, processing shown in FIG. 25 is performed. In this processing, it is checked if a line segment P as one of line segments indicating an edge of a given region in an image (i) is an edge, and if the line segment P is an edge, "1" is set; otherwise, "0" is set.

In step S71, the line segment P is dilated by a predetermined number of pixels by known dilation processing. This line segment will be referred to as an inflated line segment P' hereinafter. In steps S72 and S73, it is checked for all the pixels of the inflated line segment P' if the pixel of interest is an edge in an edge image. For this purpose, the edge image must be extracted in advance from the image (i) by edge extraction processing. The edge extraction processing may use a known method.

In this manner, the overlapping ratio (xp) between the inflated line segment P' and the edge image is calculated in step S74. If it is determined in step S75 that the ratio (xp) is equal to or larger than a predetermined threshold value (dth), it is determined that the line segment P is an edge, and the flow advances to step S76 to set "1" as the edge detection result; if it is determined in step S75 that the ratio (xp) is smaller than the threshold value, it is determined that the line segment P is not an edge, and the flow advances to step S77 to set "0" as the edge detection result.

The designated image information stored in the designated image memory 1000 is associated with the designated image 1000 (figure) generated as described above with reference to FIG. 3, and includes the vertical and horizontal dimensions, area, color information, and baricentric coordinate position of the figure, the coordinate positions of vertices at the two ends of a side of the designated figure, edge information ("1" if the side is designated as an edge; "0" if the side is not designated as an edge) indicating if each side is designated as an edge, and color information of a surrounding region.

In consideration of the above description, the corresponding region determination processing 124 will be described in detail below with reference to the flow chart in FIG. 26.

In step S81, a color information difference (Dc) is calculated on the basis of the input designated image information and the region description information in the description files 110. If the difference (Dc) is larger than a predetermined threshold value, a non-coincidence (the region of interest does not become a corresponding candidate region of the designated image 1000) is determined, and the region of interest is excluded from corresponding candidate regions. The color information difference (Dc) can be calculated based on the following equation:

$$Dc=|R-r|+|G-g|+|B-b|$$

where R, G, and B are the color component values of the designated image, and r, g, and b are the color component values of a candidate region.

In step S82, the vertical and horizontal dimensions of each of the regions which are not excluded in the processing in step S81 are compared with those of the designated image 1000. If the difference between the vertical or horizontal dimension of the candidate region of interest and that of the designated image 1000 is larger than a threshold value, a non-coincidence is determined, and the region of interest is excluded from the candidate regions. In this comparison, a value defined by $Ds=|W-w|+|V-v|$ (w and v are the vertical and horizontal dimensions of the designated image 1000, and W and V are those of the candidate region) is compared with a predetermined threshold value.

Furthermore, in step S83, the baricentric coordinate position of each of the regions which are not excluded in the processing in step S82 is compared with that of the designated image 1000. If the x- or y-coordinate value of the difference between the two positions is farther than a predetermined threshold value, a non-coincidence is determined, and the region of interest is excluded from the candidate regions. In this comparison, a value defined by $Dp=|X-x|+|Y-y|$ ((x, y) is the baricentric coordinate position of the designated image 1000, and (X, Y) is that of the candidate region) is compared with the predetermined threshold value.

For each of regions which are left as candidate regions in the processing operations in steps S81 to S83, a similarity (S) with the designated image 1000 is calculated in step S84 in accordance with the following equation:

$$S=-(A \cdot Dc+B \cdot Ds+C \cdot Dp)$$

where A, B, and C are respectively weighting coefficients.

In step S85, the plurality of similarity values (S) are sorted in the descending order. In step S86, K regions are selected as candidate regions in the descending order from the maximum value, and their description information and similarity values are stored in the corresponding region buffer 26.

With the above-mentioned processing, since the similarity values of K regions are obtained in association with the image (i), each similarity is represented by Srij in the following description.

To summarize the above-mentioned processing, the number of candidates is decreased by excluding regions when the regions do not satisfy candidate conditions of corresponding regions in the color information discrimination processing in step S81, the size information discrimination processing in step S82, and the position information discrimination processing in step S83. The similarities between the remaining candidate regions and the designated image 1000 are calculated in step S84, and are sorted in step S85. In step S86, K regions are selected as corresponding candidate regions in the descending order from the largest similarity value, and their description information and similarity values are stored in the corresponding region buffer 26.

Figure 27:
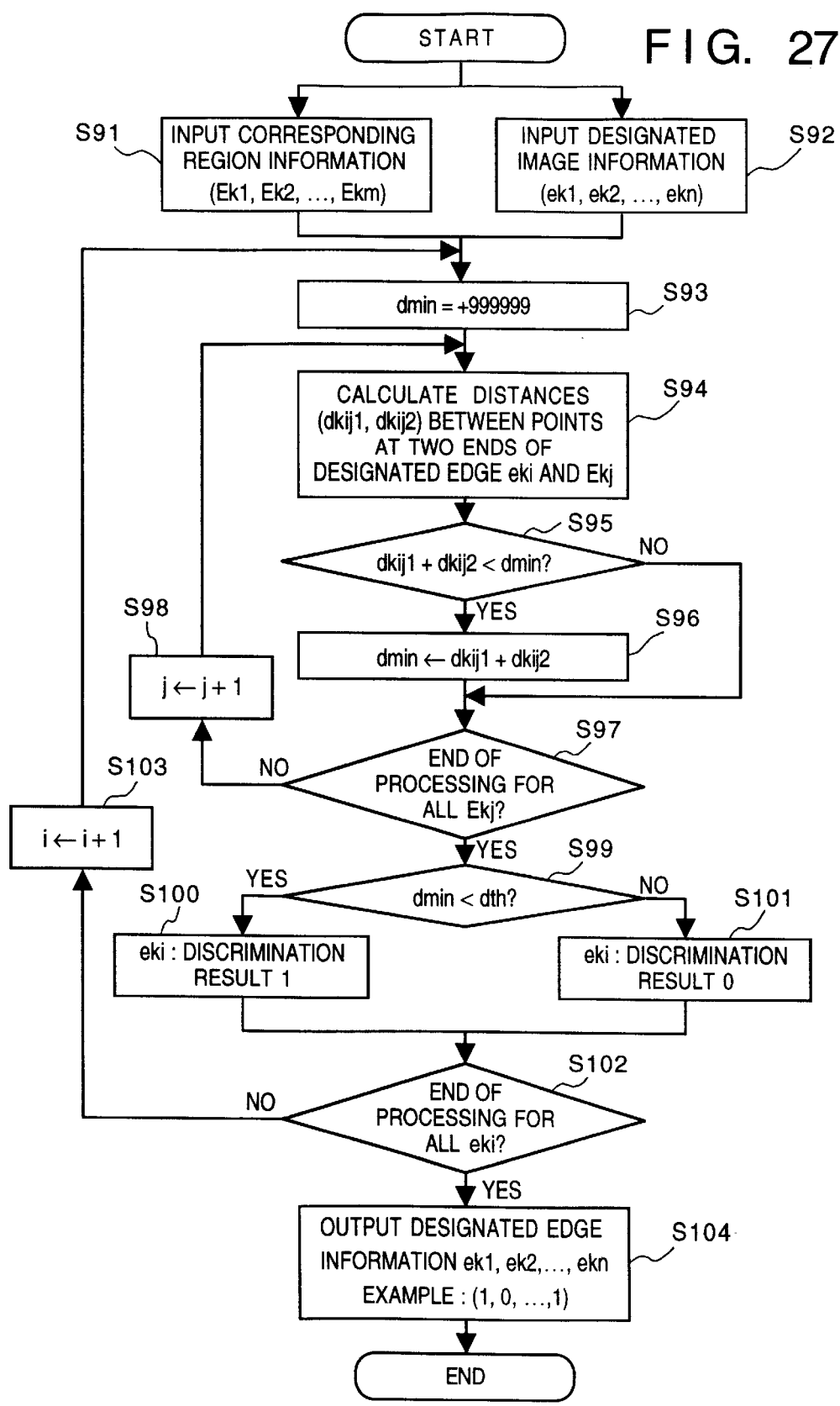
FIG. 27 is a flow chart showing the details of the designated edge presence/absence discrimination processing.

Designated Edge Presence/absence Discrimination Processing (FIG. 27)

In this processing, whether or not an edge corresponding to the edge pattern of the designated image 1000, which is designated by the searcher, is present in an image to be searched is checked with reference to the edge information stored in the designated image memory 101, each corresponding candidate region information stored in the corresponding region buffer 26, and the description files 110, so as to calculate information such as the presence ratio of edges, and the calculated information is output to the designated edge buffer 28.

In the following description, a method of calculating designated edge information for each of K corresponding candidate regions (k: k=1, 2, . . . K) will be explained.

In step S91, only line segments corresponding to edge information value="1" are extracted from the corresponding region description information stored in the corresponding region buffer 26 (the number of extracted line segments is "m"), and are respectively defined as Ek1, Ek2, . . . , Ekm. On the other hand, in step S92, only line segments corresponding to edge information value="1" are extracted from the designated image information stored in the designated image memory 101 (the number of extracted line segments is "n"), and are respectively defined as ek1, ek2, . . . , ekn. Assume that all the line segments Ek1, Ek2, . . . , Ekm, and ek1, ek2, . . . , ekn have vertex coordinate data at the two ends.

In step S93, "+999999" is set in dmin as an initial value for calculating the minimum value (dmin) of distances between the two ends of the edge of the designated image and the line segment of a corresponding edge. In steps S94 to S98, a sum of the distances between the vertex coordinate positions at the two ends of a line segment eki of the designated image and each of all the edges (Ek1, . . . , Ekm) of the corresponding regions is calculated to obtain the minimum value (dmin) of the sum.

In step S99, the minimum value (dmin) is compared with a predetermined threshold value (dth). If dmin<dth, the flow advances to step S100 to determine that the line segment eki is present as an edge in the image to be searched, and "1" is set as the discrimination result. On the contrary, if dmin≧dth, the flow advances to step S101, and the line segment eki is not present as an edge in the image to be searched, and "0" is set as the discrimination result.

The flow advances to step S102 to check if discrimination of all the line segments eki of the designated image is completed. If NO in step S102, the flow advances to step S103 to increment the value i, and the flow returns to step S93 to continue the processing. On the other hand, if YES in step S102, the flow advances to step S104, and the obtained discrimination result information is output as designated edge information of the candidate regions to the designated edge buffer 28.

Figure 28:
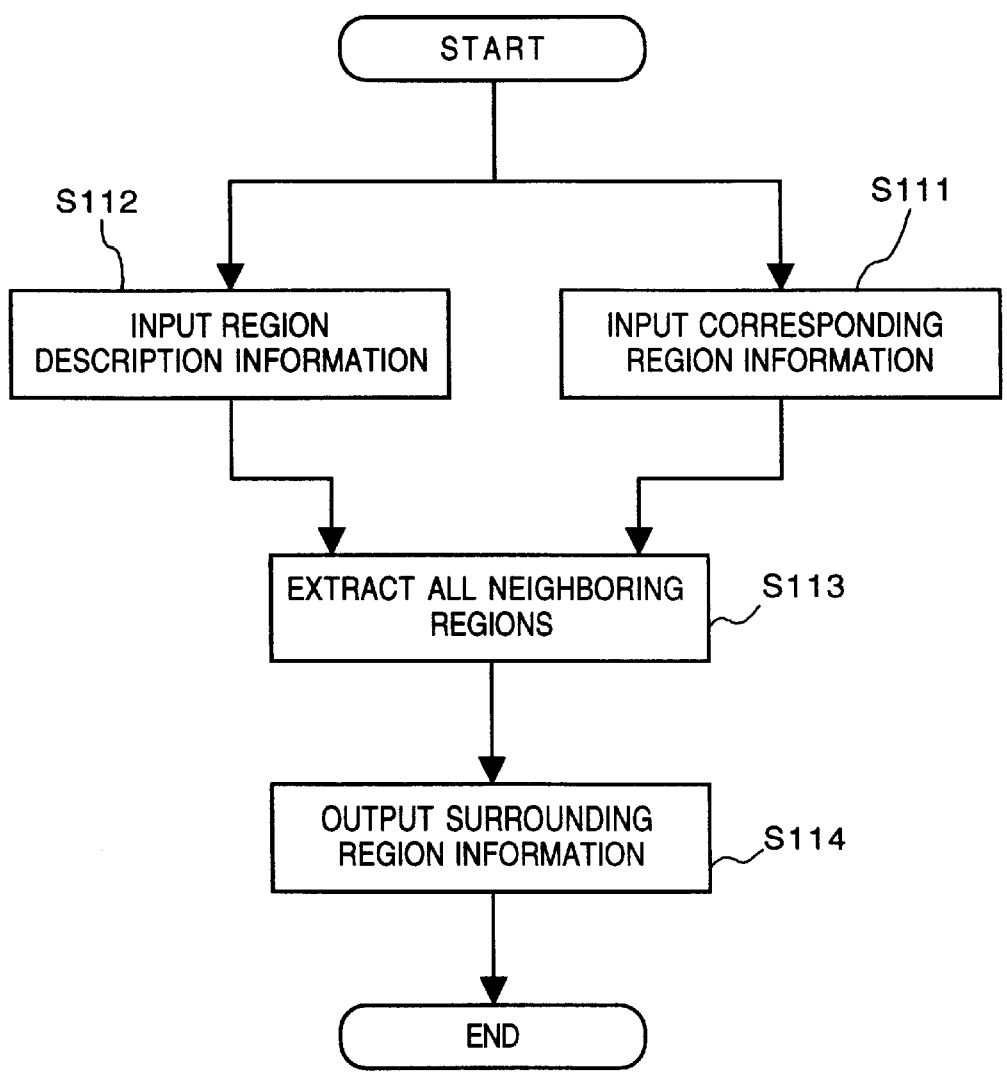
FIG. 28 is a flow chart showing the details of the surrounding region determination processing.

Surrounding Region Determination Processing (FIG. 28)

In this processing, the surrounding regions of each corresponding candidate region are determined with reference to each corresponding candidate region information stored in the corresponding region buffer 26, and the features of each region of image data in the image files 109, which features are stored in the description files 110, and the description information of the determined surrounding region is output.

In this case, the surrounding region information of each of K corresponding candidate regions (j: j=1, 2, . . . , K) in association with the image (i) is obtained.

The corresponding region information is input from the corresponding region buffer 26 in step S111, and the region description information of an image to be searched is input from the description files 110 in step S112. The flow then advances to step S113, and all neighboring regions of the corresponding candidate region (j) are obtained. These regions are defined as the surrounding regions of the corresponding candidate region (j). In step S114, the color information of each of these surrounding regions is stored in the surrounding region buffer 30 as surrounding region information.

Figure 29:
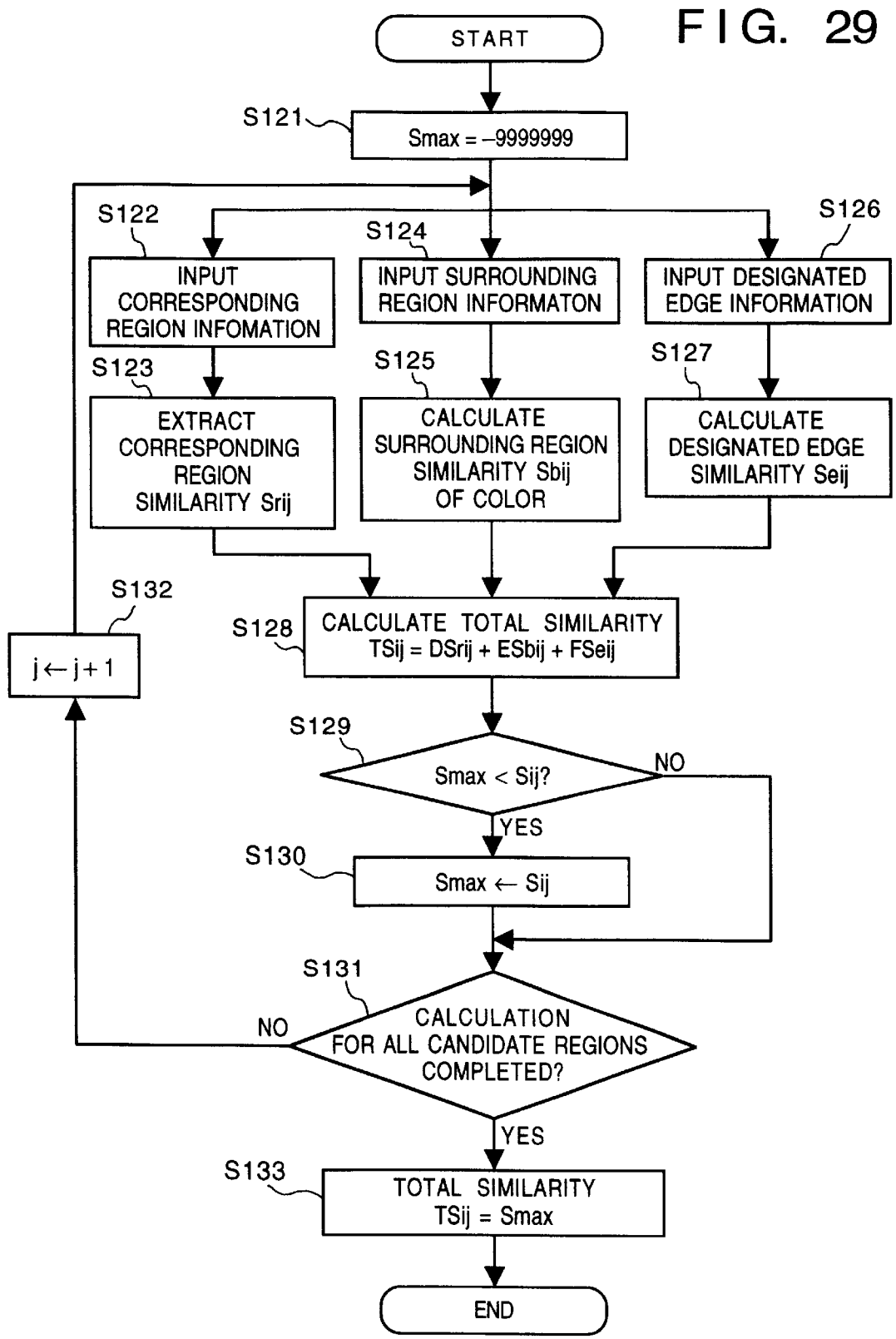
FIG. 29 is a flow chart showing the details of the total similarity determination processing.

Total Similarity Calculation Processing (FIG. 29)

In this processing, the similarities between the candidate regions and the designated image 1000 are calculated on the basis of the description information of the corresponding candidate regions stored in the corresponding region buffer 26, the designated edge information associated with the presence/absence of the edges of the designated image 1000, which information is stored in the designated edge buffer 28, and the surrounding region information of the corresponding candidate regions stored in the surrounding region buffer 30, and the highest one of the calculated similarities is output to the sorting processing 128 as a total similarity between the designated image 1000 and image data in the image files 109. In other words, a candidate region of image data having the highest similarity obtained in this processing is determined as a region which best matches the designated image 1000 designated by the searcher, and its similarity is defined as one between the designated image 1000 and the image to be searched. This processing is performed for all the image data in the image files 109, the similarities between the image data and the designated image 1000 are calculated, and the calculated similarities are input to the sorting processing 128.

In this processing, a total similarity TSij (j: j=1, 2, . . . , K) of each corresponding candidate region (j: j=1, 2, . . . , K) of the image (i) is calculated.

In step S121, the initial value of the maximum value (Smax) of K total similarities (TSij) to be calculated is set.

In step S122, the corresponding region information stored in the corresponding region buffer 26 is input. In step S123, the similarities (Srij) of corresponding regions (j: j=1, 2, . . . , K) are extracted from the input information.

In step S124, the surrounding region information stored in the surrounding region buffer 30 is input. In step S125, the similarity (Sbij) of the colors of the surrounding regions is calculated from the input information using the following equation:

$$Sbij = -\{|Rbij1 - rb| + |Gbij1 - gb| + |Bbij1 - bb| + \ldots +$$
$$|Rbijn - rb| + |Gbijn - gb| + |Bbijn - bb|\}/n$$

where (Rbij1, Gbij1, Bbij1), . . . , (Rbijn, Gbijn, Bbijn) are the color information values of the surrounding regions, and (rb, gb, and bb) is the surrounding color information value of the designated image 1000.

In step S126, the designated edge information stored in the designated edge buffer 28 is input. In step S127, the similarity (Seij) of the designated edge is calculated using the following equation:

$$Seij = (e0 + e1 + \ldots + em)/m$$

where (e0, e1, . . . , em) is the designated edge information.

In step S128, using the similarities calculated in steps S122 to S127, a total similarity (TSij) is calculated based on the following equation:

$$TSij = D \cdot Srij + E \cdot Sbij + F \cdot Seij$$

where D, E, and F are respectively weighting coefficients.

When the above-mentioned processing is executed in combination with processing operations in steps S129 to S132, the total similarities (TSij) associated with the K corresponding candidate regions are calculated, and the maximum value (Smax) of the K total similarities (TSij) is obtained.

Finally, in step S133, a candidate region having the highest similarity, i.e., the maximum value, is determined as a region in the image (i), which region best matches the designated image 1000.

The above-mentioned processing is executed for N images (i: i=1, . . . , N) stored in the image file 109. The sorting processing 128 sorts the maximum similarities obtained in association with the respective images, and selects a predetermined number of (K) image data in the descending order from the largest similarity value. Finally, the image data access processing 129 accesses the image file 109 with reference to the similarity information of the predetermined number of images so as to read out the corresponding K image data in the descending order from the largest similarity value, and displays the readout image data on the display 111.

Therefore, according to the fourth embodiment, not only the region information of an image or figure pattern, but also the edge information of each of its regions and color information of surrounding regions are input as the designated image information, and the number of image data to be searched is decreased using various kinds of description information of image data stored in the image files 109 on the basis of the input designated image information. Since only the remaining image data are accessed, the search processing of image data can be attained more accurately. In the search processing, since a large volume of data is not directly accessed, high-speed, efficient search processing can be realized.

In the fourth embodiment, when the searcher generates a figure pattern of a designated image to be searched for, he or she draws the pattern on the screen of the display 111 by operating, e.g., the mouse 8. However, the present invention is not limited to this. For example, the searcher may draw a sketch of a figure representing the designated image on an appropriate sheet, or may prepare for a sheet printed with a given image, and may load the image into the apparatus using an image input apparatus such as a scanner. The same applies to the above embodiments and those to be described below.

When the searcher draws a figure, he or she draws the edges of the designated image using, e.g., a pen on an appropriate sheet, and paints the designated image using, e.g., an appropriate pen. Then, the searcher paints the surrounding portion of the designated image, and traces edges, which may be present in the image to be searched, of the designated image, using a predetermined pen. The sketch created as described above is read as the designated image using a scanner. The edge line of the read designated image is polygonal-approximated using the linear approximation processing method described in the fourth embodiment, and the average color in the designated image is determined as the color of the designated image.

Figure 30:
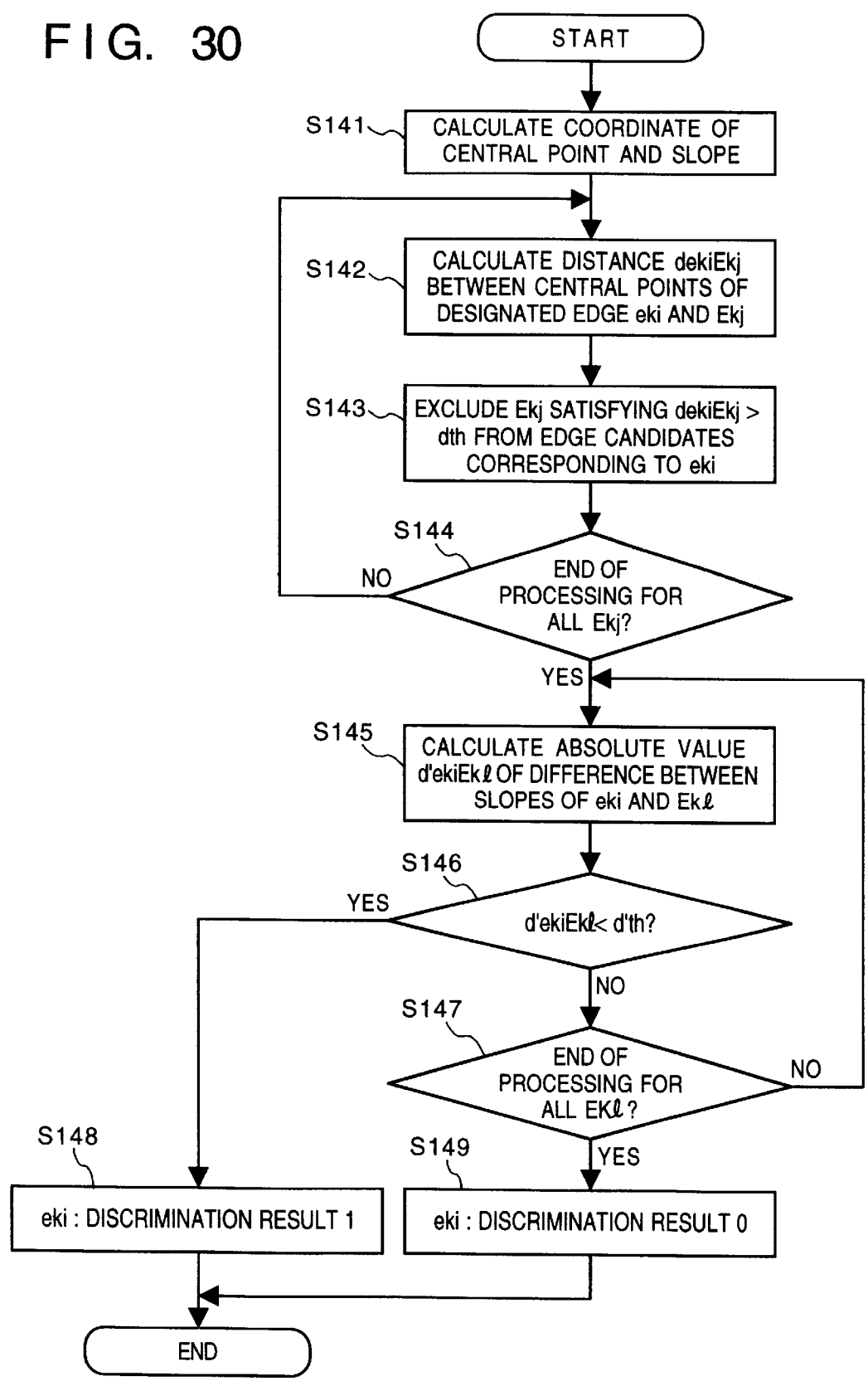
FIG. 30 is a flow chart showing another embodiment of the designated edge presence/absence discrimination processing.

In the designated edge presence/absence discrimination processing described in the fourth embodiment, in the processing for discriminating whether or not an edge is present in an image to be searched, as shown in FIG. 27, the sums of the distances between the vertex point coordinate positions at the two ends of each line segment eki of the designated image and all the line segments Ek1, Ek2, . . . , Ekm of the regions of corresponding image data are calculated, and if the minimum value of the sums is equal to or smaller than the predetermined threshold value, it is determined that the line segment eki is an edge which is also present in the image to be searched. However, the present invention is not limited to this. For example, edge presence/absence discrimination processing shown in FIG. 30 may be performed.

In step S141, the coordinate positions and slopes of the central points of the line segments (edges) Ek1, Ek2, . . . , Ekm of the image to be searched and the line segments (edges) ek1, ek2, . . . , ekn of the designated image are obtained. In step S142, the distance (dekiEkj) between the central point (ekic) of the designated edge (eki) and the central point of the edge (Ekj: j=1, . . . , K) of the corresponding region of the image to be searched is calculated. In steps S143 and S144, the edges (Ekj) of the corresponding regions, which have distances larger than a predetermined threshold value (dth), are excluded from the candidates of edges corresponding to the designated edge (eki).

In steps S145 to S147, the absolute value (d'ekiEkj) of the difference between each of the slopes of all the remaining corresponding region edges (Ekl: 1<l<m) which are not excluded, and that of the designated edge (eki) is calculated, and is compared with a predetermined threshold value (d'th). If each absolute value is smaller than the threshold value, the flow advances to step S148; otherwise, the flow advances to step S149. In step S148, it is determined that the designated edge (eki) is present as an edge in the image to be searched, and "1" is set as the discrimination result. In step S149, it is determined that the designated edge is not present as an edge in the image to be searched, and "0" is set as the discrimination result.

As described above, according to the fourth embodiment, the number of image data to be searched is decreased using, as search designation information, not only an image or figure pattern but also edges of the designated image and the color of the surrounding regions of the designated image with reference to the feature data of image data in the image file to be searched. For this reason, image data need not be directly accessed to decrease the number of image data, and a desired image can be accurately found at higher speed.

[Fifth Embodiment]

The fifth embodiment of the present invention will be described below. In this embodiment, a designated image is input by designating an edge line and its surrounding color.

Figure 31:
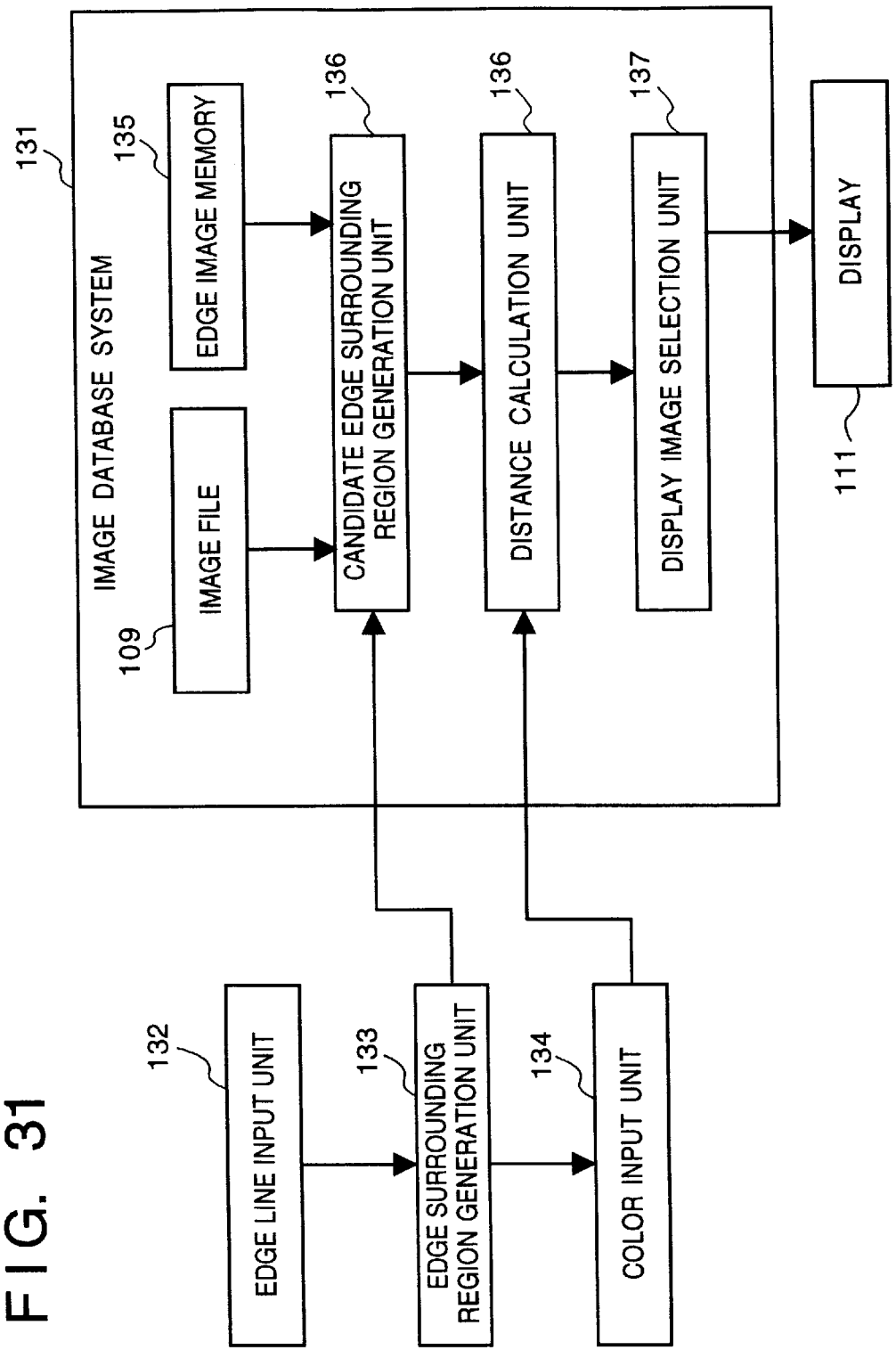
FIG. 31 is a block diagram showing the arrangement of an image database system according to the fifth embodiment of the present invention.

FIG. 31 is a block diagram showing the arrangement of an image database system according to the fifth embodiment of the present invention.

Figure 35:
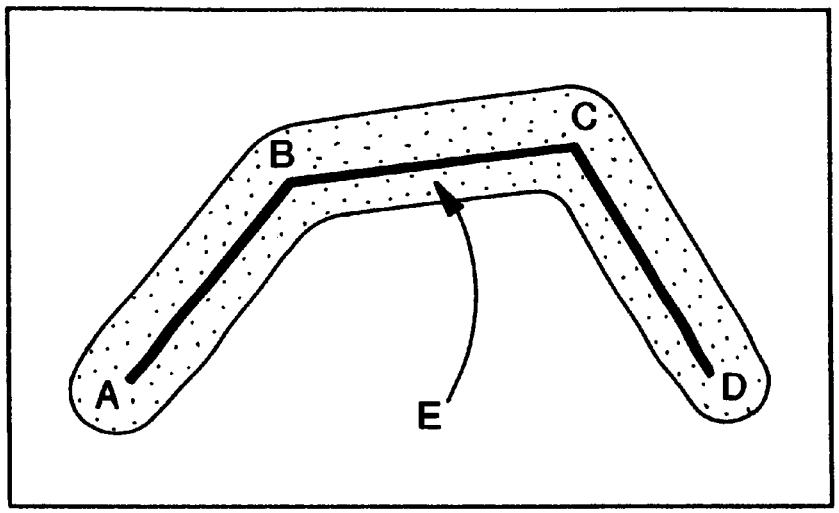
FIG. 35 is a view showing the result of image dilation processing for the edge line presented in FIG. 34.

Referring to FIG. 31, reference numeral 131 denotes an image database system main body; 132, an edge line input unit for instructing search processing; 133, an edge surrounding region generation unit for generating an edge surrounding region shown in, e.g., FIG. 35, on the basis of an edge line input from the edge line input unit 132; and 134, a color input unit for inputting the color of each surrounding region generated by the edge surrounding region generation unit 133 by a searcher. With these units, a designated image as a search key is input. Reference numeral 111 denotes a display for displaying the search result. Note that the edge line input unit 132 and the color input unit 134 correspond to the figure input window 201 and the color palette 205 shown in FIG. 3.

In the image database system 131, the image file 109 stores image data to be searched. An edge image memory 135 stores edge image data generated by performing edge extraction processing for image data stored in the image file 109 in advance. Reference numeral 136 denotes a candidate edge surrounding region generation unit for generating a region (to be referred to as a candidate edge surrounding region hereinafter) corresponding to the edge surrounding region generated by the edge surrounding region generation unit 133 on the basis of an original image stored in the image file 109 and an edge image stored in the edge image memory 135.

A distance calculation unit 136 calculates the distance between the edge surrounding region generated by the edge surrounding region generation unit 133 and the candidate edge surrounding region. A display image selection unit 137 selects a (similar) stored image having a short distance to the designated image, which distance is calculated by the distance calculation unit 136 with respect to the respective stored images in the image file 109, and displays the selected image on the display 111.

In the system according to the fifth embodiment with the arrangement shown in FIG. 31, upon storage of image data in the image file 109, the image data is input to the image file 109, and at the same time, an edge image obtained by performing known edge detection processing for the image data is stored in the edge image memory 135. More specifically, this image database system 131 stores original image data and edge image data corresponding to each original image data. Note that edge image data is stored after it is binarized by a known method.

In the fifth embodiment, the image search method from the image database uses, as a designated image, the position of an edge portion of an image and the surrounding color of the image in a searcher's memory which are designated by the searcher.

Figure 32:
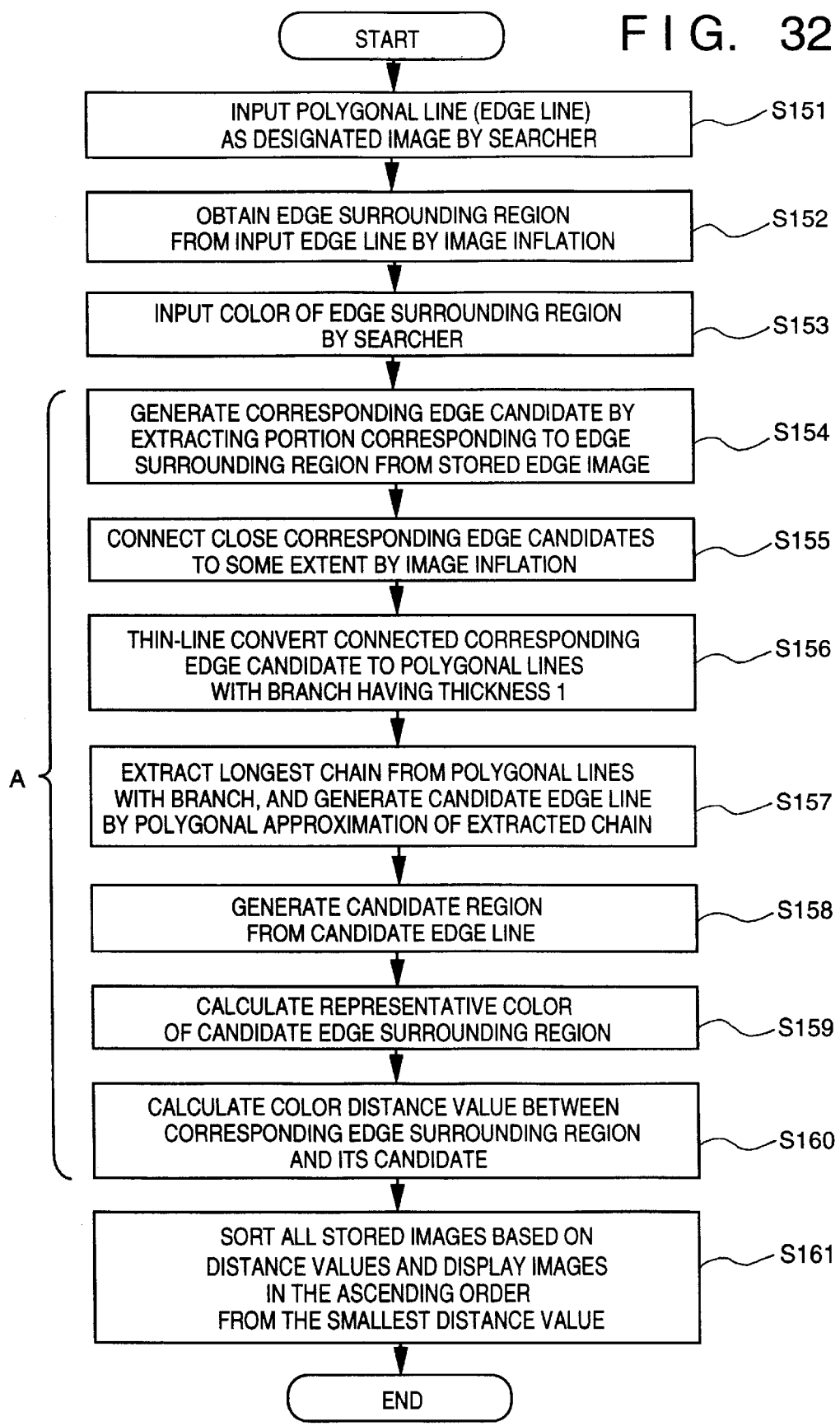
FIG. 32 is a flow chart showing the image retrieval processing sequence in an image database.

The retrieval processing for retrieving images stored in the image database in the fifth embodiment will be described below with reference to the flow chart shown in FIG. 32.

Figure 33:
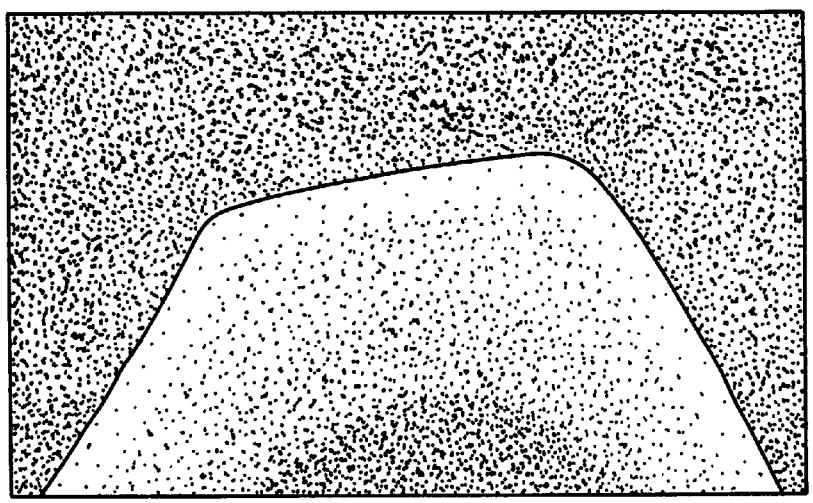
FIG. 33 is a view showing an example of a target image that a searcher wants to locate.
Figure 34:
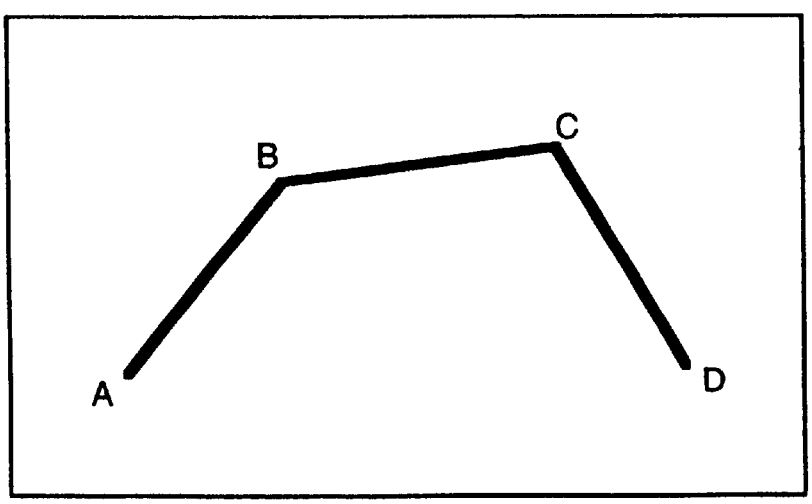
FIG. 34 is a view showing an example of an edge line presented by the searcher to retrieve the target image shown in FIG. 33.

In step S151, the searcher draws a polygonal line on the figure input window 201 using a graphic editor described above with reference to FIG. 3 so as to input a designated image. For example, when the searcher wants to search for an image shown in FIG. 33, he or she inputs line segments corresponding to a clear edge portion in the image data as a polygonal line on the basis of his or her memory, as indicated by reference symbols A, B, C, and D in FIG. 34. If the edge of an original image is approximate to a straight line, the edge may be designated by a straight line (the polygonal line will be referred to as an edge line hereinafter).

In step S152, image dilation processing of x dots (x is a predetermined value) is performed for the edge line designated in step S151 to obtain a region E shown in FIG. 35. The region E is divided by straight lines which pass the two end points (A and D in FIG. 34) of the input edge line and are perpendicular to segments (AB and CD in FIG. 34) including the two end points, and a portion, including the designated edge line, of the divided partial regions is determined as an edge surrounding region.

Figure 36:
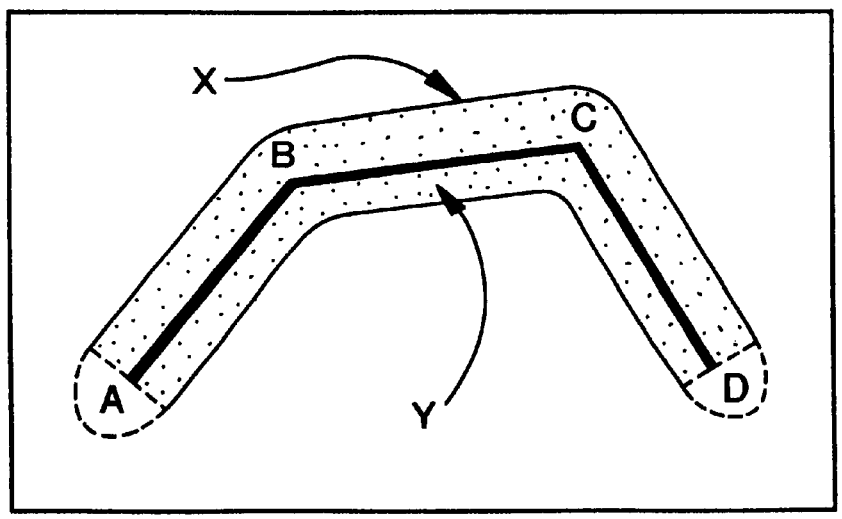
FIG. 36 is a view showing an example of an edge surrounding region generated based on the edge line shown in FIG. 34.

As a result, the edge surrounding region is divided into two regions X and Y by the edge line, as shown in FIG. 36. Upon observation of the edge line from its input start point (A in this case) to its input end point (D in this case), the left one of the two regions is defined as the region X, and the right region is defined as the region Y.

In step S153, the edge surrounding regions obtained in step S152 are displayed on the display 111. The searcher inputs the colors of portions, corresponding to these regions, of the original image to one or both the two regions X and Y using the color input unit 134 according to his or her memory.

In steps S154 to S160 (processing with symbol A in FIG. 32), the processing to be described below is performed for each image stored in the image database.

More specifically, in step S154, only portions corresponding to the edge surrounding regions obtained in step S152 are extracted from the edge images stored in the edge image memory 135. For example, assume that an edge surrounding region having a shape shown in FIG. 37A and an edge image shown in FIG. 37B are present. The region shown in FIG. 37A and the image shown in FIG. 37B are superposed each other, and portions, indicated by solid lines in FIG. 37D, of the obtained edge (FIG. 37C) are extracted. Note that the extracted portions will be referred to as corresponding edge candidates hereinafter.

In step S155, the extracted corresponding edge candidates are subjected to binary image dilation processing by y dots (y is a predetermined value, as shown in FIG. 37E, thus combining ones, which are close to each other, of the corresponding edge candidates. In step S156, the regions subjected to the inflation processing in step S155 are then subjected to known thin-line conversion processing to be converted into continuous polygonal lines having a thickness "1" and branches, as shown in FIG. 37F.

In step S157, the polygonal lines obtained in step S156 are traced by a method of generating chain codes, thus extracting the longest chain, as shown in FIG. 37G. The extracted chain is subjected to polygonal approximation by the divisional linear approximation method, so that the number of segments of the extracted chain becomes equal to the number of (three in FIG. 34) of segments included in the input polygonal line.

FIG. 37H shows the result of the above-mentioned polygonal approximation. The obtained polygonal line (A'–D') serves as a candidate of an edge corresponding to the input edge line shown in FIG. 34. Note that this polygonal line will be referred to as a candidate edge line hereinafter.

As for the two end points of the candidate edge line, a point A' close to the input start point A of the input edge line is assumed to correspond to the input start point. In this case, the other end point of the candidate edge line corresponds to the end point (D') of the input edge line.

In step S158, two edge surrounding regions are generated from the candidate edge line obtained in step S157 in the same manner as in the processing in step S152, as shown in FIG. 37I. These regions will be referred to as candidate edge surrounding regions hereinafter. Upon observation of the candidate edge line from its end point (A') corresponding to the start point (A) of the input edge line to the other end point (D'), the left one of the two candidate edge surrounding regions is defined as a region X', and the right candidate edge surrounding region is defined as a region Y'. The regions X' and Y' respectively correspond to the regions X and Y in FIG. 36.

In step S159, the representative colors of regions, corresponding to the candidate edge surrounding regions obtained in the processing until step S158, of the stored original image are obtained. Note that various methods of obtaining the representative color of a given region are known. In this case, the averages of R, G, and B values of all the pixels in the region may be simply calculated.

In step S160, the distances between the colors input by the searcher to the edge surrounding regions in step S153 and the representative colors of the corresponding candidate edge surrounding regions are calculated. Some color distance calculation methods are known. In this case, the distance between the two colors in the RGB space may be simply calculated. When a color is input to only one of the edge surrounding regions in step S153, a similarity is calculated using only the region and the corresponding candidate edge surrounding region. On the other hand, when colors are input to both the regions X and Y in step S153, similarities are calculated between the edge surrounding regions and the corresponding candidate edge surrounding regions, and the calculated values are averaged. In this case, this average value is used as the distance between the input value and the stored image.

The above-mentioned processing in steps S154 to S160 is repeated for all the stored images in the image file 109, thus obtaining the distances between the input value and the stored images. In step S161, stored images having smallest distances (highest similarities) are selected, and are displayed on the display 111 to be presented to the searcher as the search results.

As described above, according to the fifth embodiments, even when a target image does not have any equal-color region of certain size, as long as the target image includes a clear edge, the searcher designates the edge by a straight or polygonal line, and also designates the colors of one or both surrounding regions obtained by inflating line segments of the designated edge line to input a designated image. Using the designated image, an image search operation from the image database (image file) is performed, thus facilitating the input operation of the designated image and allowing a quick search.

Note that the present invention is not limited to the above embodiment. For example, matching between the candidate edge line obtained in the processing in step S157 in FIG. 32 and the input edge line may be performed, and if it is difficult to attain matching, i.e., if the two edge lines are not similar to each other at all, the corresponding stored image may be excluded from data to be searched, thus realizing higher-speed search processing.

Figure 38:
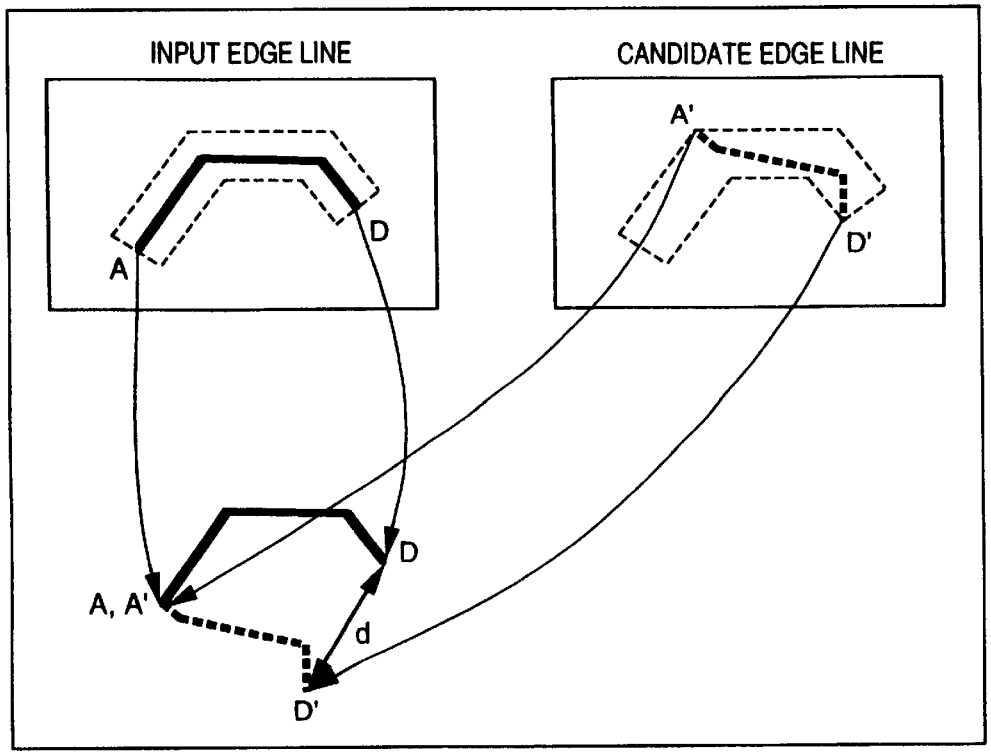
FIG. 38 is a view for explaining the matching method between an input edge line and a candidate edge line.

As the matching method, for example, as shown in FIG. 38, when the start point (A) of the input edge line is superposed on the corresponding end point (A') of the candidate edge line, if the ratio of the distance, d, between the remaining end points (D and D') of the two edge lines to the length of the input edge line is larger than a predetermined value, a source image of the candidate edge line may be excluded from data to be searched.

Figure 39:
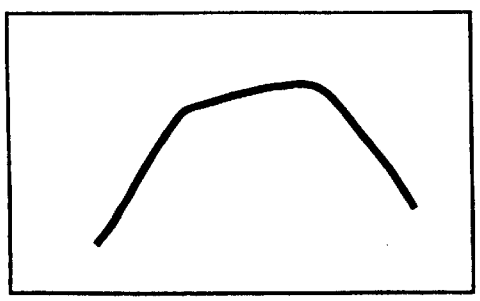
FIG. 39 is a view showing an example of a curve which is input as a portion corresponding to the edges of an original image.
Figure 40:
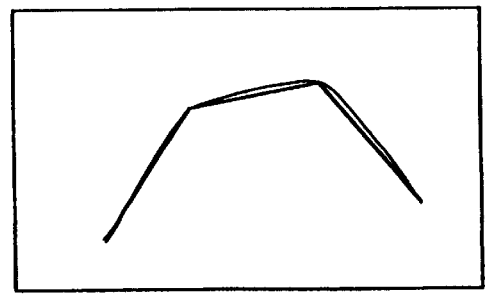
FIG. 40 is a view showing an example of approximation of the curve edge by a polygonal line.

In the fifth embodiment, an edge which is input by the searcher based on his or her memory associated with an original image need not be a polygonal line. For example, a curve shown in FIG. 39 may be input with respect to the image (an image to be searched) shown in FIG. 33. In this case, the input curve may be subjected to the divisional linear approximation method, and the same processing as described above may be performed using a polygonal line obtained by approximation of the curve as the input edge line, as shown in FIG. 40.

In this case, unlike in the divisional linear approximation method in the fifth embodiment, the processing is repeated until the distance between the input curve and the polygonal line becomes smaller than a predetermined value.

As described above, according to the fifth embodiment, an image search operation can be quickly and reliably performed on the basis of a comparison of the position of the input edge line and the colors designated on its surrounding regions with stored image data.

[Sixth Embodiment]

FIG. 41 is a block diagram showing the arrangement of an image retrieval apparatus according to the sixth embodiment.

Referring to FIG. 41, reference numeral 211 denotes a feature amount calculation unit for calculating feature amounts corresponding to a plurality of block sizes shown in FIGS. 42A to 42C from respective image data (stored in the image file 109) to be searched; and 212, an index generation unit for generating indices for search based on the feature amounts calculated by the feature amount calculation unit 211. Reference numeral 213 denotes a resolution index table formed in units of resolutions; and 214, a table search unit for determining the size and feature amount of a block to be searched on the basis of the input designated image 100 (see FIG. 5 or 24), and searching for a similar image and corresponding regions on the basis of the index table 213.

In the above arrangement, the feature amount calculation unit 211 calculates and outputs a plurality of feature amounts corresponding to a plurality of block sizes for each image data stored in the image file 109. The index generation unit 212 generates indices based on the feature amounts output from the feature amount calculation unit 211, and search information (to be described later) is stored in the resolution index table 213 in correspondence with the indices and resolutions (block sizes).

Upon search of image data in the image file 109, the table search unit 214 calculates the block size and feature amount to be searched for on the basis of the designated image 100, searches the index table 213 using them, and outputs candidate images and their corresponding regions as retrieval results.

FIGS. 42A to 42C show examples of a plurality of block sizes used in the feature amount calculation unit 211.

FIG. 42A shows 16×16 pixel data per block, FIG. 42B shows 32×32 pixel data per block, and FIG. 42C shows 64×64 pixel data per block. In this case, a block size=16 corresponds to the highest resolution.

The feature amount calculation unit 211 calculates the color histogram of pixel data in units of blocks for each resolution (block size), and outputs a color feature vector (C1, C2, C3, . . . , Cn).

Figure 43:
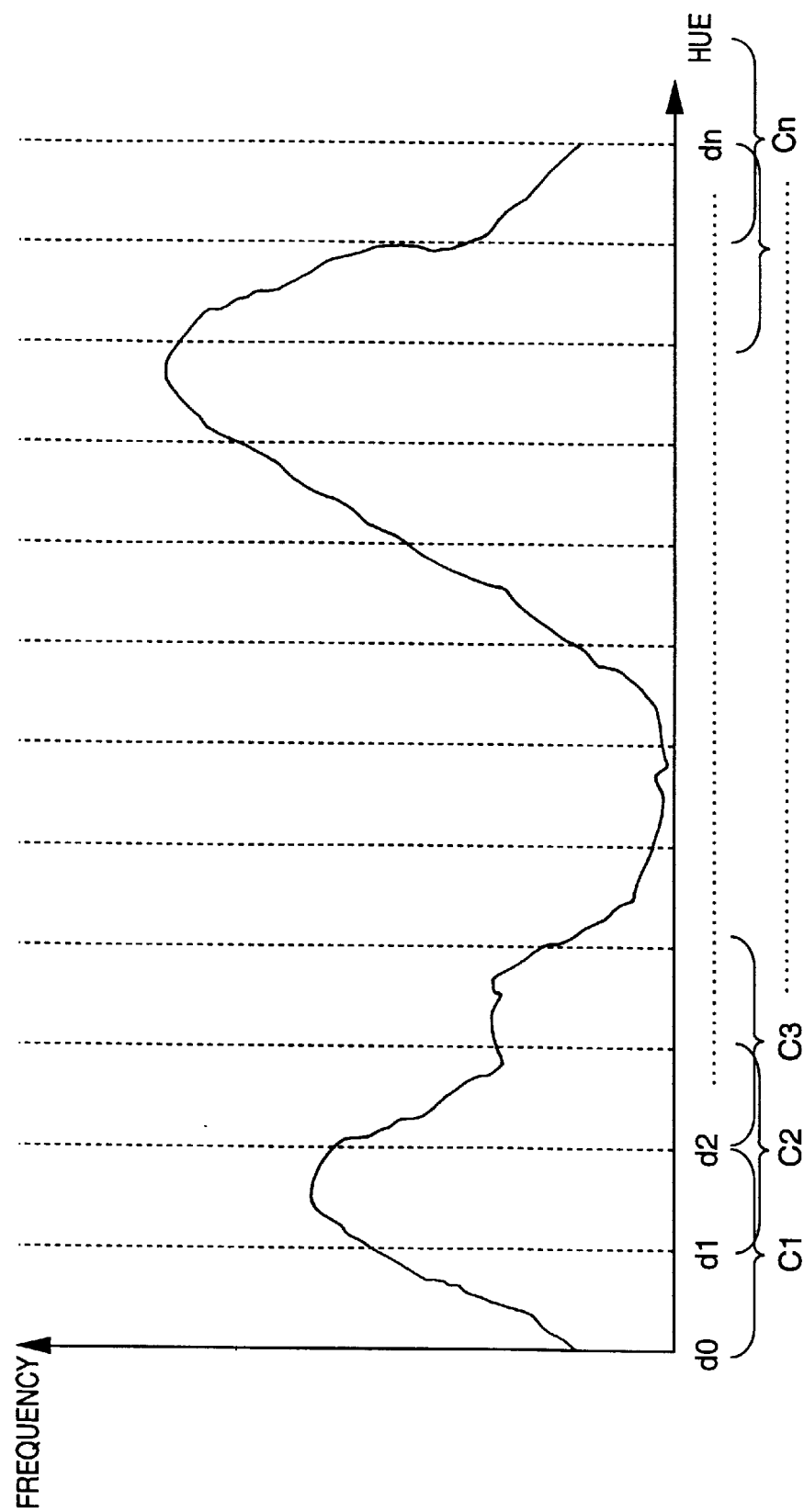
FIG. 43 is a graph showing an example of a histogram used for calculating color feature vectors.

FIG. 43 is a view for explaining the process for calculating the color feature vector from the histogram. Color data for which a histogram is calculated can be calculated using various calorimetric systems. In this case, an HSV calorimetric system is used as an example, and the histogram of H data representing a hue is used. Each element Ci of the color feature vector is obtained by counting the number of pixels within the range of [di−1, di+1] in the histogram. Since elements Ci and Ci+1 have an overlapping portion, even when the feature value obtained from the designated image 100 is in the neighborhood of a quantization step di, stable discrimination is assured.

Figure 44:
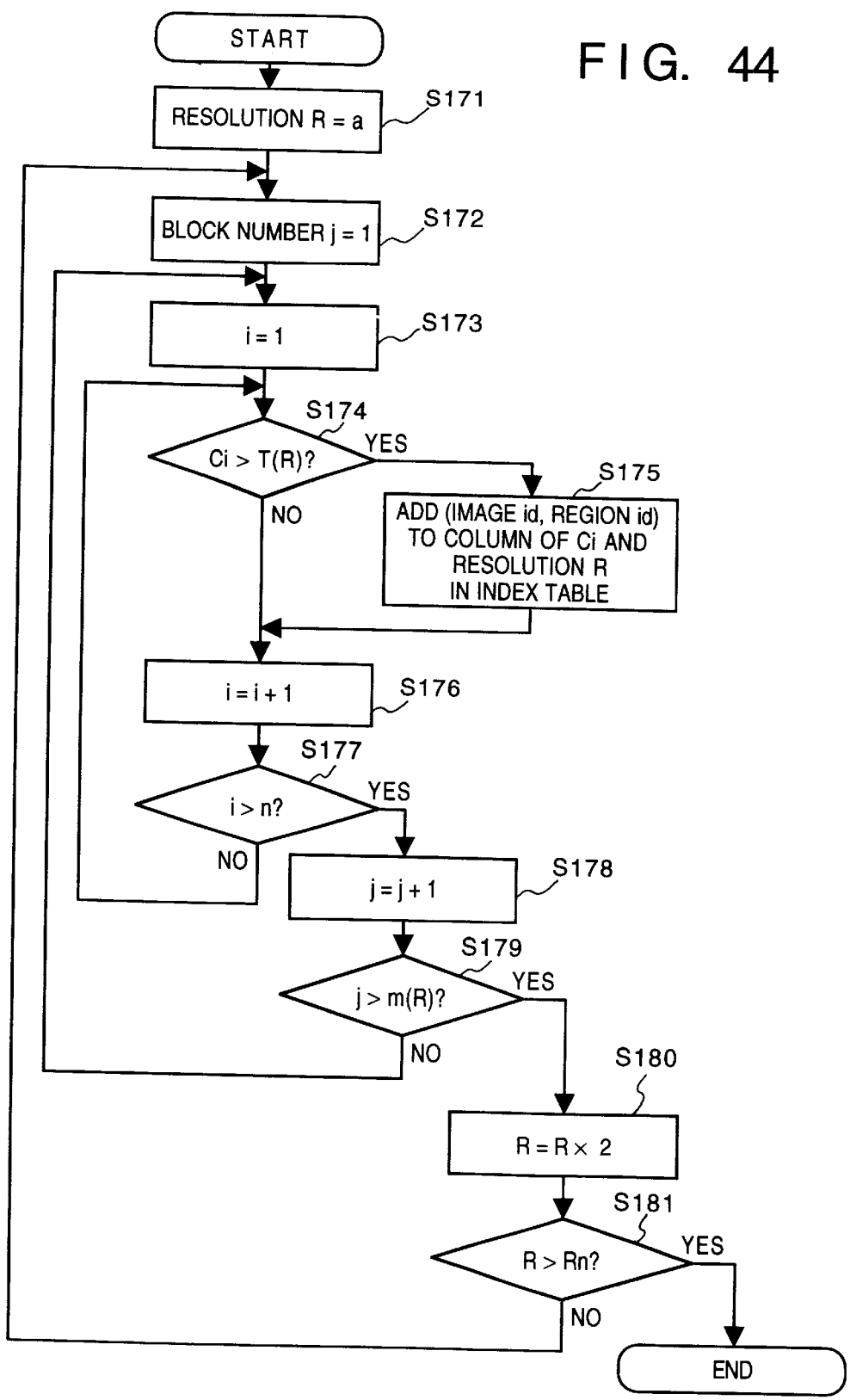
FIG. 44 is a flow chart showing the operation of an index generation unit.

FIG. 44 is a flow chart showing the operation of the index generation unit 212.

This flow includes simple triple loops. In step S171, a resolution (block size) R is set. In step S172, the block number j is initialized to "1". In step S173, a parameter i indicating each element Ci of the color feature vector is initialized to "1". Subsequently, in step S174, the element Ci of the color feature vector is compared with a threshold value T(R) determined based on the resolution R. As a result, if the element Ci is larger than the threshold value T(R), the flow advances to step S175, and the block number (region id) and the number (image id) of an image including the block are added to a column, determined by the resolution R and the color feature vector element Ci, of the index table 213. In steps S176 to S181, the respective parameters are updated, and when indices of elements Ci are generated for blocks of all the resolutions, the processing ends.

FIG. 45 is a view showing the arrangement of the index table 213. When the operation shown in FIG. 44 is repeated for all the resolutions (block sizes) R and all the blocks j, index information to images and regions having a predetermined frequency or higher of a specific color is stored in the index table 213 in units of blocks.

Figure 46:
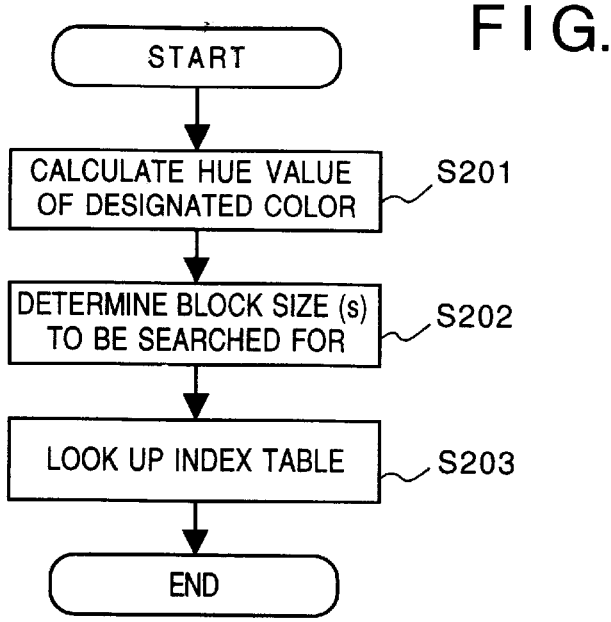
FIG. 46 is a flow chart showing the operation of a table search unit.

FIG. 46 is a flow chart showing the operation of the table search unit 214.

In step S201, a hue value H and a corresponding color range Ch are calculated on the basis of color data of the designated image 100 input as a pattern to be searched for, as shown in, e.g., FIG. 5. In step S202, a block size to be searched for is determined on the basis of the shape of the designated image 100. Note that determination of the block size (s) will be described later with reference to FIG. 47.

In step S203, the index table 213 is searched using the block size determined in step S202, thus obtaining the candidate image number (image id) and search block number (region id). The hue value H is obtained as follows. That is, the hue value H is compared with each threshold value di in accordance with the relationship shown in FIG. 43, and when the hue value H satisfies:

$$dk < H < dk+1$$

elements Ck and Ck+1 are set as an appropriate color range.

Figure 47:
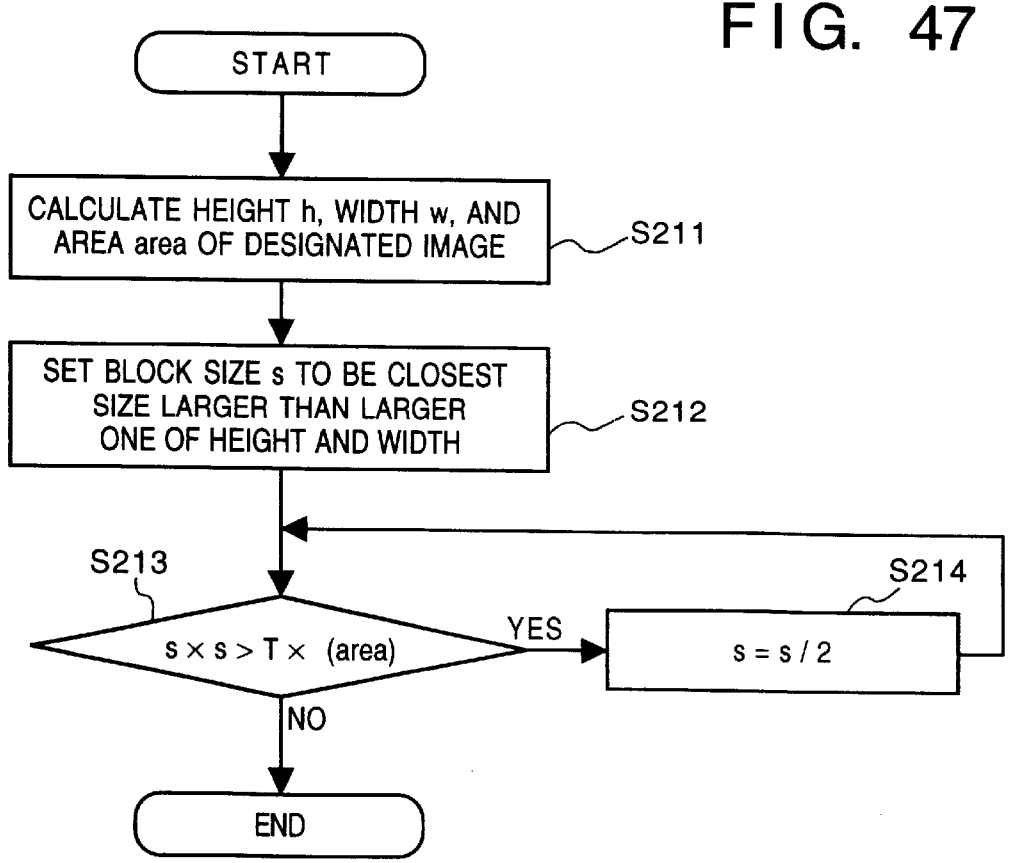
FIG. 47 is a flow chart showing the block size determination processing.

FIG. 47 is a flow chart showing the processing for determining the above-mentioned block size (s).

In step S211, a maximum height h, a maximum width w, and an area (the number of pixels in the designated image) region are calculated for the designated image 100. In step S212, a closest block size having a height and width equal to or larger than h and w is set to be an initial value of s. In step S213, it is checked if the area s×s of the block is larger than the product of the area region (area) of the designated image 100 and a predetermined constant T. If YES in step S213, the flow advances to step S214, and s is multiplied with ½. Then, the flow returns to step S213 to repeat comparison. On the other hand, if NO in step S213, the value s is determined as a block size for the next search. Note that the constant T is determined in association with the threshold value T(R) upon generation of an index, and assumes, e.g., a value "4.0".

When the image search apparatus according to the sixth embodiment is applied to an image database system, an electronic filing system, or a multimedia database system, a system with a high-speed image search function can be provided.

In the sixth embodiment, the feature amount calculation unit 211 calculates the color feature vector in correspondence with the block sizes shown in FIGS. 42A to 42C. However, the present invention is not limited to these block formats. For example, the block formats shown in FIGS. 48A and 48B may be used.

Figure 48:
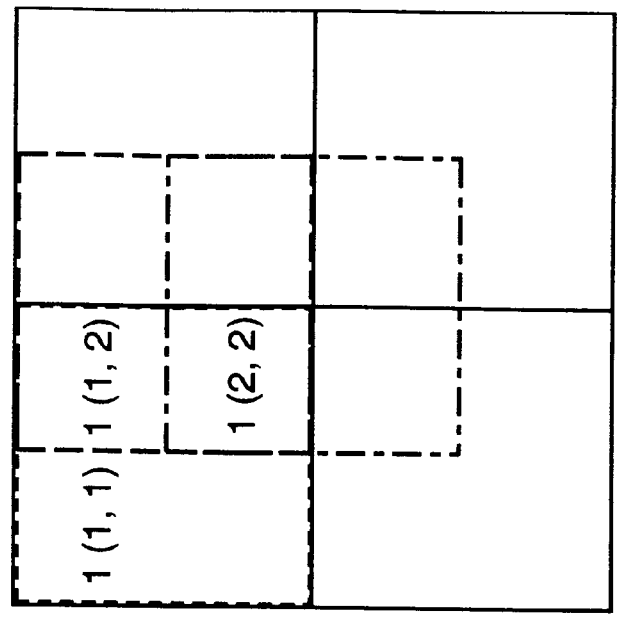
FIGS. 48A and 48B are views showing the format of a block according to a modification of the sixth embodiment.

In FIGS. 48A and 48B, the moving amount of a block with respect to a block size 2A is set to be a value different from the block size, e.g., A. More specifically, blocks 1a(1, 1), 1a(1, 2), 1a(2, 1) and 1a(2, 2) shown in FIG. 48A of the block size A are set to be a block 1(1, 1) in FIG. 48B of the block size 2A, and blocks 1a(1, 2), 1a(1, 3), 1a(2, 2), and 1a(2, 3) partially overlapping the block 1(1, 1) are set to be a block 1(1, 2). Blocks are formed by similarly permitting overlapping of blocks in both the vertical and horizontal directions.

With these formats, although the number of entries of the index table 213 increases, the influence caused when the designated image 100 overlaps blocks can be eliminated, and the efficiency upon use of indices can be improved.

The retrieval operation of the sixth embodiment may be used as a primary screening operation, and selected candidates may be subjected to comparison in more detail using methods in first and fifth embodiment or a conventionally proposed technique, thus obtaining retrieval results with higher accuracy.

As described above, according to the sixth embodiment, even when the designated image is a portion of a target image, the apparatus can operate stably, and the number of images to be compared can be sufficiently reduced, thus realizing high-speed image search processing.

[Seventh Embodiment]

Figure 49:
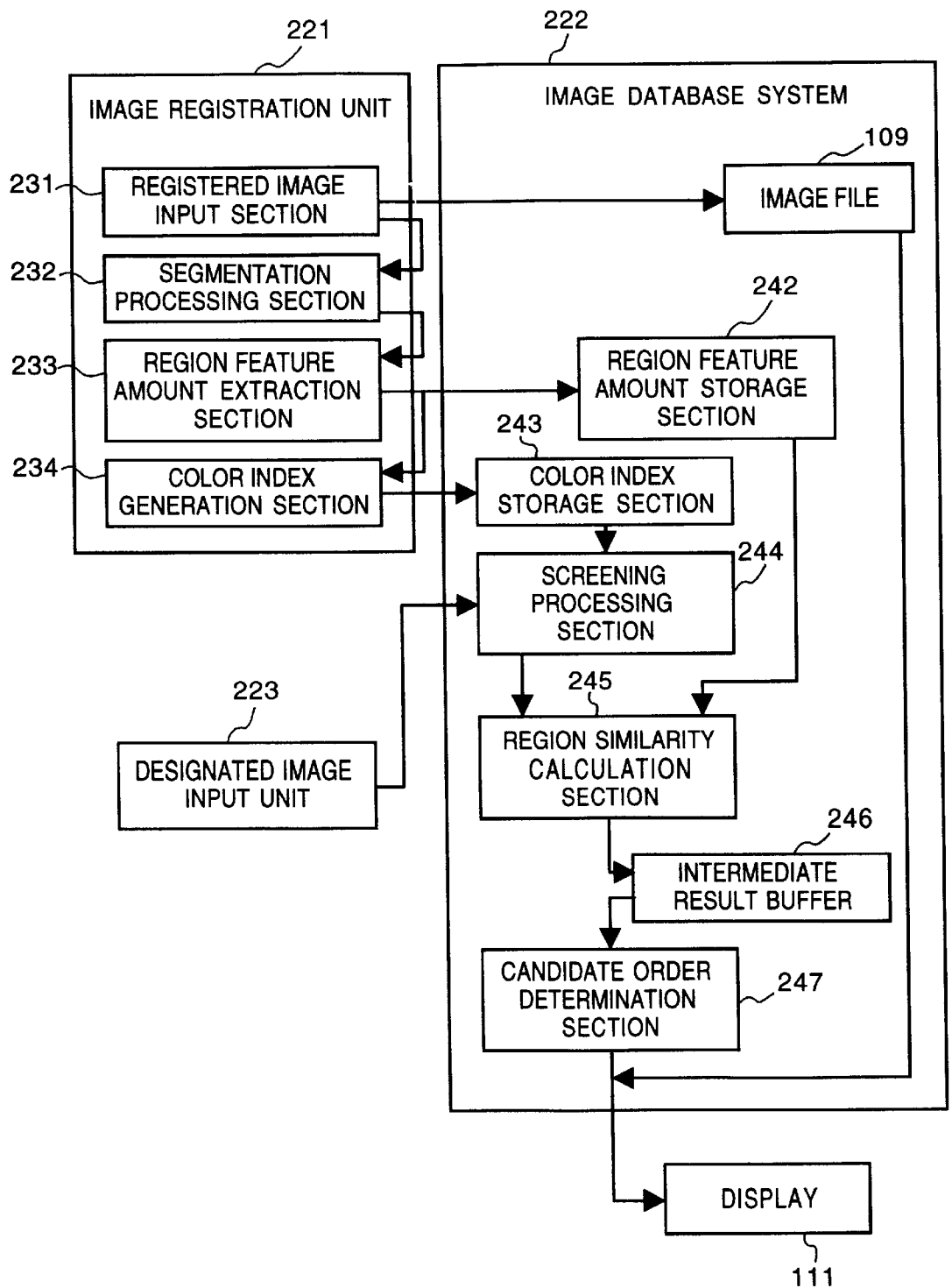
FIG. 49 is a block diagram showing the functional arrangement of an image retrieval apparatus according to the seventh embodiment of the present invention.

FIG. 49 is a block diagram showing the functional arrangement of an image retrieval apparatus according to the seventh embodiment of the present invention.

Referring to FIG. 49, reference numeral 221 denotes an image registration processing unit for performing pre-processing (to be described later) before an image is registered in an image database system 222. Reference numeral 222 denotes an image database system; and 223, an image (designated image) input unit for instructing the image retrieval apparatus of the seventh embodiment to start search. The unit 223 is used for inputting the designated image, as shown in FIG. 3 above. Reference numeral 111 denotes a display for displaying the retrieval results.

The arrangement of the image registration processing unit 221 will be described below. Reference numeral 231 denotes a registered image input section for inputting an image to be registered in the image file 109 of the database system 222. Reference numeral 232 denotes a region division processing section for dividing the image input from the registered image input section 231 into regions with similar colors. Reference numeral 233 denotes a region feature amount extraction section for extracting various feature amounts (colors, shapes, and the like) in units of regions divided by the region division processing section 232. Reference numeral 234 denotes a color index generation section for generating a color index of the registered image on the basis of color data in units of regions extracted by the region feature amount extraction section 233.

The arrangement of the image database system 222 will be described below.

The image file 109 stores a registered image input from the registered image input section 231. Reference numeral 242 denotes a region feature amount storage section for storing feature amounts, extracted by the region feature amount extraction section 233, of regions obtained by dividing the registered image in units of regions of each registered image. Reference numeral 243 denotes a color index storage section for storing the color index of each registered image generated by the color index generation section 234. Reference numeral 244 denotes a screening processing section for comparing the designated image, which is input by a searcher from the designated image input unit 223 to the image retrieval apparatus of the seventh embodiment, with the color index, and determining whether or not the next region similarity calculation section 245 performs a calculation of a similarity for the region of interest. The region similarity calculation section 245 performs matching between the corresponding regions of the designated image and the stored images, which are not excluded from processing targets by the screening processing of the screening processing section 244, so as to calculate their similarities. Reference numeral 246 denotes an intermediate result buffer for temporarily storing the calculation results of similarities in units of images in the region similarity calculation section 245. Reference numeral 247 denotes a candidate order determination section for selecting images with higher similarities with reference to the similarities in units of images stored in the intermediate result buffer 246, and displaying the selected images on the display 111.

As an image retrieval method from the image database, the seventh embodiment exemplifies a case wherein at least one closed region which is drawn by a searcher (operator) by designating its position, shape, and color is used as an image serving as a search key, and an image stored in the image database is searched using the position, shape, and color of the closed region.

FIG. 51 is a flow chart showing the processing upon registration of an image in the image database system 222 in the image retrieval apparatus of the seventh embodiment.

In step S221, an image to be registered in the image database system 222 is input from the registered image input section 231, and is stored in the image file 109. The flow then advances to step S222, and the input image is divided into near-equal-color regions by the segmentation processing section 232.

The flow advances to step S223, and various feature amounts are extracted in units of regions obtained by dividing the input image into near-equal-color regions in step S222. The extraction results are stored as region feature amounts in the region feature amount storage section 242 in units of input images. The region feature amounts include the representative color (H, S, and V values), area, and shape (the coordinate positions of the vertices of a polygon obtained by polygonal approximation of a region) of each region. The flow then advances to step S224, and a color index is generated on the basis of the region division results of the input image.

A method of generating a color index in the color index generation section 234 of the seventh embodiment will be described below.

The representative colors of the respective regions extracted in step S223 are mapped in the HSV color space. In this case, the areas (each value indicates the ratio to the area of the entire image, and the "area" means this ratio in the following description) of the corresponding areas are stored at the mapped coordinate positions. The mapped color space is determined as a color index, and is stored in the color index storage section 243 in units of stored images. In this manner, the processing upon image registration is completed.

The processing upon search of an image registered in the image database system 222 will be described below.

FIG. 52 is a flow chart showing the image search processing in the image retrieval apparatus of the seventh embodiment.

Figure 50A:
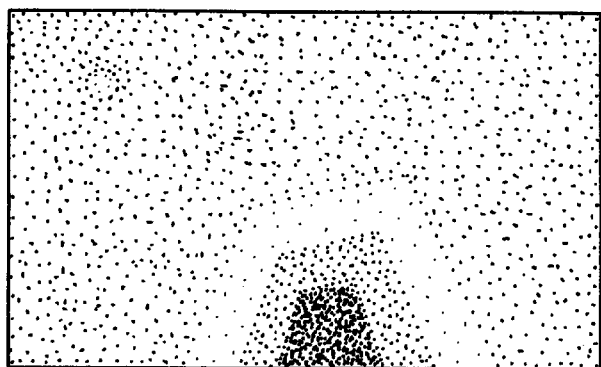
FIGS. 50A to 50C are views for explaining an image search operation in the seventh embodiment, in which FIG.
Figure 50B:
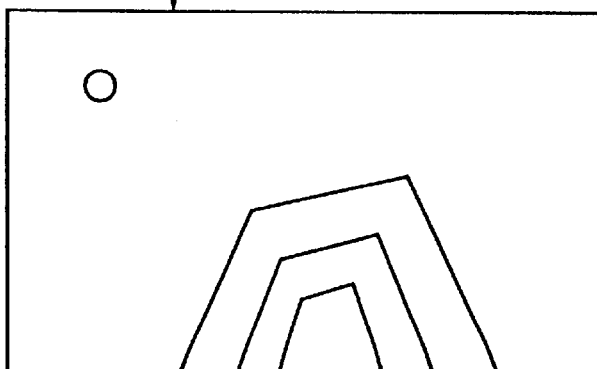

In step S231, the searcher inputs an image or figure (designated image) as a search key from the designated image input unit 223 by handwriting by means of, e.g., a drawing editor or using a scanner. For example, when the searcher wants to search for an image shown in FIG. 50A, he or she inputs an equal-color region in the image as one closed FIG. 200, as shown in, e.g., FIG. 50C, by designating its shape and color. This figure will be referred to as a designated image hereinafter.

Figure 50C:
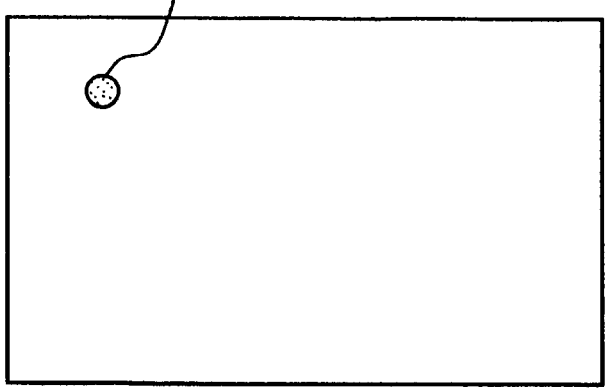

The flow advances to step S232, and the area, Sc, of the designated closed FIG. 200 is calculated on the basis of the designated image shown in FIG. 50C. This area is calculated as the ratio of the area of the closed FIG. 200 to the entire designated image, as described above. The flow advances to step S233, and a color index, which has already been generated for a certain one of images stored in the image files 109, is read out from the color index storage section 243.

Figure 53:
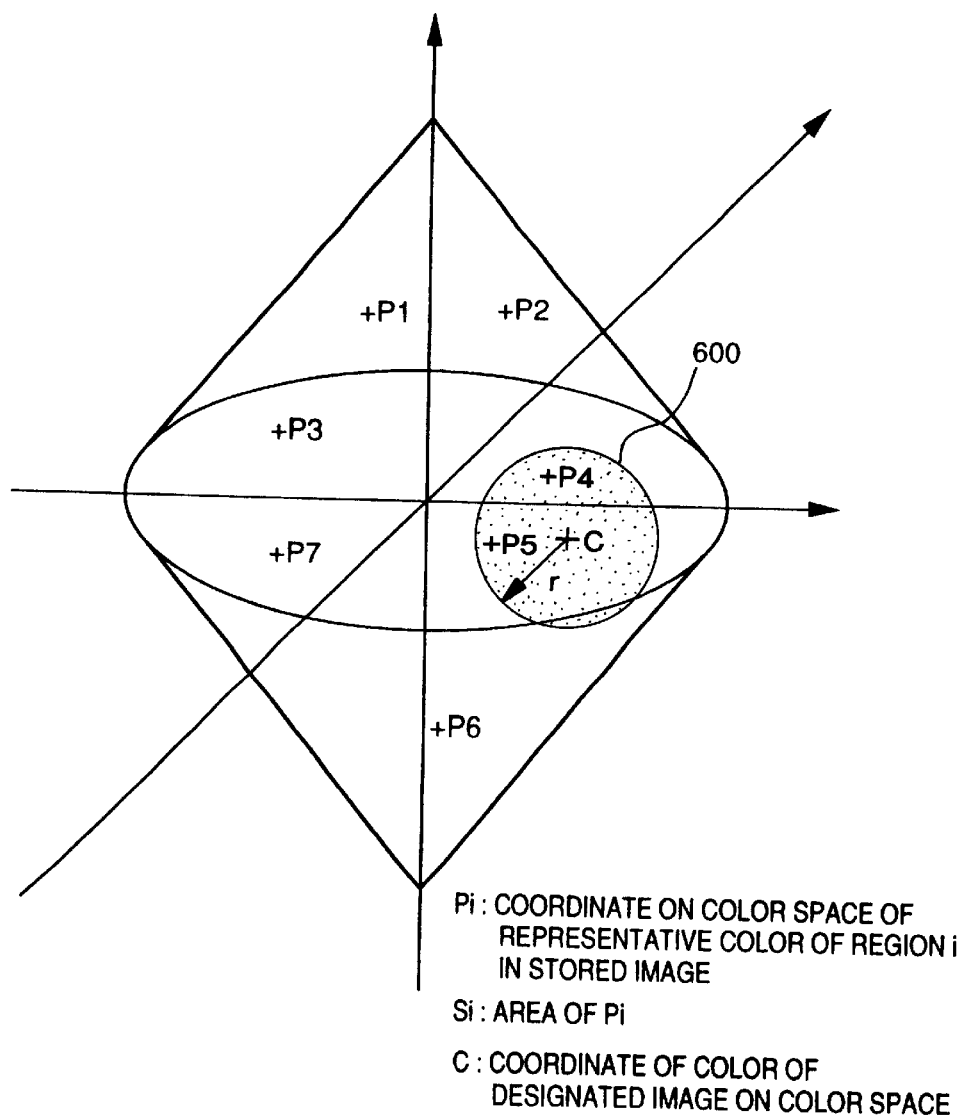
FIG. 53 is a view for explaining comparison between the colors of respective regions in the stored image and the color of the designated image in the seventh embodiment.

The flow advances to step S234, and the color of the designated image is converted into H, S, and V values, and the converted values are mapped on the same color space as the color index loaded in step S233, as shown in FIG. 53.

FIG. 53 is a view for explaining comparison between the colors of the respective regions in a stored image and the color of the designated image. Referring to FIG. 53, Pi is the coordinate position, in the color space, of the color of a region i in the stored image, and C is the coordinate position, in the color space, of the color of the designated image. Si is the area of the region i.

The flow then advances to step S235. In step S235, a spherical surface 600 of a radius r (predetermined value) is drawn on this color space to have C as the center, and the coordinate position Pi included in this sphere is searched for. Then, the areas Si of all the coordinate positions Pi included in the spherical surface 600 are calculated, and a total Sp of the areas Si is calculated.

The flow advances to step S236 to calculate Sp (total of Si)/Sc (the area of the closed FIG. 200), and if the calculated value is smaller than a predetermined value x (<1), i.e., if "the area of the designated image" is considerably larger than "the total of the areas of the regions having colors similar to that of the designated image", it is determined that "an equal-color region of the designated image that the searcher intended is not present in the corresponding stored image", i.e., "the stored image is quite different from the image that the searcher intended". Thus, the stored image is excluded from data to be searched in the subsequent search processing. The flow then advances to step S237 to load the color index of the next stored image, and the flow returns to step S234.

If the calculated value is not smaller than the redetermined value x, the flow advances to step S238. In step S238, the region feature amounts of stored images, which are not excluded from processing targets in step S236 are read out from the region feature amount storage section 242, and the region similarity calculation section 245 performs the matching discrimination processing between the regions and the designated image. The similarity values between the designated image and the stored images obtained as a result of the matching discrimination processing are stored in the intermediate result buffer 246 in units of stored images.

The flow advances to step S239 to check if the above-mentioned search processing is completed for all the stored images stored in the image file 109. If NO in step S239, the flow returns to step S237 to start the processing for the next stored image. In this manner, when the processing for all the stored images in the image file 109 is completed, the flow advances to step S240, the candidate order determination section 247 sorts the similarities (stored in the intermediate result buffer 246) between the stored images and the designated image, and displays images having higher similarities of those subjected to the region matching processing on the display 111, thus ending the retrieval processing.

With the above-mentioned processing, the number of stored images to be subjected to the region matching processing which requires a long processing time can be efficiently decreased, and as a result, the search time can be shortened.

[Eighth Embodiment]

In the seventh embodiment described above, a spherical surface is drawn on the color space of the color index to have the color of the designated image as the center, and a total of the areas of regions in the stored image having colors included in the spherical surface is calculated. However, since this processing requires a relatively long search time, the search time can also be shortened by simplifying the processing as follows.

Figure 54A:
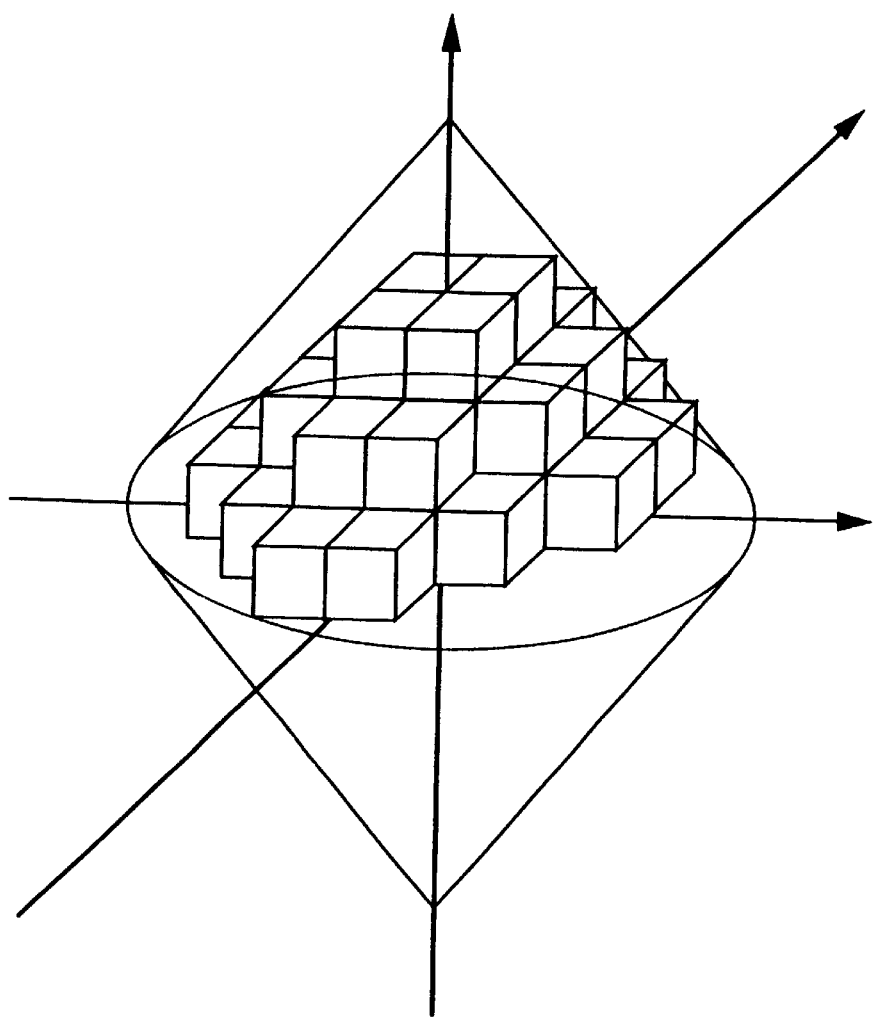
Figure 54B:
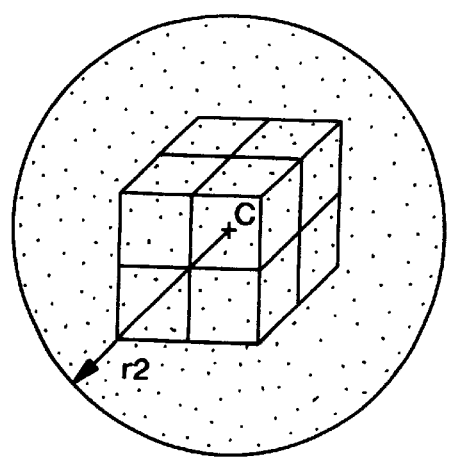

Upon generation of a color index for each stored image, the HSV color space is divided into appropriate blocks, as shown in FIG. 54A, a total of the areas of regions having colors included in each block is calculated in units of blocks, and the calculated value (Tj for a block j) is stored as a color index in the color index storage section 243 in units of blocks.

Upon retrieval of an image, the color of the designated image is mapped on the color space as in the seventh embodiment described above, and a total of the values Tj of all the blocks included within a range of a predetermined value r2 from the mapped coordinate position is defined as Tp. If a value Tp/Sc is smaller than a predetermined value x2 (<1), it is determined that the stored image is quite different from the image that the searcher intended, and the stored image is excluded from data to be searched in the subsequent processing as in the above embodiment.

[Ninth Embodiment]

In the seventh and eighth embodiments, the designated image is input as a figure having one closed region. However, the present invention is not limited to this. For example, the designated image may be input as a plurality of closed regions.

In such a case, the same processing as in the above-mentioned processing up to step S237 in the flow chart of FIG. 52 in the seventh embodiment is performed for each closed region, and the processing in step S238 and the subsequent steps can be performed for only stored images which are not excluded from data to be searched in association with all the closed regions.

As described above, according to the seventh embodiment, using data of the area of a closed region (designated image) designated as an image serving as a search key, the screening operation for decreasing the number of images to be subjected to the subsequent region matching processing can be performed more effectively, and as a result, the search time can be greatly shortened.

The present invention is not limited to the above embodiments and various changes and modifications can be made within the spirit and scope of the present invention. Therefore, to apprise the public of the scope of the present invention, the following claims are made.

What is claimed is:

1. An image retrieval apparatus for retrieving, from an image database, image data including an image similar to a designated image, comprising:

region detection means for detecting, in accordance with each of a plurality of regions in a first image in the database and the designated image, which of the plurality of regions are included in the designated image, each of the plurality of regions so detected being identified as a detected region;

compound region processing means for obtaining a compound region of the first image as a combination of the detected regions;

similarity detection means for calculating a similarity between the compound region and the designated image; and search means for searching for the image data including the image similar to the designated image in accordance with the similarity calculated by said similarity detection means.

2. The apparatus according to claim 1, wherein said region detection means detects whether each of the plurality of regions in the first image is a detected region in accordance with a respective color information difference between each of the plurality of regions in the first image and the designated image, and shape information of the designated image.

3. The apparatus according to claim 1, wherein said region detection means detects whether each of the plurality of regions in the first image is a detected region depending on whether or not each of the plurality of regions in the first image has a predetermined positional relationship with the designated image.

4. The apparatus according to claim 1, wherein said compound region processing means obtains the compound region on the basis of a crossing region of geometric parameter regions indicating a range in which each of the plurality of regions in the first image has a predetermined positional relationship with the designated image.

5. The apparatus according to claim 1, wherein said compound region processing means obtains the compound region depending on whether or not a crossing region of geometric parameter regions, indicating a range in which each of the plurality of regions in the first image has a predetermined positional relationship with the designated images, falls within a variable range of the designated image.

6. The apparatus according to claim 1, wherein said region detection means comprises means for comparing a color of each of the plurality of regions in the first image with a color of each of a plurality of regions in the designated image, and detects each detected region by discriminating whether or not each of the plurality of regions in the first image has a predetermined positional relationship with the designated image.

7. An image retrieval method for retrieving, from an image database, image data including an image similar to a designated image, comprising the steps of:

detecting, in accordance with each of a plurality of regions in a first image in the database and the designated image, which of the plurality of regions are included in the designated image, each of the plurality of regions so detected being identified as a detected region;

obtaining a compound region of the first image as a combination of the detected regions;

calculating a similarity between the compound region and the designated image; and searching for the image data including the image similar to the designated image in accordance with the calculated similarity.

8. The method according to claim 7, wherein, in said region detecting step, each detected region is detected in accordance with a respective color information difference between each of the plurality of regions in the first image and the designated image, and shape information of the designated image.

9. The method according to claim 7, wherein in said region detecting step, each of the plurality of regions in the first image is detected or not as a detected region depending on whether or not each of the plurality of regions in the first image has a predetermined positional relationship with the designated image.

10. The method according to claim 7, wherein in said compound region processing step, the compound region is obtained on the basis of a crossing region of geometric parameter regions indicating a range in which each of the plurality of regions in the first image has a predetermined positional relationship with the designated image.

11. The method according to claim 7, wherein in said compound region processing step, the compound region is obtained depending on whether or not a crossing region of geometric parameter regions, indicating a range in which each of the plurality of regions in the first image has a predetermined positional relationship with the designated image, falls within a variable range of the designated image.

12. The method according to claim 7, wherein said region detecting step comprises a step of comparing a color of each of the plurality of regions in the first image with a color of each of a plurality of regions in the designated image, and detects each detected region by discriminating whether or not each of the plurality of regions in the first image has a predetermined positional relationship with the designated image.

13. A storage medium storing computer readable program code for performing, when executed, an image retrieval method for retrieving, from an image database, image data including an image similar to a designated image, the code comprising:

code for detecting, in accordance with each of a plurality of regions in a first image in the database and the designated image, which of the plurality of regions are included in the designated image, each of the plurality of regions so detected being identified as a detected region;

code for obtaining a compound region of the first image as a combination of the detected regions;

code for calculating a similarity between the compound region and the designated image; and code for searching for the image data including the image similar to the designated image in accordance with the calculated similarity.

14. A storage medium according to claim 13, wherein each detected region is detected by said region detecting code in accordance with a respective color information difference between each of the plurality of regions in the first image and the designated image, and shape information of the designated image.

15. A storage medium according to claim 13, wherein each of the plurality of regions in the first image is detected or not as a detected region, by said region detecting code, depending on whether or not each of the plurality of regions in the first image has a predetermined positional relationship with the designated image.

16. A storage medium according to claim 13, wherein the compound region is obtained by said compound region processing code on the basis of a crossing region of geometric parameter regions indicating a range in which each of the plurality of regions in the first image has a predetermined positional relationship with the designated image.

17. A storage medium according to claim 13, wherein the compound region is obtained, by said compound region processing code, depending on whether or not a crossing region of geometric parameter regions, indicating a range in which each of the plurality of regions in the first image has a predetermined positional relationship with the designated image, falls within a variable range of the designated image.

18. A storage medium according to claim 13, wherein said region detecting code comprises code for comparing a color of each of the plurality of regions in the first image with a color of each of a plurality of regions in the designated image, and detects each detected region by discriminating whether or not each of the plurality of regions in the first image has a predetermined positional relationship with the designated image.

* * * * *

UNITED STATES PATENT AND TRADEMARK OFFICE
CERTIFICATE OF CORRECTION

PATENT NO. : 6,246,804 B1
DATED : June 12, 2001
INVENTOR(S) : Hiroaki Sato et al.

It is certified that error appears in the above-identified patent and that said Letters Patent is hereby corrected as shown below:

Title page,
Item [57], ABSTRACT,
Line 4, "for" should be deleted.

Sheet 2 of 44,
Under Figure 2, "SINGE" should read -- SINGLE --; and

Sheet 24 of 44,
Under Figure 29, "INFOMATION" should read -- INFORMATION --.

Column 1,
Line 32, "similarly" should read -- similarity --.

Column 2,
Line 10, "he" should read -- the --;
Line 30, "retrieve" should read -- retrieval --; and
Line 53, "retrieved for." should read -- retrieved. --

Column 8,
Line 15, before "and" left margin should be closed.

Column 22,
Line 56, "superposed" should read -- superposed on --.

Column 23,
Line 63, "embodiments," should read -- embodiment, --.

UNITED STATES PATENT AND TRADEMARK OFFICE
CERTIFICATE OF CORRECTION

PATENT NO. : 6,246,804 B1
DATED : June 12, 2001
INVENTOR(S) : Hiroaki Sato et al.

It is certified that error appears in the above-identified patent and that said Letters Patent is hereby corrected as shown below:

Column 24,
Line 51, "search" should read -- searches --.

Column 26,
Line 48, "embodiment" should read -- embodiments --.

Column 28,
Line 65, "closed FIG." should read -- closed figure --.

Column 29,
Line 2, "that" (first occurrence) should read -- those --; and
Line 11, "redeter-" should read -- predeter- --.

Column 30,
Line 66, "images," should read -- image, --.

Signed and Sealed this

Nineteenth Day of March, 2002

Attest:

Attesting Officer

JAMES E. ROGAN
Director of the United States Patent and Trademark Office